United States Patent [19]

Copriviza et al.

[11] Patent Number: 5,319,453

[45] Date of Patent: Jun. 7, 1994

[54] METHOD AND APPARATUS FOR VIDEO SIGNAL ENCODING, DECODING AND MONITORING

[75] Inventors: Robert C. Copriviza, Tarzana; Arnold M. Dubin, Calabasas; Edward B. Ackerman, Encino; Jackson B. Wood, Tarzana; Jeffrey S. Eakins, Claremont; David D. Harmon, Torrance, all of Calif.

[73] Assignee: Airtrax, Calabasas, Calif.

[21] Appl. No.: 370,399

[22] Filed: Jun. 22, 1989

[51] Int. Cl.$^5$ .............................................. H04N 7/087
[52] U.S. Cl. ...................................... 348/6; 348/473; 348/476
[58] Field of Search ............... 358/147, 146, 142, 141, 358/160, 86, 335, 188, 143, 144, 145, 83; 360/14.1, 14.2, 14.3, 33.1; H04N 7/08, 7/087, 7/16, 7/167, 7/175, 7/18

[56] References Cited

U.S. PATENT DOCUMENTS

| | | |
|---|---|---|
| 3,681,524 | 8/1972 | Nicholls ............................ 360/72.2 |
| 3,733,430 | 5/1973 | Thompson et al. . |
| 3,736,565 | 5/1973 | Sidline . |
| 3,739,086 | 6/1973 | Heather . |
| 3,845,391 | 10/1974 | Crosby . |
| 3,849,729 | 11/1974 | Van Baggem . |
| 3,906,450 | 9/1975 | Prado, Jr. . |
| 3,919,479 | 11/1975 | Moon et al. . |
| 3,947,624 | 3/1976 | Miyake . |
| 4,025,851 | 5/1977 | Haselwood et al. . |
| 4,028,702 | 6/1977 | Levine . |
| 4,167,759 | 9/1979 | Tachi . |

(List continued on next page.)

FOREIGN PATENT DOCUMENTS

| | | |
|---|---|---|
| 1137215 | 12/1982 | Canada . |
| 0195639 | 9/1986 | European Pat. Off. . |
| 54-130117 | 9/1979 | Japan . |
| 1254295 | 11/1971 | United Kingdom . |

OTHER PUBLICATIONS

R. T. McKinley, "New On-Line Editing System for TR-600 Quad VTR's," *RCA Broadcast News*, No. 160, pp. 42-48 (Dec. 1976).

(List continued on next page.)

*Primary Examiner*—James J. Groody
*Assistant Examiner*—David E. Harvey
*Attorney, Agent, or Firm*—Poms, Smith, Lande & Rose

[57] ABSTRACT

Unique digital codes are encoded on a video signal, the codes are retrieved at receivers and precise information concerning the time of occurrence, length, nature and quality of a monitored broadcast at a frame by frame level, is generated. The codes are inserted on scan lines of the video, and vary either on a field-to-field or frame-to-frame basis. The code has a repeating first part having a unique program material identifier indicating the time, date and place of encoding, and has a second portion that varies in a predetermined non-repeating sequence which varies along the entire length of the tape, thereby uniquely identifying each frame of the video program material. Also encoded upon successive frames is a cyclic counter code with a count corresponding to the sequence of the identifier data on successive frames. When the video signal is processed by a receiver, the first portion identifier data from the various frames is mapped into selected memory locations in accordance with the count of the frame as determined by the second portion. Odd and even fields are encoded with complementary bit sequences to assist in processing the encoded data. Whenever the frame sequence is interrupted a data packet is generated representative of the condition encountered. The data packets are accumulated in log files in a memory in the receiver. The log files are transmitted to a data center, as is a copy of the encoded tape. Reports concerning the broadcast are generated.

74 Claims, 54 Drawing Sheets

U.S. PATENT DOCUMENTS

| | | |
|---|---|---|
| 4,230,990 | 10/1980 | Lert, Jr. et al. . |
| 4,232,347 | 11/1980 | Tachi . |
| 4,237,499 | 12/1980 | Tachi . |
| 4,250,524 | 2/1981 | Tomizawa . |
| 4,361,851 | 11/1982 | Asip et al. . |
| 4,429,385 | 1/1984 | Cichelli et al. . |
| 4,450,531 | 5/1984 | Kenyon et al. . |
| 4,547,804 | 10/1985 | Greenberg . |
| 4,567,531 | 1/1986 | Tabata . |
| 4,599,644 | 7/1986 | Fischer . |
| 4,613,904 | 9/1986 | Lurie . |
| 4,639,779 | 1/1987 | Greenberg . |
| 4,677,466 | 6/1987 | Lert, Jr. et al. . |
| 4,750,034 | 6/1988 | Lem . |
| 4,802,033 | 1/1989 | Williams . |
| 4,805,020 | 2/1989 | Greenberg . |
| 4,835,626 | 5/1989 | Wilkinson et al. . |

OTHER PUBLICATIONS

A. Muller, "Videotape Post Production: A Survey of Methods and Equipment," *SMPTE Journal*, vol. 86, pp. 210–213 (Apr. 1977).

K. J. Hamalainen, "Videotape Editing Systems Using Microprocessors," *SMPTE Journal*, vol. 87, pp. 379–382 (Jun. 1978).

M. Morizono, "An Automatic Video Tape Editing System Having Film Editing Ease of Operation," International Braodcasting Convention, Wembley, England, pp. 176–179 (Sep. 1978).

G. R. Swetland, "A New System for Synchronizing Magnetic Tape and Magnetic Film Transports for Television Post Production," *SMPTE Journal*, vol. 88, pp. 483–485 (Jul. 1979).

*Fig. 1A.*

| Column Name | Description |
|---|---|
| client_id | Number assigned by the data base. (UNIQUE KEY within this table) |
| salesperson_id | |
| c_fname | Client first name |
| c_lname | Client last name |
| c_title | Client title |
| c_company | Client Company Name |
| c_address1 | * |
| c_address2 | * |
| c_city | * |
| c_state | * |
| c_zip | * |
| c_phone | Phone Numbers |

Fig. 1B.

Client Information

| | | |
|---|---|---|
| Client id | [ 3] | |
| Salesperson id | [ 2] | |

Client Information:

| | | |
|---|---|---|
| Name | [John J | [Jones ] |
| Title | [Senior Sales Rep | ] |
| Company | [XYZ Company | ] |
| Address | [2133 Valjean Ave | ] |
| | [ | ] |
| City | [Van Nuys ] State [CA] | Zip [91740] |
| Phone Number | [(818) 776-8875 ] | |

Client type [Active ]

AirTrax options purchased [XAS ]

*Fig. 1C.*

Program Information

Program      [001 23452 00832]
Client       [    3] [                              ]
             [    3] [                              ]
Encoder Unit [    1]  Encoded Date [10/10/88]  Time
             [23:45:00]
Encode
Length       [00:20:03]   non-drop frame
Agency       [AD HOC AD AGENCY                      ]
Title        [Jenny Craig Weight Loss Center Number 1 ]
ISCI         [123JJI       ]
Type         [             ]
Video Attributes:  Color [Y]    Stereo [ ]

Fig. 1D.

| Column Name | Description |
| --- | --- |
| comm_id | The program ID. (UNIQUE KEY within this table) |
| client_id | This allows us to reference back to the Client Table |
| encoder_unit_id | The encoder UNIT D |
| encoder_brd_id | The board number of the encoding board. (ALWAYS ONE) |
| encoded_length | The length of the encoded program in tenths of secs |
| agency | Name of agency from SLATE |
| title | Title from SLATE |
| ISCI | ISCI code from SLATE |
| length | Program length from SLATE |
| cdate | Date of encoding |
| ctime | Time of encoding |
| color | Tells whether this program has color or not |
| stereo | Tells whether this program has stereo or not |

Fig. 2.

Insertion Format

| Frame | Field | Data Encoded on Line 22 | | | |
|---|---|---|---|---|---|
| 0 | odd | D(0) | D(1) | F(L) = 0 | F(H) = 0 |
|   | even | Comp D(0) | Comp D(1) | W = 0 | LRC |
| 1 | odd | D(2) | D(3) | F(L) | F(H) |
|   | even | Comp D(2) | Comp D(3) | W = 1 | LRC |
| * |  | * | * | * | * |
| * |  | * | * | * | * |
| * |  | * | * | * | * |
| (mag size + 1) | odd | D(0) | D(1) | F(L) | F(H) |
|   | even | Comp D(0) | Comp D(1) | W = 0 | LRC |

Fig. 3.

General Packet Format

Byte
0    1    2 ...

| Length | Type | Content (variable length) |
|---|---|---|

Fig. 3A.

Packet Types

```
#define PKT_NO_OP            0  /* No Operation. Ignore this packet */
#define PKT_QUEUE_FILLER     1  /* In-memory queue internal use only */
#define PKT_TIMESTAMP        2  /* Identifies a specific date & time */
#define PKT_COMMERCIAL_ID    3  /* Identifies an encoded commercial. */
#define PKT_SIGNAL_STATUS    4  /* Describes an interval of status. */
#define PKT_LOG_TURNOVER     5  /* Indicates start/end of log file. */
#define PKT_RESTART          6  /* Indicates decoder was restarted. */
#define PKT_PRM_DROP_TIME    7  /* Parameter, Commercial Drop Time. */
#define PKT_IDLE_TIME        8  /* Parameter Idle Time-out. */
#define PKT_RES_IN_COM       9  /* Prm, Reporting Res in Commercial. */
#define PKT_PRM_NO_COM       10 /* Reporting Res not in Commercial. */
#define PKT_PRM_FREQUENCY    11 /* Parameter, receive frequency. */
#define PKT_DEBUG_MSG        12 /* Debug message, content is text. */
```

```
#define PKT_FSD              13  /* Frame Sequence discontinuity */
#define PKT_INSERT           14  /* Tell inserter to start inserting */
#define PKT_DECODER_ID       15  /* Identify decoder board */
#define PKT_PARTIAL_ID       16  /* An incomplete commercial ID. */
#define PKT_PROM_SYNC_THRSH  17  /* Parameter, Sync fault threshold */
#define PKT_PRM_BURST_THRSH  18  /* Parameter, Burst fault threshold */
#define PKT_SNAP             20  /* Debug snapshot, can be anything */
```

*Fig. 3A-1* (END)

| 0 | 1 | 2 | 3 | 4 | 6 | 8 | 10 |
|---|---|---|---|---|---|---|---|
| Len. | Type | Ver. | MSB Frm. Cnt. | Encoder | Time | Date | Chk-sum |

*Fig. 3B.*  Program Identifier Packet Format

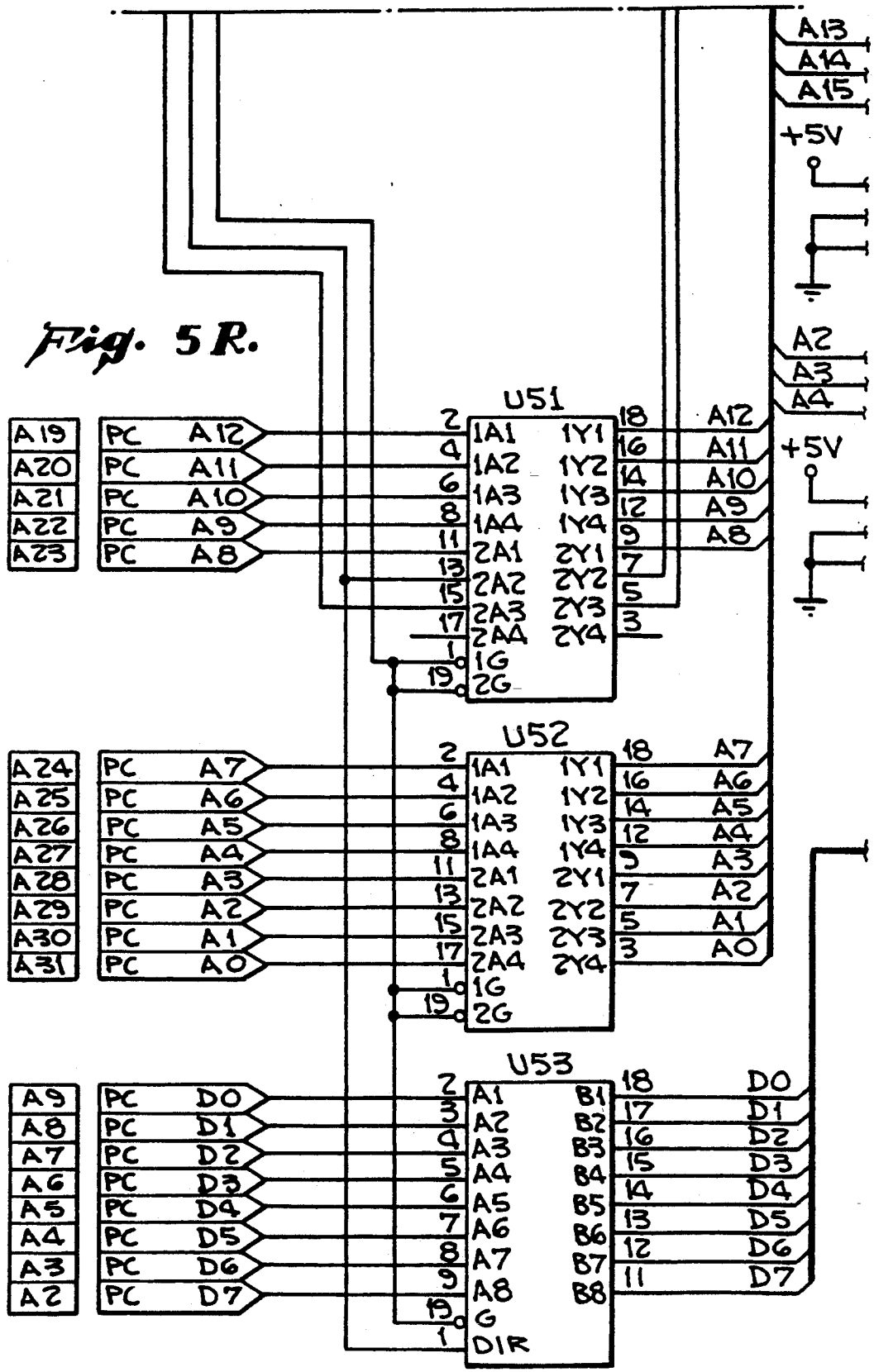

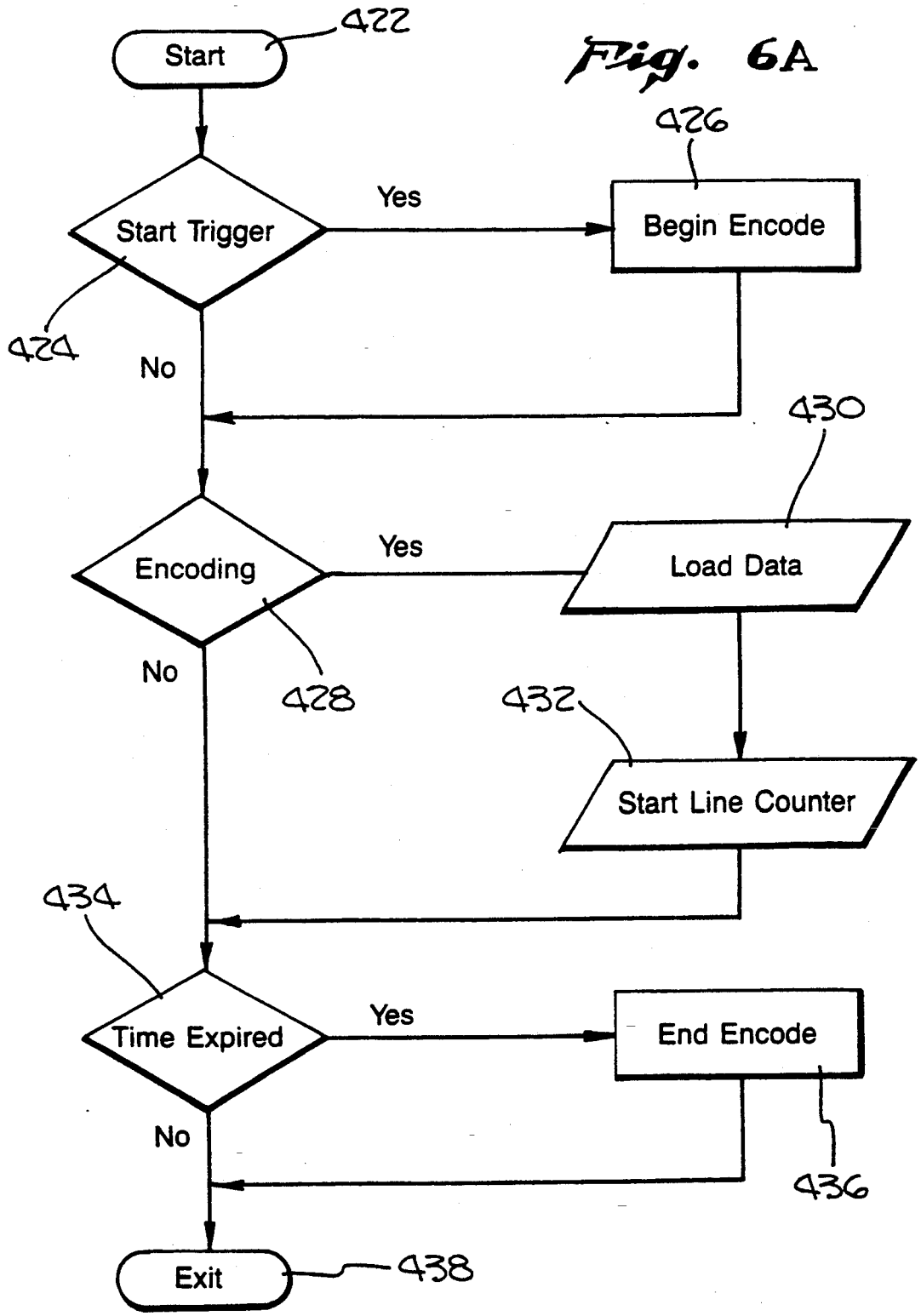

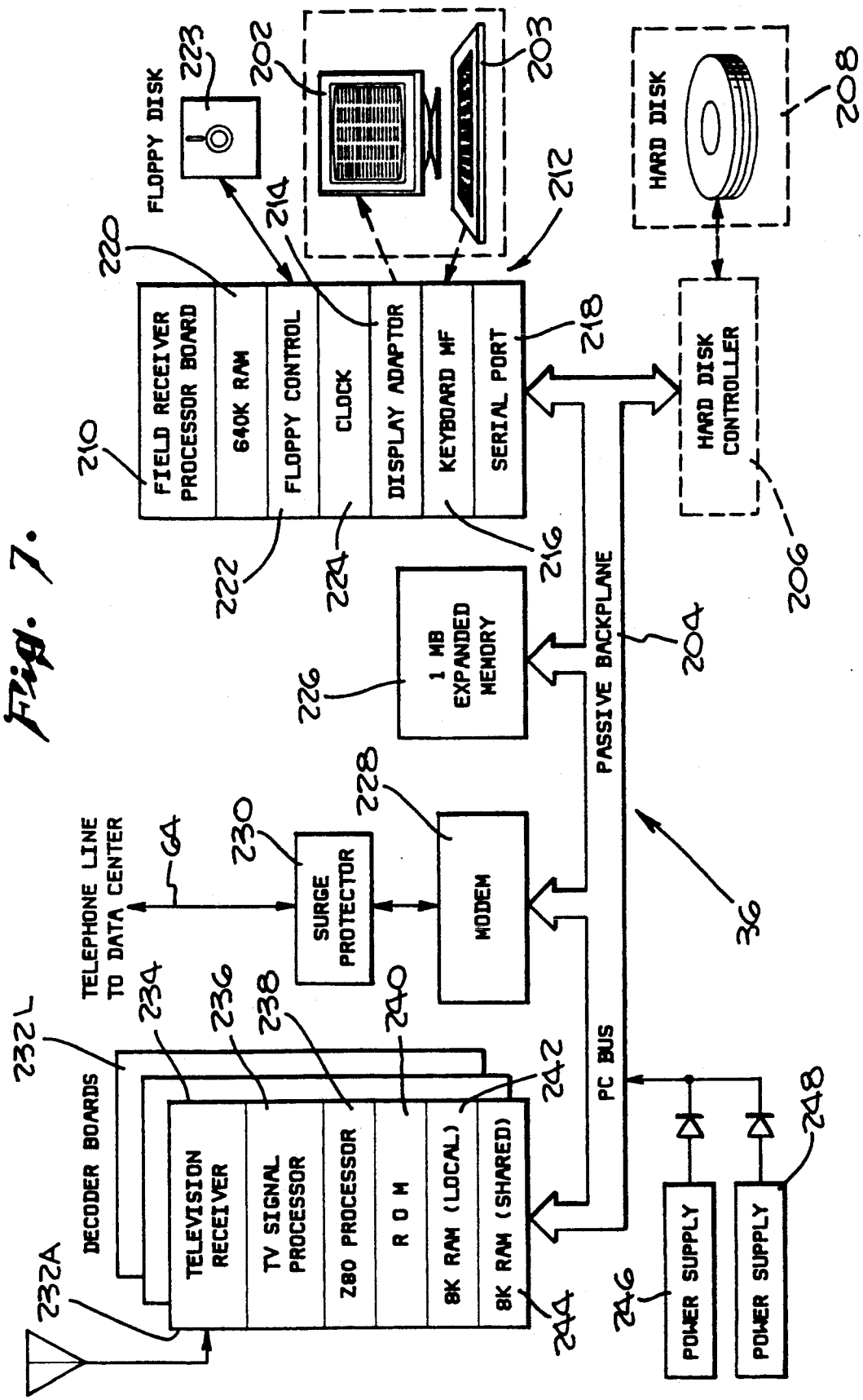

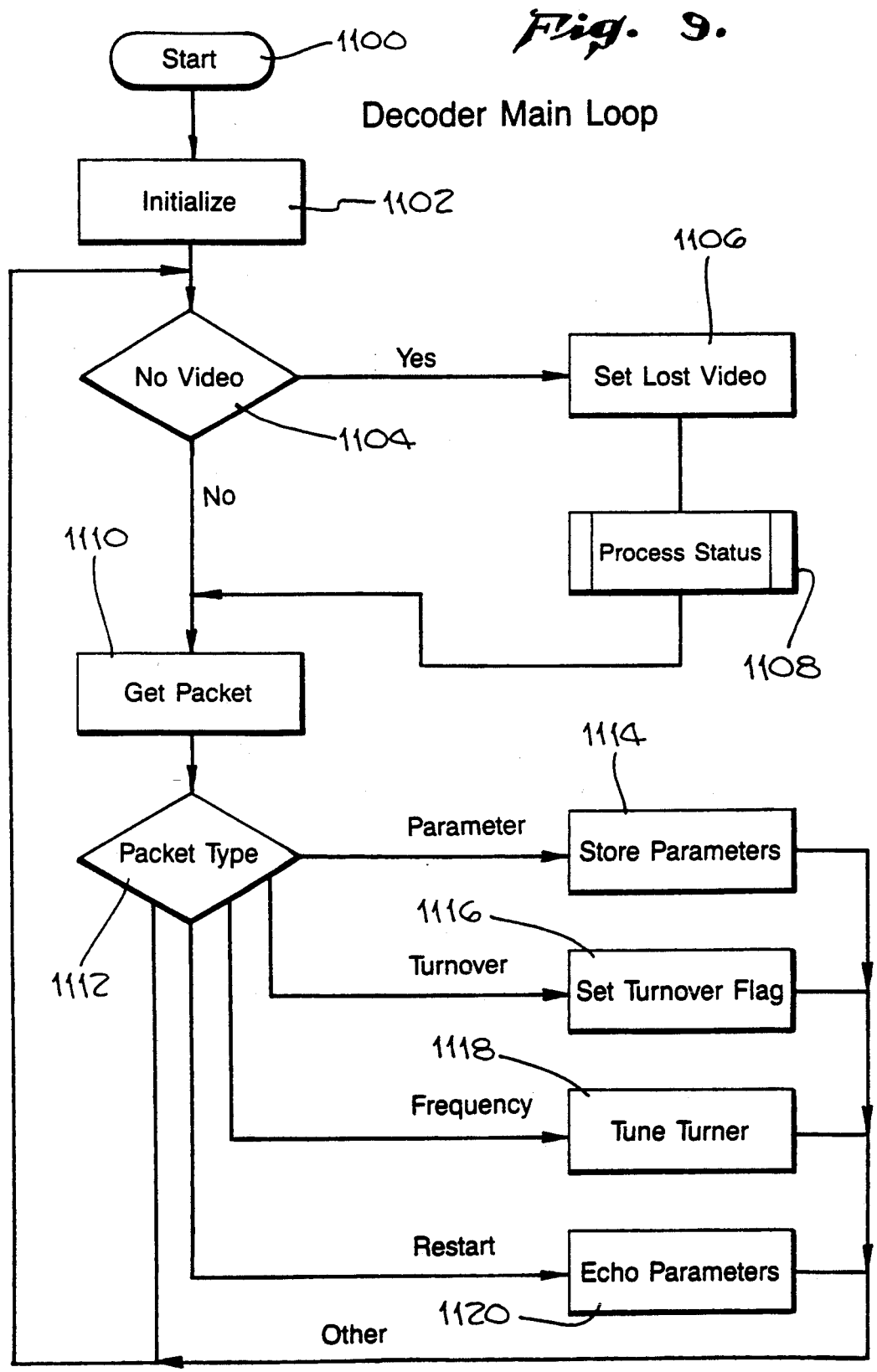

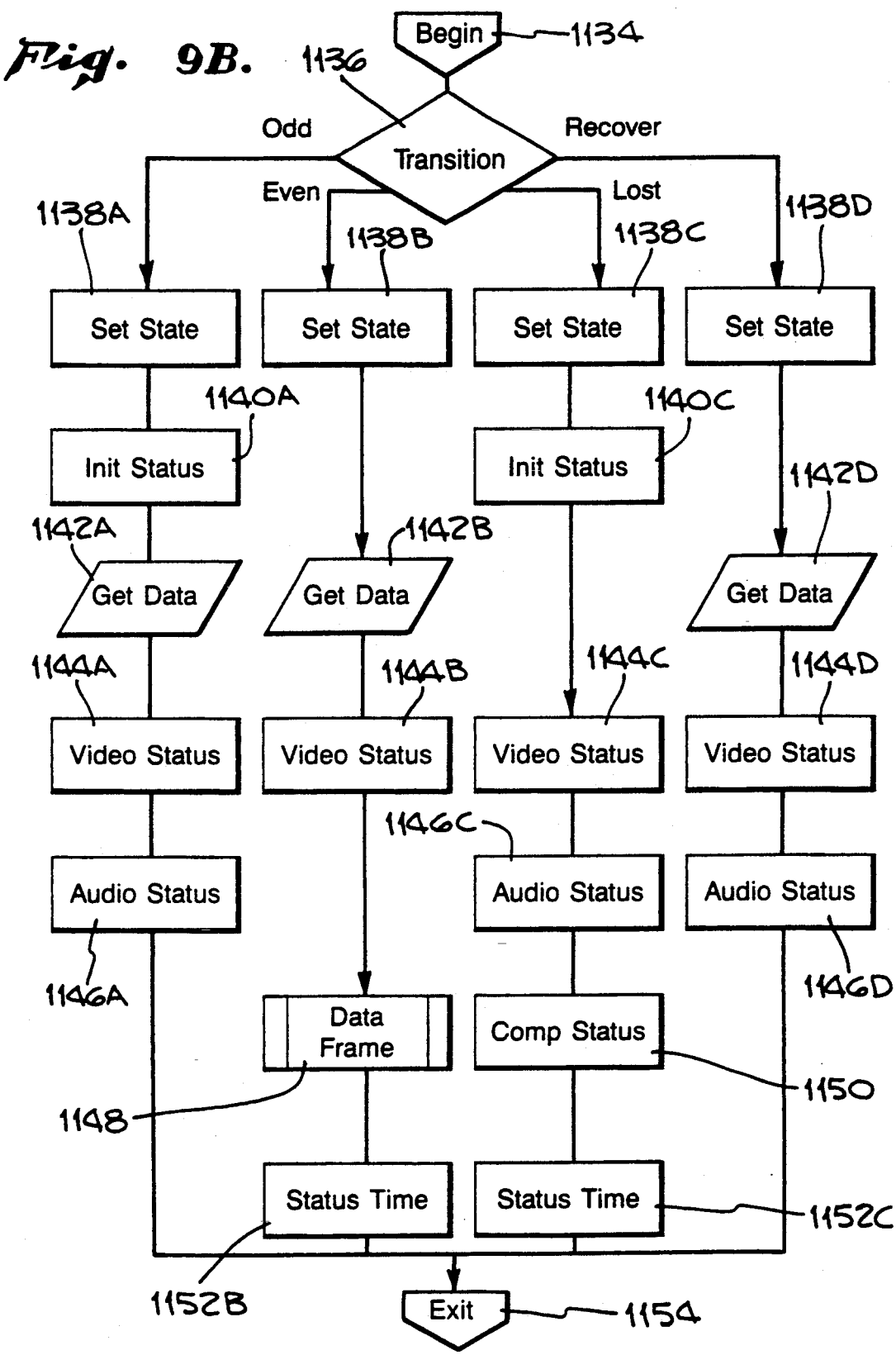

Data Frame

Fig. 14.

Syndication Clearance Report
Show by Market
Television

Reporting period: 01-28-89 to 01-28-89
Report date: 01-30-89

Market:
Syndicator: America's
Show: Episode #40

Episode:
Length: 28:25:26
Encode Date: Jan 25, 89   5:07:21 (HH:MM:SS)

|  | Broadcast Air Time | | | Broadcast ATX Code Time | | |
|---|---|---|---|---|---|---|
|  | Start HH:MM:SS | End HH:MM:SS | Run Time MM:SS | Start MM:SS | End MM:SS | Run MM:SS |

Broadcast date: Jan 28, 89
Channel:

|  | | | | | | |
|---|---|---|---|---|---|---|
|  | 07:20:22 | 07:20:52 | 00:30 | 20:04 | 20:34 | 00:30 |
|  | Total Air Time | | 00:30 | Total ATX Time | | 00:30 |

Broadcast date: Jan 28, 89
Channel:

|  | | | | | | |
|---|---|---|---|---|---|---|
|  | 10;59:47 | 11:06:42 | 06:54 | 00:00 | 06:54 | 06:54 |
|  | 11:08:42 | 11:16:04 | 07:22 | 07:57 | 15:18 | 07:21 |
|  | 11:17:04 | 11:21:16 | 04:11 | 16:23 | 20:34 | 04:11 |
|  | 11:23:46 | 11:29:32 | 05:46 | 22:38 | 28:23 | 05:45 |
|  | Total Air Time | | 24:13 | Total ATX Time | | 24:11 |

|  | Local Time | | | Local Time | | |
|---|---|---|---|---|---|---|
|  | 11:06:42 | 11:08:42 | 2:00 | 6:54 | 7:57 | 1:03 |
|  | 11:16:04 | 11:17:01 | 1:00 | 15:18 | 16:23 | 1:05 |
|  | 11:21:16 | 11:23:46 | 2:30 | 20:34 | 22:38 | 2:04 |
|  |  |  | 5:30 |  |  | 4:12 |

Fig. 15.

Syndication Clearance Report
by Market — by Episode

Market:

Syndicator: Television

Show: America's

II. What Airtrax (ATX) encoded on the show tape prior to broadcast

Episode: 40

Show Length: 28:26

Encoded Date & Time: (hr:min:sec)

| Time In (min:sec) | Time Out (min:sec) | Length (min:sec) |
|---|---|---|
| 0:00 | 6:56 | 6:55 |
| 7:58 | 15:20 | 7:22 |
| 15:53 | 20:36 | 4:43 |
| 22:09 | 28:26 | 6:17 |
| Total Encoded Length | | 25:17 |

Fig. 16.

Local Commercial Time

| | | |
|---|---|---|
| 6:55 | 7:58 | 1:03 |
| 15:20 | 15:53 | :33 |
| 20:36 | 22:09 | 1:33 |

Total Show Length    28:26

Commercial Time Within Show Length

| Time In (min:sec) | Time Out (min:sec) | Length (min:sec) | ISCI/Description | |
|---|---|---|---|---|
| 5:55 | 6:10 | :15 | MZJS-1531 | Mars Skittle |
| 6:10 | 6:25 | :15 | BEOX-8108 | Oxy |
| 6:25 | 6:55 | :30 | KODC-8305 | Diet Coke |
| 13:50 | 14.20 | :30 | NEAW-8083 | Nestle |
| 14:20 | 14:50 | :30 | NXSC-9143 | Noxell |
| 14:50 | 15:20 | L30 | YTXT-8197 | Tambrands |
| 20:06 | 20:21 | :15 | MXSD-8102 | Mars Kal Kan |
| 20:21 | 20:36 | :15 | NXCU-9255 | Noxell |

Total Commercial Time    3:00

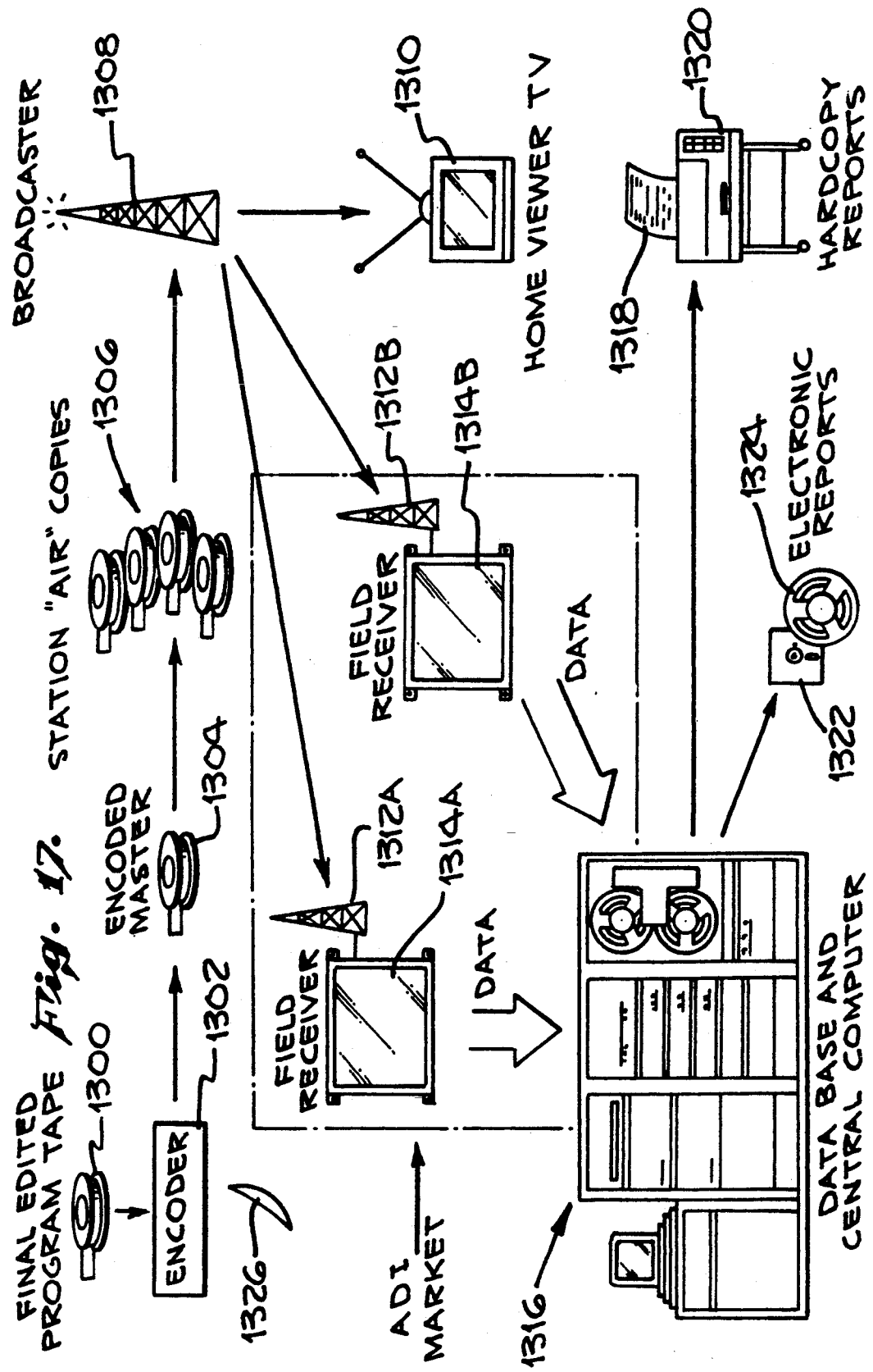

METHOD AND APPARATUS FOR VIDEO SIGNAL ENCODING, DECODING AND MONITORING

TECHNICAL FIELD OF THE INVENTION

The present invention relates to the field of monitoring or tracking of video program material broadcasts. More particularly, the present invention relates to a system for encoding a video signal desired to be monitored with unique continuous and contiguous digital codes for later precise and accurate detection of the broadcast.

BACKGROUND OF THE INVENTION

More than $25 billion was paid in 1988 to networks and stations for the broadcasting of television commercials and programs. During the past several years, the number of stations, cable systems and cable channels have greatly increased, thereby increasing the total number of hours that programs and commercials are transmitted for television reception. For 1989, it is estimated that more than 300,000,000 programs and commercial messages will be broadcast in the United States. In view of the multibillion dollar investment that purchasing of broadcast time involves, it is extremely important to accurately monitor each and every broadcast that is paid for. Often, a program or commercial is not broadcast at the time that was contracted and paid for. There is an increasing need, therefore, for a system that can monitor programs and commercials and accurately and efficiently determine the occurrence of the broadcast, as well as the exact length, source, date, and time thereof and the quality of the monitored signal.

Various prior art systems have been developed over the years in an attempt to fulfill the above-described need. However, all of these prior art systems suffer from serious drawbacks, and do not perform with sufficient reliability or accuracy. U.S. Pat. Nos. 3,919,479; 4,025,851; 4,230,990; 4,613,904; 4,639,779; and 4,739,398 are examples of such prior art systems. Typically, videotapes for which broadcast time is purchased, are syndicated television shows or are independent stand alone commercials. The syndicated programs typically have television commercials which are combined with and integrated into the syndicated program tape. Independent stand alone commercials are separate tapes which are broadcast independently from the television program.

The most basic method of monitoring is, essentially, a manual method which is dependent upon individuals monitoring and logging desired information about each broadcast. This prior art manual method suffers from the obvious drawbacks of being unreliable and very expensive because it depends upon the accuracy and attention span of the large number of individuals who monitor each broadcast.

Another prior art system employs pattern recognition in analyzing the video signals. This method attempts to match the pattern produced by a program, or portions thereof, to the pattern of various programs or commercials stored in memory. The matching of the program pattern to the pattern stored in memory occurs as a result of a search of a very large sized database consisting of an extremely large number of individual samples. This system has many drawbacks, however, such as, for example, the requirement of the extremely large database and unreliability due to signal distortion and the fact that only partial samples are obtained for matching.

Another prior art method for monitoring broadcasts employs an active and unique code for each program and/or commercial. The code is placed into the scan-line of the vertical blanking interval (scan-lines 14 through 21 of both fields 1 and 2 or odd and even). There is, however, no standardized way in which broadcast or television station video signal processing equipment treats the vertical blanking interval. Very often, identification codes placed in the vertical blanking interval of program material to be aired are stripped out of the video signal by the processing equipment during tape duplication or station broadcast. Further, this method generally relies on a code which is not continuously variant along the length of the videotape. This makes it difficult, if not impossible, to accurately determine whether the broadcast had complete audio and video components, the length of the signal and the arrangement of the airing order of the monitored material.

Another prior system employs an identifying code on scan-line 22 of the video signal. This method does not, however, decode the signal continuously and contiguously, throughout the entire broadcast desired to be detected, and, instead, is detected only in random fashion across the entire length of the program, (generally a short commercial), thereby preventing the accurate determination of whether the program or commercial ran for its full length, or which parts, if any, of the television program material were missing from the transmission or just missing from detection.

Typically, the prior art systems, that employ some form of encoding, monitor the signal by scanning from channel to channel, as opposed to continuously monitoring each channel without interruption. This prior art scanning method permits loss of data due to breaks in the observing process. The accuracy of this prior art scanning method is also proportional to the number of stations being scanned, thereby resulting in a loss of accuracy and reliability. Gaps in the continuity of the program material or a momentary loss of audio or video signal, are thereby repeatedly permitted to go undetected. Additionally, scanning requires the identifying data of the encoded signal to be compressed into a portion of the video format. This compression requires a very fast data rate in order to compensate for the breaks in the observing process. The compression of the identifying data of the encoded signal is highly vulnerable to noise, such as noise arising from multipathing of the broadcast signal, and thereby is often and easily distorted. This distortion creates further inaccuracies and lack of reliability in the monitoring process. Further, none of these systems monitor, at a desirable level of accuracy and reliability, the quality (i.e. in visual and audio components) of the monitored signal. Moreover, the encoding methods of these prior art systems often lead to inaccurate decoding, and thus monitoring, due to failure to perceive the coded scan line, either correctly for each frame, or nowhere near continuously for each frame.

Another problem which the prior art fails to address is the situation encountered when encoding and decoding syndicated television programs. Although such programs have television commercials integrated into a continuous tape in addition to the syndicated television program material, such tapes also have blank spots which roughly correspond to the duration of independent stand alone commercials. These time slots appear on the tape of the syndicated television program as black portions or "time away" portions. During the time away portion of a syndicated television program tape, during broadcast, an independent stand alone commercial, television station promo or other type of stand alone tape, is broadcast from another video tape player. The length of time of the independent broadcast does not necessarily coincide with the length of the time away portion of the syndicated television program tape. Under the prior art systems, since they do not number or do not otherwise individually and uniquely identify each and every frame, it is extremely difficult, if not impossible, to determine the amount of time away. Adding to the problem is the fact that the time away does not necessarily correspond to the length of time that independent stand alone video material has been broadcast.

None of these prior art systems continuously and contiguously encode and number or otherwise individually and uniquely identify every frame of a video signal desired to be detected. None of these systems continuously monitor, without interruptions due to scanning, a broadcast frequency or channel of interest. In view of these drawbacks as well as others, all of these prior art methods suffer from an undesirable recovery rate of the signal being monitored and a resulting lack of accuracy and/or completeness in monitoring.

SUMMARY OF THE INVENTION

It is an object of the present invention to provide a system for the accurate and complete monitoring of a broadcast signal desired to be detected without the introduction of appreciable noise and at a data recovery rate ascertainably more accurate and much higher than has heretofore been achieved.

It is yet another object of the invention to provide an apparatus and method for receiving and recovering the video signal desired to be monitored, detecting all critical data about the signal and continuously recording the conditions of broadcast and reception surrounding the recovery of the desired signal. Placing the "recovery-condition" data into formatted data records in a way so as to be able to distinguish between all individual instances of broadcasts of the desired signal or any portions thereof, the source, time and/or date and the conditions of dissemination, as well as other distinguishing characteristics of the signal desired to be observed, is still a further object.

A further object of the present invention is to provide a unique apparatus and method for identifying video signals, with a high degree of accuracy, independent of the content of the signals, where and when they were broadcast, the number of channels in the broadcast area and the number of transmissions of the same signal.

It is still another object of the present invention to provide a system and apparatus which may accurately determine, on a frame-by-frame basis, the occurrence and transmission, and the quality of reception, of each broadcast desired to be detected. Still further objects will become apparent to those skilled in the art after reading the following specification.

The above and other objects are achieved in a system for monitoring the broadcast or dissemination of video program material which comprises an encoding means for continuously encoding each contiguous frame of a video tape on which material to be broadcast is stored, the code having a first part that repeats a unique program material identifier indicating the time, date and place of encoding, and having a second portion that varies in a predetermined unique and non-repeating sequence which varies from frame-to-frame or field-to-field along the entire length of the tape, thereby numbering or otherwise individually and uniquely identifying each and every frame of the video program material desired to be detected and monitored, along the entire duration of the contiguous video program material, beginning at or before the first frame of the programmed material and continuing to at least the last frame thereof.

The present invention encodes the data and the complement of the encoded data on opposing interlaced scan lines and then continuously compares the complemented pairs to determine the presence of a code. Inaccuracies due to failure to determine the presence of code are thus greatly reduced if not completely eliminated.

The present invention also includes a receiving method and apparatus for continuously, without scanning from channel to channel, receiving and decoding the encoded broadcast signals, thereby monitoring each and every frame of a received signal determining the quality of each frame of the received signal in correlation to the occurrence of the signal. The receiving method and apparatus of the present invention produces information indicative of the quality of the received signal as distinguished from signal degradation due to problems in the receiver. The receiving method and apparatus also include a sequence detector for detecting whether each frame of the pre-encoded sequence was received in the same sequence as it was encoded. The method and apparatus of the present invention also accurately determines "time away" from the encoded video signal.

In an application of the present invention, a video tape, having video program material to be broadcast recorded thereon, is encoded with a unique code having a first portion and a second portion of the code which varies in a predetermined sequence along the entire length of the tape. Both the first portion and the second portion are independent of the program contents of the tape. The first portion of the code contains information representative of, at least, the particular encoder that encoded the tape and the date and time at which the tape was encoded so that the identifying codes placed on a particular tape are unique with respect to any other original of the encoded tape. The second portion of the code numbers or otherwise uniquely identifies each and every frame of the encoded tape from the first frame of the broadcast desired to be detected.

A video tape desired to be monitored may be encoded at a central location, a post production facility, a television station or any other video production or dissemination facility. Because the unique encoding apparatus of the present invention is relatively compact and easy to install and operate, the video program material may be encoded at any desired location. Once the video program material is run through the encoding apparatus of the present invention, the unique codes are present along the entire length of the video program material. Later detection and decoding of the encoded signal contained within the video program material resident on a tape will then automatically occur whenever the tape is broadcast, completely irrespective of any scheduling changes in the broadcast of the tape, with a recovery rate superior to prior art methods.

A data center may be established in accordance with the concepts of the present invention to correlate the information received and decoded to the original encoded format to create reports as to the date, time and location of the encoding of the detected signal and the correlation of the detected signal to the surrounding video program material.

The field receivers of the present invention continuously monitor, without scanning from channel to channel, each channel on which television signals are broadcast in all media markets desired to be monitored. Because the present invention permits the continuous and non-repeating encoding and numbering of every frame of the video signal desired to be detected, the video signal is continuously monitored and accounted for on a frame-by-frame basis, which is the smallest unit of a video signal or video tape that can be edited. Any discontinuities in the sequence of the video program material on the tape, such as frames missing from the sequence of the encoded signal, are therefore accurately and precisely detected. Complete data concerning each frame of the sequence in which the encoded program material was broadcast, the completeness of each and all segments of the encoded program material, the time it started airing, the length it aired, and the time it stopped airing, as well as complete information describing the quality of the broadcast, is therefore accurately obtained. Because the present invention permits the encoding, decoding and accounting for each and every frame of broadcast signal, "content-change-points" of the monitored signal segments interspersed in a tape of a video program material or television broadcast can be precisely determined, from the first frame of the "content-change" to the last of each and every such change.

In order to distinguish between a condition of transmission and a condition of reception, the present invention employs two field receivers, placed far enough apart geographically and electrically, so as to determine that the condition observed was one of transmission and not reception.

The encoder of the present invention inserts digitally represented data on a scan-line of a television or other video signal while producing no changes in the remainder of the signal. In the present invention, the unique code is continuously summed with the video signal and keyed at appropriate times. The incoming video signal is switched off only after being clamped to a certain level, and the data is then inserted. The video signal is again clamped after insertion of the data, when the incoming video has been reinstated and data keying has ceased. Thus, far less noise is introduced into the encoded video signal due to data insertion than is introduced in the prior art encoding methods.

BRIEF DESCRIPTION OF THE DRAWINGS

FIG. 1A is an example of a client table in the encoder data base of the system of FIG. 1;

FIG. 1B is an example of a client information screen of the system of FIG. 1;

FIG. 1C is an example of a program information screen associated with the system of FIG. 1;

FIG. 1D is an example of a program commercial table used in the system of FIG. 1;

FIG. 2 is a diagram illustrating the structure of the data placed on a tape by the encoder of the system of FIG. 1;

FIG. 3 is a diagram of the general data packet format used in the system of FIG. 1;

FIG. 3A is a list of data packet types and their functions, used in the system of FIG. 1;

FIG. 3B is a diagram of the program identifier packet format used in the system of FIG. 1;

FIG. 6A and 6B are flowcharts of the inserter field interrupt and the scan-line interrupt routine associated with the program of FIG. 6;

FIG. 7 is a block diagram of the field receiver assembly of the system of FIG. 1;

FIG. 8A, 8B, 8C-1 and 8C-2, when assembled from left to right, form a block diagram of the timing generator and the data recovery portions as well as the microprocessor interface portion of the field receiver assembly of FIG. 7;

FIG. 9 is a flowchart of the main loop of the decoder program used by the microprocessor of FIG. 8B;

FIG. 9B is a flowchart of the process field transition routine of FIG. 9A;

FIGS. 14 and 15 are illustrations of types of report which may be generated by the system of FIG. 1;

FIG. 16 is an illustration of a second type of report which may be generated by the system of FIG. 1; and FIG. 17 is a system diagram of another application of the present invention.

DETAILED DESCRIPTION OF THE INVENTION

In the following description, for purposes of explanation, numerous details are set forth such as specific memory sizes, data paths, word sizes, bit designations, data path widths, circuit components, display screen menus, data bases, etc. in order to provide a more thorough understanding of the present invention. However, it will be apparent to one skilled in the art, and it is fully intended herein, that these specific details are not required in order to practice the present invention. In other instances, well known electrical structures and circuits are shown in block diagram form in order not to obscure the present invention unnecessarily.

Figure 1:
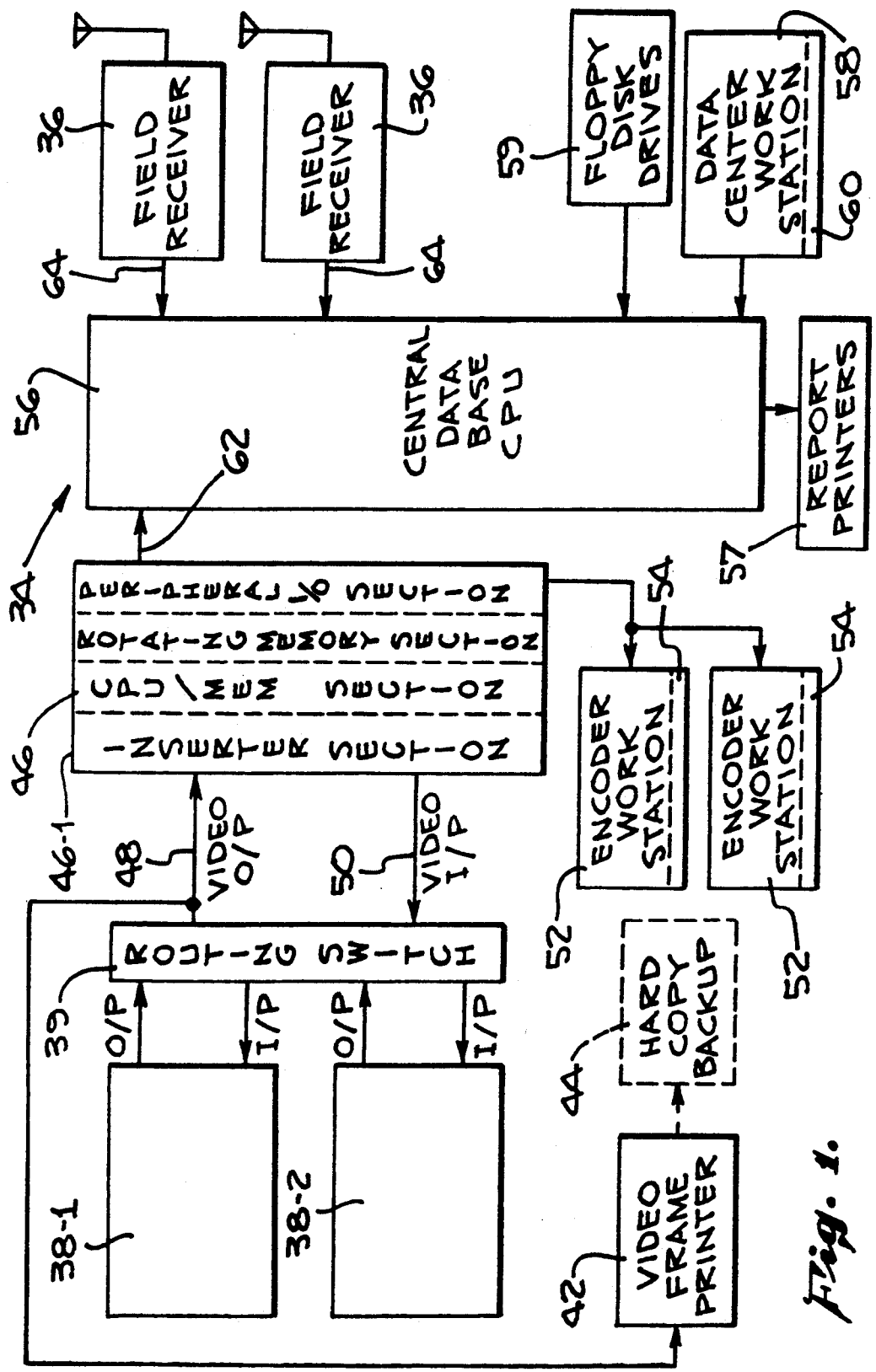
FIG. 1 is a system diagram of an application the present invention.

In FIG. 1, there is shown a block diagram of an overall video tape mastering center system employing the unique concepts of the present invention. In the system described in FIG. 1, the concepts of the present invention are employed in an overall system which includes the encoding of a tape master and the duplicating of the encoded tape for later correlation to the encoded tape after broadcast. It will be appreciated, however, that the concepts of the present invention are not limited to the overall system of FIG. 1. For example, the encoding of the tape desired to be detected can occur at a post production facility, network or other location independent of the system shown in FIG. 1, due to the unique encoder of the present invention, which is easily installed and operated at any desired facility. A duplicate of the encoded tape can later be obtained from the post production facility or network for later extraction of the encoded data. The system of FIG. 1, therefore, is herein described for purposes of illustration and not restriction to a particular format.

The system described in FIG. 1 includes a data center 34 and a pair of field receivers 36. The field receivers are located at different sites in the media markets desired to be monitored and are located far enough apart, electrically and geographically, so that any problems due to faulty reception can be accurately determined. Multiple pairs of field receivers, if necessary or desired, may be employed. An encoder 46 is in communication with one or more encoder work stations 52, each having a CPU, keyboard or other data input means 54.

In the preferred embodiment, complete client information of a party who desires the broadcast to be monitored is stored in a data base, which may also be encoded in the tape. This client information, however, is not critical to the encoding. Absent client information, the tape will be encoded with a unique identifier that identifies the tape but not a particular client. An operator may use one of the work stations to invoke information which is to be displayed on a CRT screen or other display means (FIG. 1C). It will be appreciated that other formats for entering data and initiating operation of the present invention can also be employed other than the format described below with respect to FIG. 1C.

When the program information is first invoked, a unique program material identifier is automatically assigned and, in the format of the preferred embodiment, appears on the screen of the CPU as the topmost item thereon shown. The operator then enters the client using "query by example" capability of the present invention. The client number or name is stored in the encoder 46 data files. If the client of interest cannot be located by the operator, the operator is automatically required, in the preferred embodiment, to exit the program information screen of FIG. 1-C and select the client information screen of FIG. 1-B. By completing the appropriate information requested in FIG. 1-B and then returning to and proceeding with completing the "program information" of FIG. 1-C.

When a video tape is desired to be encoded, the operator may initiate the encoding session of the present invention. Each encoder unit 46 identifier number, the Encoded Date and the time are then assigned automatically without intervention by the operator. Encoding may also be initiated without client information, if none is available, which may be the case if the tape is encoded at a post production facility or network. The next item to be supplied as an entry by the operator is Encode Length in non-drop frame units. This length will have been previously predetermined. The tape length information is then entered as minutes, seconds, and frames by the operator to encoder 46. Other identifying indicia of the broadcast material, if available, is entered by an operator, such as, for example, agency name, program, title information, Industry Standard Commercial Identifiers (ISCI Codes), any desired attribute information or other data.

A video tape recorder/player 38-1 is loaded with the video tape that is desired to be encoded and later monitored. Recorder/player 38 has its output selected through a routing switcher 39, which, in turn, feeds an inserter section 46-1 of the Encoder 46. Video information from recorder/player 38-1 will thus pass along video path 48 through encoder 46 and then, in turn, as determined by routing switcher 39, along video path 50 to a second tape located on recorder 38-2, where it will be recorded simultaneously with the playback occurring on tape machine 38-1. The tape is encoded with a first portion having a first part that repeats a unique program material identifier indicating the time, date and place of encoding, and having a second portion that varies in a predetermined unique and non-repeating sequence which varies from frame-to-frame or field-to-field along the entire length of the tape, thereby numbering or otherwise individually and uniquely identifying each and every frame of the video program material desired to be detected and monitored, along the entire duration of the contiguous video program material, beginning at or before the first frame of the programmed material and continuing to at least the last frame thereof.

The unique identifying code thus inserted into the tape recorded on tape machine 38-2 possesses, in addition to all the video information sourced from playback machine 38-1, an identifier unique to the time and date of the encoding and a unique serial number. Encoder section 46 inserts this data on scan-line (22) of a video signal (or other FCC authorized or desired scan-line of the video signal), but makes no other significant changes in the signal. As such, the observable content of the signal is not in any way altered. Any pre-existing codes or live video located on the encoded scan-line are overwritten by the insertion of the current code on the selected scan-line during the afore-described encoding interlude. As discussed, the tape inserted with the encoded information may be a syndicated television program having integrated television commercials and blank spots or an independent stand alone commercial.

The general content of the tape being encoded (i.e. whether it is a syndicated program or stand alone commercial and other content identifying indicia), if known, is stored in a memory of the encoder 46 upon completion of the above described playback encoding and re-recording procedure and correlated to the unique code. That data is later forwarded to memory at Central Data Base CPU 56 via a modem line 62. It will be appreciated that it may also be stored in a transportable memory such as floppy disk 59 for later retrieval and use. The encoded master tape may then be duplicated at a tape duplicating facility and distributed for televising by various television and/or cable systems. If the tape is being encoded at a post production facility or network, a video sequence detector, capable of detecting changes in the programming content of the video material being encoded such as, for example, a "promotional" commercial for a syndicated television program added on to the tape containing the specific episode of the syndicated show but not integrated as part of that show, could determine the occurrence of the first frame having the "slate" information (i.e. name and other identifying characteristics of the promotional commercial), digitize the entire contents of that frame and store it in memory for later transmission to a central data base. Complete information about that particular promotional commercial's identity would then be accurately obtained without the need for examination of a duplicate encoded tape. Such a video sequence detector has been invented by the inventors of the present invention.

Whenever the encoded tape (or any subsequent copy made therefrom) is broadcast in an area within the reception range of receivers 36, the unique identifiers included in the broadcast signals, and sourced from the encoded tape, are received by the field receivers 36. The field receivers 36 of the present invention continuously monitor, without scanning from channel to channel, every frequency desired to be monitored. The unique program material identifier, the time of day and date of reception, as well as the quality of the received signal, are noted and recorded in digital memory or other storage means at receiver 36. The identifying data from each received frame is mapped into selected memory locations in accordance with the count of the particular count being decoded so that the identifier can be assembled from memory, even when some of the frames are not received due to noise. Receivers 36 are routinely queried at predetermined intervals by the data center 34 and information about the received broadcast is sent from the field receivers 36 to the data center 34 via modem line 64.

All of the information received by receivers 36, which includes the unique identifier of the broadcast signal, as well as each received frame count and the number of each received frame, is then, in a preferred embodiment, later compared to a programming change point data profile extracted from a duplicate of the tape as broadcast. Thus, the unique method and apparatus of the present invention permits the precise determining of the amount of "time away" from the encoded broadcast signal. As previously described, the blank spots on a syndicated television program are encoded in order to maintain the continuity of the encoding along the entire tape. When the syndicated program is broadcast by a broadcasting station, at the "time away" interval, the station switches to an independent stand alone commercial which is either not encoded or is encoded with a different identifier than the syndicated television program of interest, the field receivers issue a first time stamp and frame identifying stamp, and a second time stamp and frame identifying stamp when the syndicated television program resumes broadcasting of the encoded signal. The length of the "time away" is then compared to the actual time period of the blank interval on the original syndicated broadcast in order to determine whether or not there are any discontinuities between the original syndicated television program and the way in which the program was aired. In this way, precise and accurate determination of the length of time away from the encoded signal can be determined.

The data center 34 of FIG. 1 includes a CPU 56 having a central database stored in memory and a desired number of data center work stations 58. Information about each client for whom television program material is being monitored may be entered into a client table in the data center database, as is indicated by FIG. 1A. The data center may then inform all encoders as to a particular client prior to requesting an encoder to encode program material for that client. This can be done by a data center operator or it can be done at the encoder 46 at the encoder work station 52 in the case where that operator needs to encode a tape for a client whose information is not yet in the system. In either case this arrangement prohibits duplication of client information. The data center will also inform the encoder 46 about the addition of the client information and vice-versa. To enter this information, the operator invokes a client information screen (FIG. 1B), and types in the required information for each of the fields, except a client identification field. The information for this field is supplied by the CPU 56, after the information for all the other fields has been entered.

Data communications and exchange between the CPU 56, the data center 34 and the encoder 46 most often occurs via modem 62. It will be appreciated that, alternatively, a duplicate of any of the above discussed information may be written to a floppy disk or other storage medium and delivered to its destination where it may be transferred into the local encoder.

When, using the combined information (client/program data/program identifier) and the master tape, an encoded master tape or "airtape" can then be produced and the related data records can be forwarded to the data center CPU 56.

When a tape, which has been encoded as previously described, is disseminated in a relevant market, field receivers 36 which are located in that market, detect the presence of the code in the signal and decode the unique identifier and frame count. Supporting architecture in receiver 36 records the time when the signal is received, any instances of the signal degradation beyond, a predetermined level for a period of more than a pre-determined number of frames, and other desired data regarding the conditions of broadcast or reception such as quality of the audio and visual signal. As later discussed in more detail, the field receiver supporting architecture and decoder apparatus produce a sequence of data packets that describes each frame of the program material as it was received. This correlates to the aired event as it was actually seen on a television set in the market area. These receiver data packets are termed herein as log files. Periodically, i.e. every twenty four hours, the computer 56 in data center 34 polls the field receivers to recover the log files.

As later described in more detail, CPU 56 analyzes the contents of the log files, combining the data into data clusters termed herein as "airings". Database updates are generated from the accumulated "airing" data. The transaction processor is driven by a stream of "data packets" from the log file of the receiver architecture, as also described in more detail below. A report generator manipulates data in the database to produce the data concerning the occurrence, quality and length of the broadcast in a readily ascertainable format.

SYSTEM TIMEKEEPING

Time-of-day accuracy can be established in the USA through the services offered by the National Institute of Standards and Technology ("NIST"); these include the WWV, WWV-B, and the ACTS services, as will be appreciated by those skilled in the art. Once such a stable local clock has been established and is continuously linked to and updated by the selected service, it can be linked to any of the system components, such as encoder 46, requiring accurate updating and correction of their hardware time-of-day clocks within the system. Software to establish such a link and conduct such a data communications interlude is well known in the art, examples of which can be obtained from NBS.

Alternative to utilizing either WWV or WWV-B and establishing a local stable clock, another NIST service can be utilized, known as the Automated Computer Time Service or (ACTS). The ACTS system allows a similar link-up via dial-up modem to be established between a field receiver (or other component requiring time) and a central stable clock. The clock in this case is not one established at the data center, but instead is established and maintained in Boulder, Colorado by the NBS. Examples of software required to establish such a dial-up modem link and conduct such a time setting interlude is available from the NBS. Such systems will provide a time setting accuracy of +/− 10 Milliseconds under worst case telco-line conditions.

The Encoded Data Format

While types of encoded video signals other than NTSC, such as PAL or SECAM encoded video signals, may be employed with the concepts of the present invention, the system is described herein with regard to the characteristics of NTSC video. Video in this format consists of 30 black and white frames per second. Each frame consists of two fields, known as the odd field and the even field, or field "one" and field "two". Each field consists of some number of horizontal scan-lines. The scan-lines of the even field and the odd field are interlaced on the screen, so that corresponding scan-lines from the two fields are immediately adjacent to each other in the picture.

Encoder 46 of FIG. 1 inserts, in the preferred embodiment, four eight bit bytes, or thirty two bits of data, on each scan-line that it encodes. A problem with prior art devices is that data encoded on a particular scan-line relative to the start of a field, (i.e. scan-line number 1) may be "slipped" to another scan line in the post-encoding tape duplicating process and/or the broadcast process, and appear within the NTSC format on a different scan-line than the one on which it was encoded, thereby causing the encoded data to be missed. In order to overcome this problem, the decoder of the present invention captures data from eight scan-lines of each field starting three to four lines prior to the scan-line that the data was encoded onto. The decoder then determines which of the captured scan-lines, if any, in any combination, across any plurality of adjacent fields and scan-lines, contain encoded data.

In a normal NTSC video signal, the odd fields and the even fields, which are interlaced to form the complete picture, will have almost identical patterns on corresponding scan-lines. To distinguish encoded data from normal video, the odd field of a frame is encoded with the logical complement or inverse of the data on the even field of that frame. This inversion sharply distinguishes the odd lines from the even field lines and permits the decoder in the field receivers 36 to accurately distinguish normal video information from encoded data.

The inverted data also enhances detection of transmission errors because any single bit that was altered in transmission would fail to match with its complemented bit in the next field.

Because the unique program identifier code of the present invention is longer than the amount of data that can be inserted on a single frame, it is encoded and transmitted into portions on successive frames. As the decoder of the receivers recovers the data from each frame, it reassembles the portions into a complete encoded signal packet. The decoder recognizes the start of the identifier and the correct position of each byte that follows. For this reason, if a portion of the unique code is lost during transmission, this portion may be recovered and placed in proper sequence when it repeats on successive frames.

The decoder determines at which frame, relative to the start of the complete program, the deleted broadcast started and ended. For this purpose, the encoder numbers each frame, in a contiguous and continuous manner. As such the precise beginning frame and ending frame of an encoded broadcast can be accurately determined.

Figure 8:
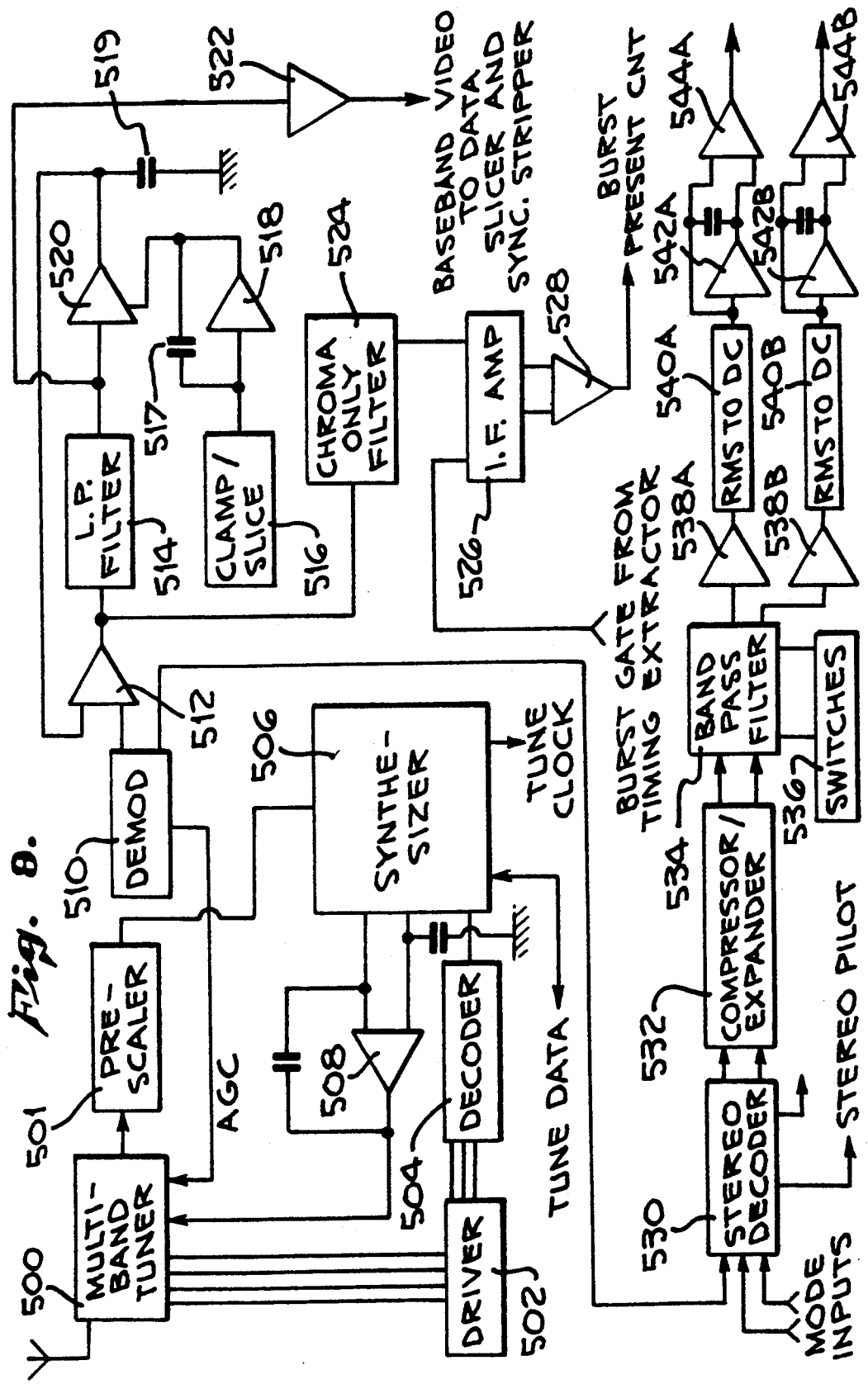
FIG. 8 is a block diagram of broadcast receiver and of the signal processing portions of the field receiver of FIG. 7.
Figure 8A:
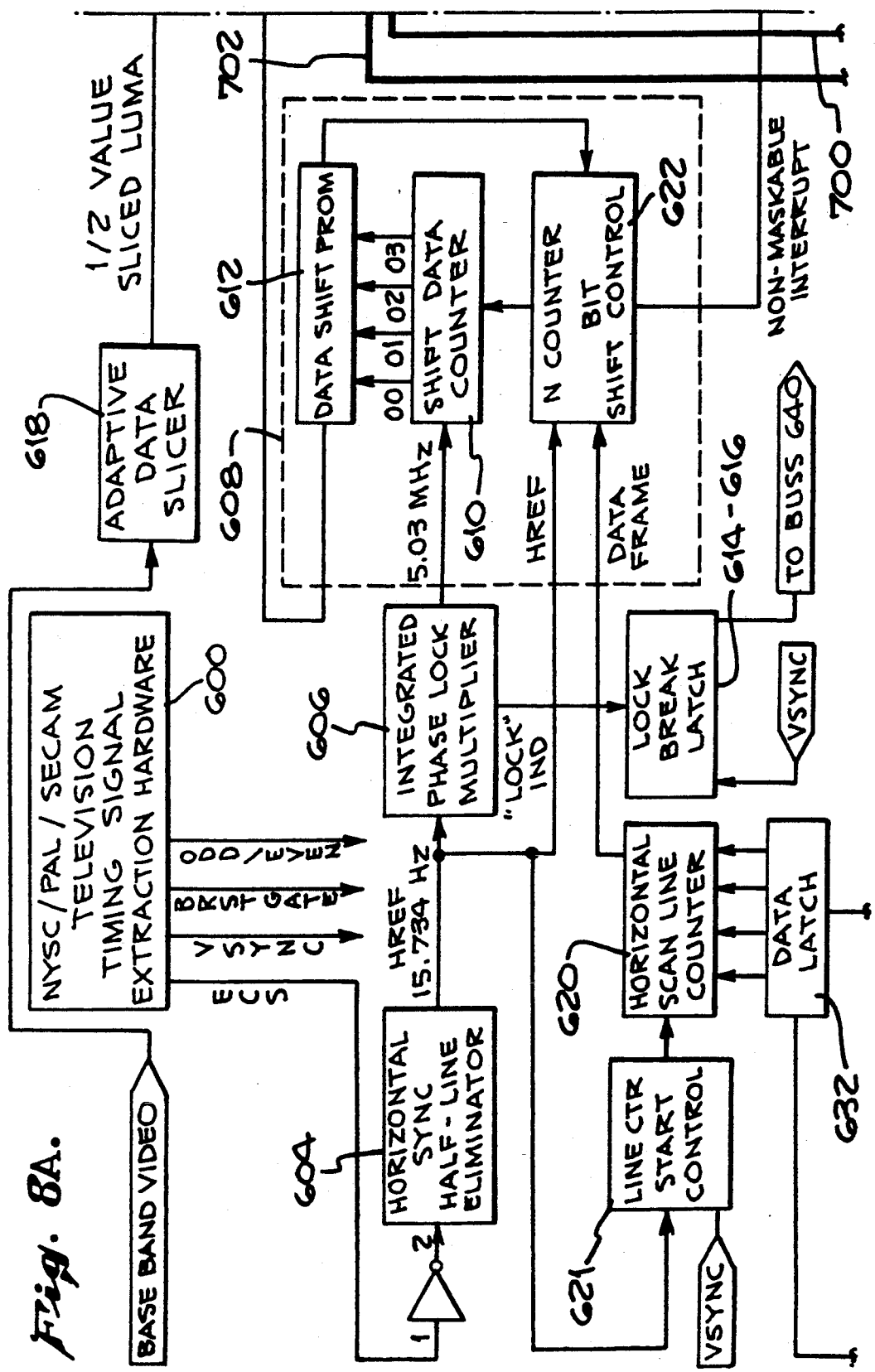
Figure 8B:
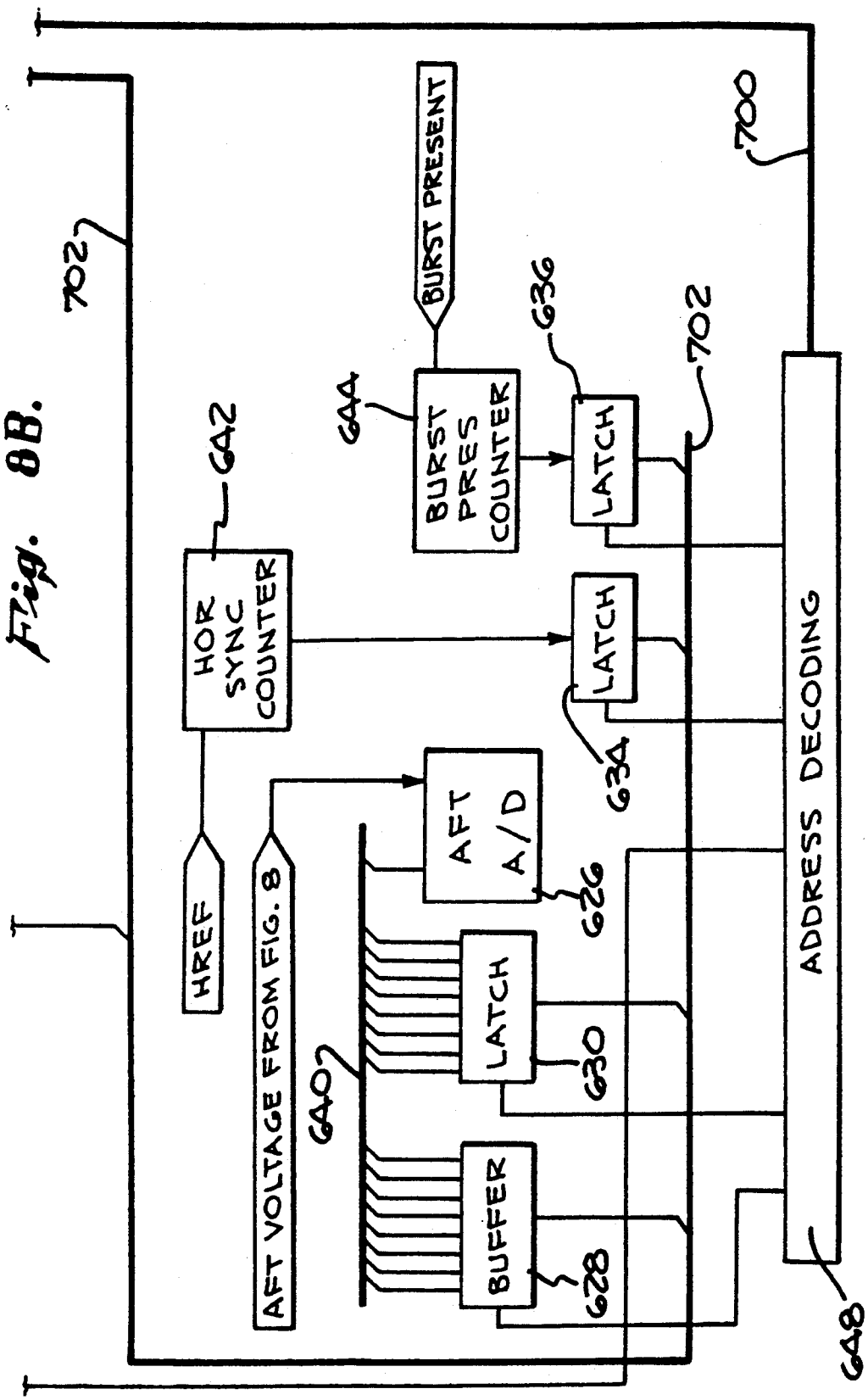
Figures 1, 8C:
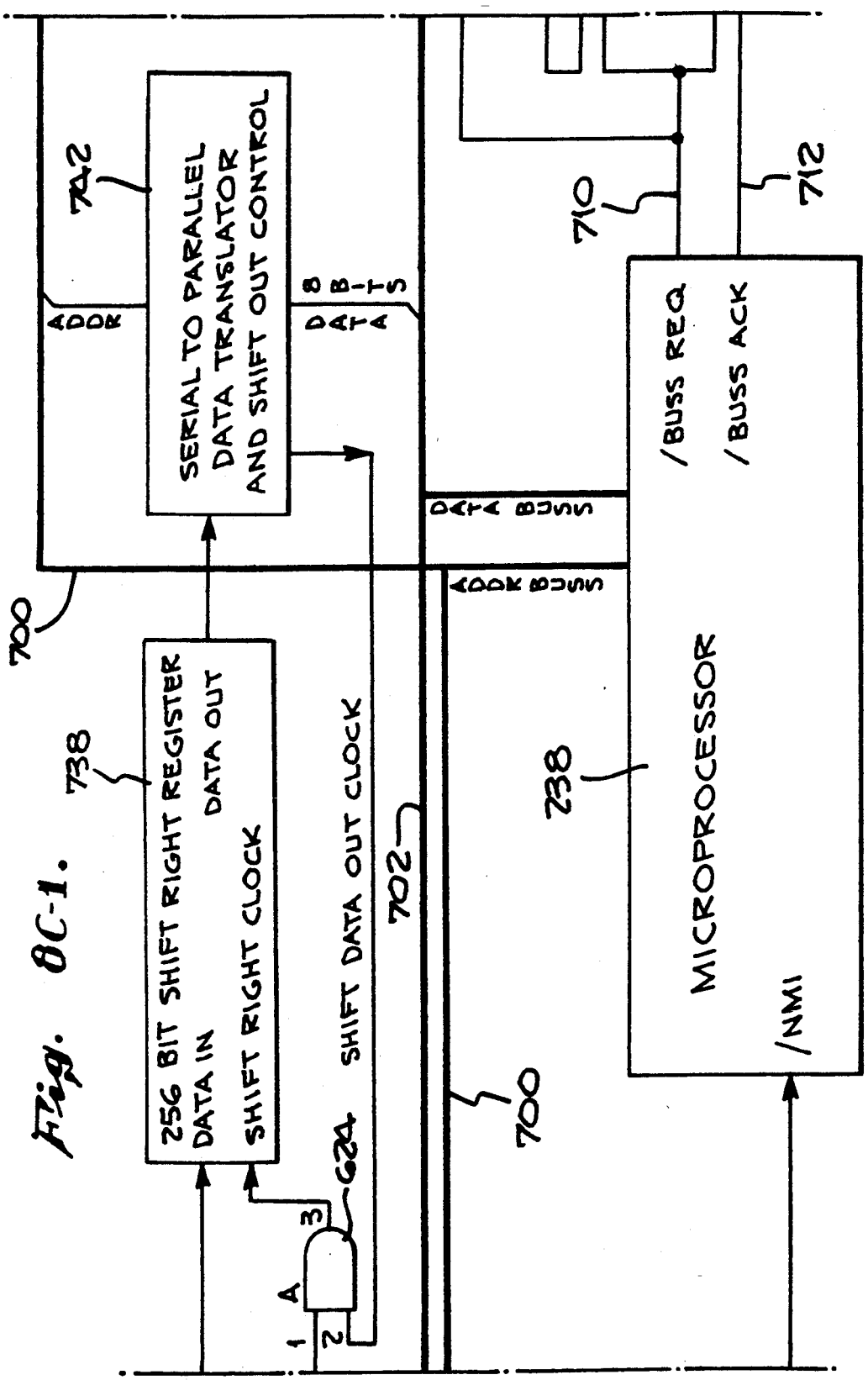
Figures 2, 8C:
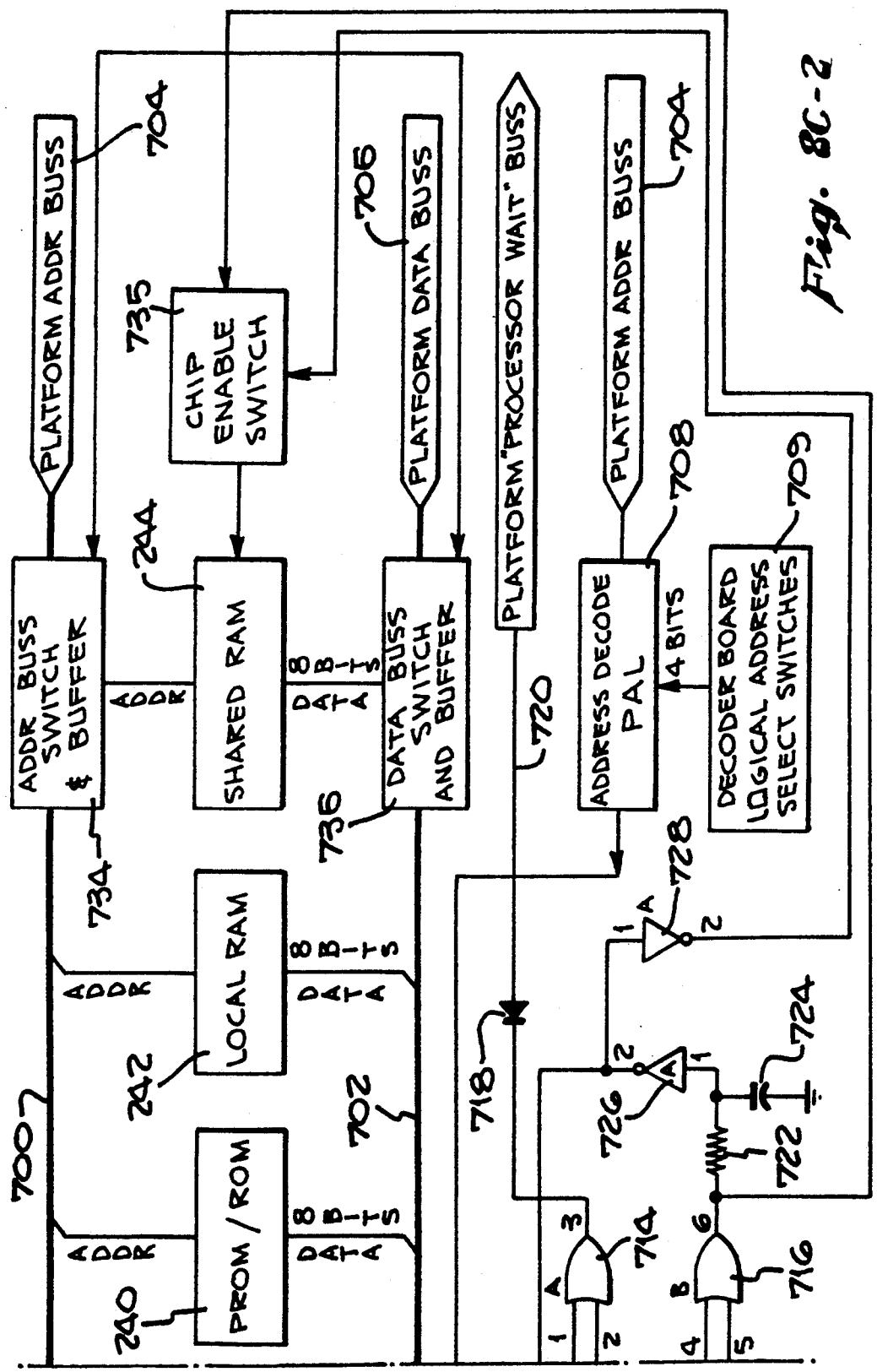

As illustrated in FIG. 2, in the preferred embodiment, the program identification data is placed on six successive frames of a video signal. More specifically, the first two bytes D(0) and D(1) are placed on the scan-line of interest, for such as scan-line 22 of the odd field of frame 0. The odd field of frame 0 also contains a low byte portion of a frame counter F(L) (zero in the ) frame of the program and incremented in every subsequent frame) and a high byte frame counter F(H) (also zero in the 0 frame of the program and incremented every time the low byte counter overflows). Counting each frame yields the highest level of precision and accuracy. It will be appreciated, however, that other arrangements, such as counting every second or tenth frame, may be employed using the concepts of the present invention.

The even field of frame 0 contains two bytes [Comp D(0) and Comp D(1)] which are the logical complement of D(0) and D(1) of the odd field of frame 0. The even field of each frame also contains a counter W (W=0 in the odd field of frame 0) which is incremented as each succeeding frame is encoded. A counter W starts over at zero each time the program identifier is repeated, to provide which word of data from the identifier is encoded on that frame. It is used by the decoder in reassembling the complete identifier, word by word as it is received. The final byte on the even frame is a check sum, which enables the detection of errors in the data.

The length of the message is defined as the number of frames required to encode the entire program identifier. Thus, in the preferred embodiment, six frames are used to encode twelve bytes of data in the identifier data packet. However, if a larger or smaller identifier is desired, a respective larger or smaller number of frames can be used. After the sixth frame, the program identifier is repeated in the next six frames.

The frame counter in the preferred embodiment counts a number of frames equivalent to one-half hour of video program length before it resets to zero. Programs longer than one-half hour are encoded as two or more consecutive segments with distinct but related program identifiers, each segment having a frame counter starting at zero. This avoids any limitation as to the length of time frames which may be counted, while the program identifier, in combination with the frame counter, constitutes a unique identification of each frame of encoded video, exactly as if each frame had been encoded with a frame number of greater than sixteen bit precision. Alternatively, each frame of a program may be numbered with an incrementing eighteen bit counter, the most significant bits of which are not utilized for programs of one half hour and shorter.

Because the program identifier data is distributed over six frames or more, a noise pulse which alters even one field of data might invalidate the reading of the identifier and require that another six frame sequence of data be perfectly acquired before a program identification could be made. However, as indicated above, in the present invention, each byte of data is stored into a memory location in sequence. Thus, when each of all twelve bytes has been received, even if this occurs non-sequentially, the sequence of the code can be assembled and is decoded, even if the reception quality is so randomly poor as to allow only one or two bytes of the twelve to be recovered on each six frame repetition of the encoded identifying signal.

DATA PACKET STRUCTURE

In the preferred embodiment, the encoder and decoders receive and transmit, respectively, data and commands in the form of packets. These packets are organized to have an overlying structure (format) that allows for flexibility and expansion, so that new packet types may be added without affecting software modules that do not need to process their contents. Packets of an unknown type are ignored or passed onward, as appropriate, by each software component.

For easy access, packet types are defined on a permanent system-wide basis, by defining symbols associated with the type identifier. A source file containing these arbitrary definitions describes what packet types exist and how they are used in the system.

The structure of the packets is illustrated in detail in FIG. 3. The first byte contains information concerning the length of the packet. When this information is decoded the software can duplicate or move a packet without regard to the remainder of its contents.

The second byte contains a packet type identifier, defining the class of the packet. For example, packets fall into the classes of time stamps, frame sequence discontinuity packets (FSD), status packets, and other packets, as more fully described below. It is the packet type identifier which enables the software to process the contents (remainder) of each packet in a manner appropriate to the class represented by the packet without examining the remainder of the content of the packet.

Subsequent bytes through the end of the packet, as indicated by the length byte, have a distinct format and interpretation according to the class of packet indicated by the type byte.

FIG. 3A is a table listing the types of data packets used in the system: This file defines the packet structures and packet type identifiers used for communication between the various parts of system 30, including inserters, field receivers, and the transaction processor in the data center 34. All of the data which passes through one of the shared memory window queues (described more fully below), is in the form of one of these packets. The data encoded on the video signal (not including the frame count and insertion count) is a packet. The log files produced by the decoders consist of a stream of packets.

A timestamp data packet is used in the preferred embodiment of the present invention to provide a time and date reference. A stream of packets in a log file is referenced with respect to the packets that follow the timestamp, up until the next timestamp packet. More specifically, timestamp packets are used by the decoder to set the time-of-day clock maintained by the decoder firmware, and by the decoder firmware time-of-day clock to mark the time of observed events for the transaction processor. The contents of a timestamp packet may include, for example, a word for the time of day expressed as the number of unit of time equal to 65536/1193180 of a second since the preceding midnight and a word for the date expressed as the number of days since Dec. 31, 1980. This reference date and time is commonly referred in the art as an "epoch."

A program identification packet is generated by the inserter software concurrently with the generation of a database update describing a program. The encoded identifier code, date, and the time of day, link the database entry with the program identifier packet. The program identifier packet is sent to the encoder, where it becomes the unique code of repeated data that is inserted into the desired video scan-line. It is recovered in the form of a packet, by the decoder firmware of the receivers and channeled to the log file. The transaction processor program reading the channeled log files uses the packet to identify which encoded television program material recorded has been observed.

Referring to FIG. 3B, the contents of the program identification packet, after the length and type bytes, includes a version identifier byte. This is simply a sub-modifier of the header and may serve to identify whether it is a television commercial, a program from network broadcast locally, a syndicated tape based program, a live network or other video feed and which one, or other type of material that is associated with the particular packet.

The subsequent byte contains the four most significant bits of the frame counting scheme; that is those bits which specify which thirty minute segments of the program the data packet is associate with. The next byte of the packet structure contains a unique identifier specifying the location of the encoding center (an identifier for the particular VTMC encoder). The next word (two bytes) specifies an epoch (i.e. the time at which the encoding began). The first word contains the time and a second word (two bytes) contains the date.

The last byte of the packet contains an end to end redundancy code which is used as a check sum to verify the accuracy of the bits in the packet structure. An additional byte may also be used as a spare or may be utilized to encode the entire program length.

A log turnover packet is inserted at the beginning and end of a log file. It is sent by the decoder software to the decoder firmware; and is sent back to the software by the firmware during the next interval between detected programs. Even if no events of interest have occurred because a program is broadcast with good quality and continuously without interruptions so that there are no status packets or FSD packets generated (and thus only beginning and ending packets), at arbitrary intervals, such as every hour, the existing log file for a given receiver is closed with a log turnover packet. At that point a new log file is also opened. The log turnover packet and its associated time stamp contains data to uniquely identify the time of start and time of end of a particular log file so that related data files may be transported separately and then recombined without error.

Another kind of packet listed in FIG. 3A is a parameter packet. In a preferred embodiment, each of the parameter packets are indicated by a user by entry of an identifier (i.e. PKT_PRM_, frequency of FIG. 3A) and is used to transmit a particular parameter value, which is one simple 16-bit word containing the value. For example, PKT_PRM_FREQUENCY of FIG. 3A initiates a packet which determines what television channel frequency a receiver board is tuned. Although the receiver boards in the field receivers 36 of the present invention are frequency agile in that they can be tuned to different frequencies upon receipt of an appropriate data packet, this is done only in the embodiments described herein when initializing the system or when system requirements dictate a change of frequency such as when a receiver board fails and it is necessary to change the frequency of a spare board to cover a particular channel. However, this replacement of receiver boards upon failure can be made automatic by application of appropriate software in the field receiver CPU platform if desired.

Thus, unlike prior art systems, generally the receivers monitor a channel continuously and do not scan from channel to channel. This is an extremely significant change from the prior art. System 30 is therefore able to accumulate complete data on the programs being broadcast without missing information due to scanning from channel to channel.

Instructional data packets are channeled to the decoder boards to specify what threshold is utilized in report synchronization faults. For example, entry PRM_BURST_THRSH other designated command can initiate the performance of the same function in setting a threshold for the detection of color reference burst faults. Similarly, entry of PKT_SNAP permits the system to capture every field of data for a duration of approximately two seconds so that data dump can be made and all operations on all status latches in the hardware can be examined so that all of the data, including the data that was received from the scan-line, can be analyzed.

An FSD packet is generated when there is a transition from unencoded video to encoded video, or from encoded video to unencoded video or when successive frames in the received video signal are not in the proper sequence in which data is encoded, such as when there is a transition from one program having encoded video to another program having encoded video. In the preferred embodiment each encoded frame is numbered successively. If two received frames are not numbered successively then an FSD packet, along with its corresponding time stamp packet is generated.

It will be appreciated that the consecutive frame numbering system utilized in the preferred embodiment of the invention is merely one of many sequential frame number systems that may be used to identify each and every frame individually and uniquely. For example, succeeding frames in the program may be numbered in any predetermined sequence as long as the decoders in the field receivers 36 are programmed to recognize this sequence as being the normal sequence of a program which is received without interruption.

The contents of an FSD packet include a first word containing the frame number recovered from the frame preceding the discontinuity and a second word including the frame number recovered from the frame following the discontinuity. The contents also include a bit which is true if the frame number reported in the first word is meaningful.

Another data packet identifies the decoder board. This decoder board identity packet specifies the receiver decoder board from which data is being generated (i.e. PKT_PARTIAL_ID of FIG. 3A). Since each board is assigned to monitor a particular channel, this enables the transaction processor at the data center to relate the contents of the log file with the station monitored. This data packet includes a word which identifies the field receiver box and a byte which specifically identifies the actual decoder board.

A partial identifier packet is generated when the receiver has recovered less than a complete program identifier (i.e. PKT_PARTIAL_ID of FIG. 3A).

A signal status packet describes the reception conditions of an interval of received video. This packet is generated by the decoder to describe the attributes of the video signal being monitored over a particular interval of time. It is used by the transaction processor to reconstruct what happened in order to generate database entries for the specific observance of the encoded program material. Status data is limited to a description of an interval containing the unique code so that the data is manageably limited in volume. A length parameter (i.e. PKT_PRM_DROP_TIME of FIG. 3) is used to limit the number of intervals, and therefore the amount of detail, when the received signal is changing frequently. The status packet is the longest data packet employed in the present invention. The contents of it include a byte field which represents the largest number of synchronization faults or missing synchronization pulses detected during any one frame of the interval of interest and which identifies the largest number of burst faults or missing color bursts detected during any one frame of the interval. Also included in the status packet is a word field indicative of the number of "on" samples of an audio channel 1 bit during the observed interval, and the number of "on" samples of an audio channel two bit during the observed interval and the total number of audio samples taken during the interval. The following bit fields are combined, by way of a logical, into a byte. One bit represents whether the sync fault count exceeded threshold for one or more frames in the interval. Another bit represents whether the sync fault count was below a predetermined threshold for one or more frames in the interval.

A third bit represents whether the burst fault count exceeded a predetermined threshold for one or more frames in the interval. A fourth bit represents whether the fault count was below threshold for one or more frames in the interval. A fifth bit represents whether the video was absent (i.e. no non-maskable interrupt was generated) for one or more field times in the interval. A sixth bit represents whether the video was present (i.e. a non-maskable interrupt was generated) for one or more fields in the interval. A seventh bit represents whether the correct odd/even alternation between fields was observed somewhere within the interval.

The next byte contains the following bits: A first bit represents whether the hardware "carrier detect" byte is off at any time within the interval. A second bit represents whether the hardware "carrier detect" bit is on at any time within the interval. A third bit represents whether the inserted data was absent or, because of errors, whether the even-field bits were not the exact complement of the odd-field bits, for one or more frames in the interval. A fourth bit represents whether data was present and accurately received for one or more frames in the interval.

A fifth bit represents whether the stereo (the subcarrier) was absent for one or more frames in the interval. A sixth bit represents whether the stereo was present for one or more frames in the interval. A seventh bit represents whether the SAP subcarrier pilot was absent for one or more frames in the interval. An eight bit represents whether the SAP subcarrier pilot was present for one or more frames in the interval.

A third byte contains the following bits:

A first bit represents if horizontal synchronization lock was absent for one or more frames in the interval. A second bit indicates whether horizontal synchronization lock was present for one or more frames in the interval. A second bit indicates whether horizontal synchronization lock was present for one or more frames in the interval. A third bit indicates if vertical synchronization lock was absent for one or more frames in the interval. A fourth bit indicates if vertical synchronization lock was resent for one or more frames in the interval.

It will be appreciated that other bit organizations may represent information as desired.

Thus, in the present invention, a great deal of reception detail is compressed into an economical form for data transmission without loss of granularity required to determine what occurred on a frame by frame basis.

A restart data packet (e.g. PKT_RESTART of FIG. 3) indicates that a particular receiver is being re-started after a shutdown. This packet is generated by the decoder software after the receiver CPU platform is booted up. In a log file, this packet is interpreted to indicate that the decoder has been down for the period of time from the previous timestamp. A start insertion packet (e.g. PKT_INSERT of FIG. 3A) is sent to the data inserter circuitry to being the encoding process. It includes an optional word which contains a value equal to the number of frames to be encoded, a word reserved for expansion, four external trigger bits, an immediate trigger bit, and a byte which contains a return code.

A queue filler packet (e.g. PKT—QUEUE—FILLER of FIG. 3) is for internal use only within the shared memory window queue routines used to exchange information between firmware and software in the encoder and decoder.

The Encoder Hardware

Figure 4:
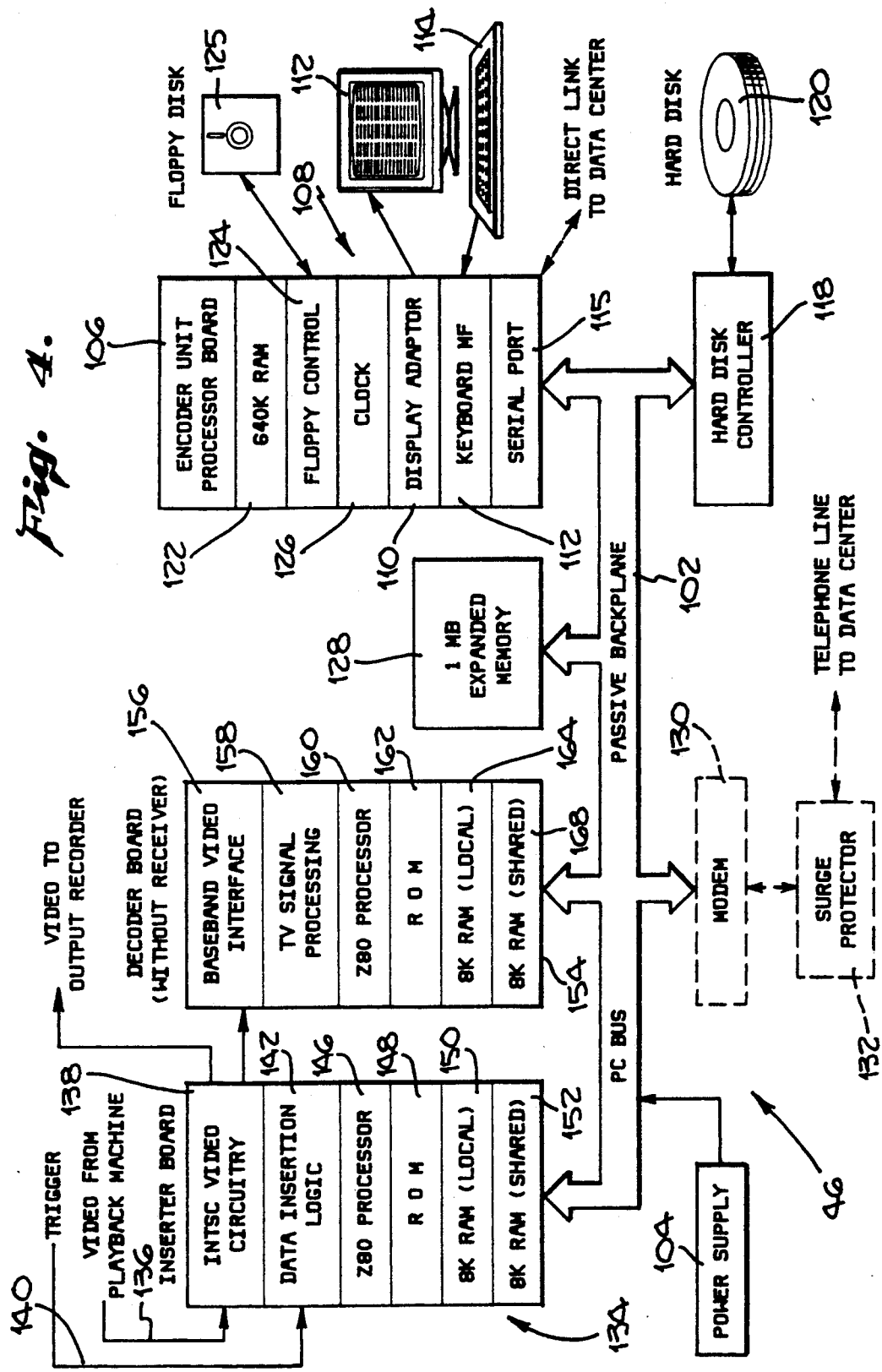
FIG. 4 is a block diagram of the hardware of the encoder of the system of FIG. 1.

In FIG. 4, there is shown an exploded view of the encoder 46 of FIG. 1. A processor board 106 is coupled to a passive backplane bus 102 which is a multifunction I/O board 108 which includes a display adaptor 110 for interfacing to display 112 for interfacing to a keyboard 114. A serial port 115 may be used for a variety of purposes including providing a direct data link 116 to the data center 34 FIG. 1. Encoder 46 is also coupled to the passives backplane bus 102 which is powered by power supply 104.

In the preferred embodiment, passive backplane bus 102 also contains a card including a hard disk controller 118 and a hard disk 120. In addition, the hardware includes a 640K byte RAM 122, a floppy disk controller 124 for a floppy disk 125 and a system clock 126. An expanded memory 128 for storage is coupled to passive backplane bus 102. The above described hardware of decoder 46 forms a "CPU platform" for the encoder.

Passive backplane bus 102 also contains, in the preferred embodiment, a modem card 130 for providing data to modem telco line 62, which in turn, is coupled to the data center 34 of FIG. 1. The modem may be a stand-alone device or may be external and may connect to the system via serial part 115. A surge protector 132 protects modem 130 against surges on telco line 62.

Backplane 102 is coupled to a data inserter board 134 which receives the video signal from video playback machine 38 of FIG. 1 along line 136. The video signal is fed to data insertion video circuitry 138. When a trigger signal is received on line 140 by data insertion logic 142, the afore described unique coded data is inserted on the video signal by data insertion logic 138. The encoded video signal is then returned to tape machine 38-2 of FIG. 1 where it is recorded onto a second video tape master. Alternatively, as previously discussed, the encoded video tape may be sent out for later transmission without duplication.

Inserter board 134 is controlled, in the preferred embodiment, by an on-board microprocessor 146, which operates in accordance with firmware instructions stored in a ROM 148. A local RAM memory 150 serves as a memory window between the encoder firmware and the CPU supporting software.

Encoded video from data inserter 138 is also supplied to an optional receiverless decoder board 154 mounted on passive backplace bus 102. Decoder board 154 includes a base band video interface 156, a television signal processing block 158 and a microprocessor 160. Microprocessor 160 operates in accordance with instructions stored in a ROM 162. Decoder board 154 verifies that the data inserted can be decoded correctly. (The decoding process is later described with respect to FIG. 8).

Figure 5:
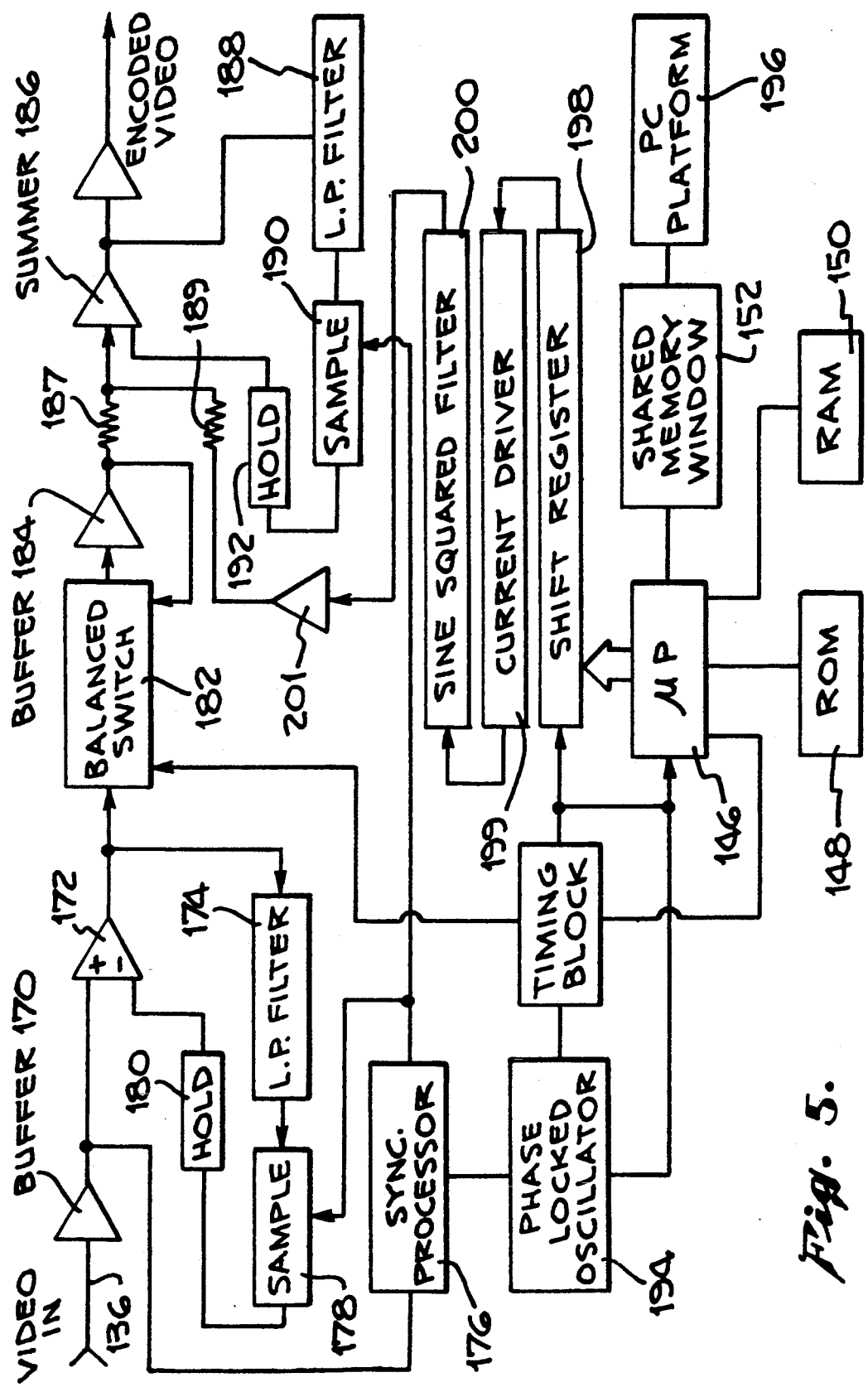
FIG. 5 is a block diagram of the inserter board of the encoder of FIG. 4.
Figure 5A:
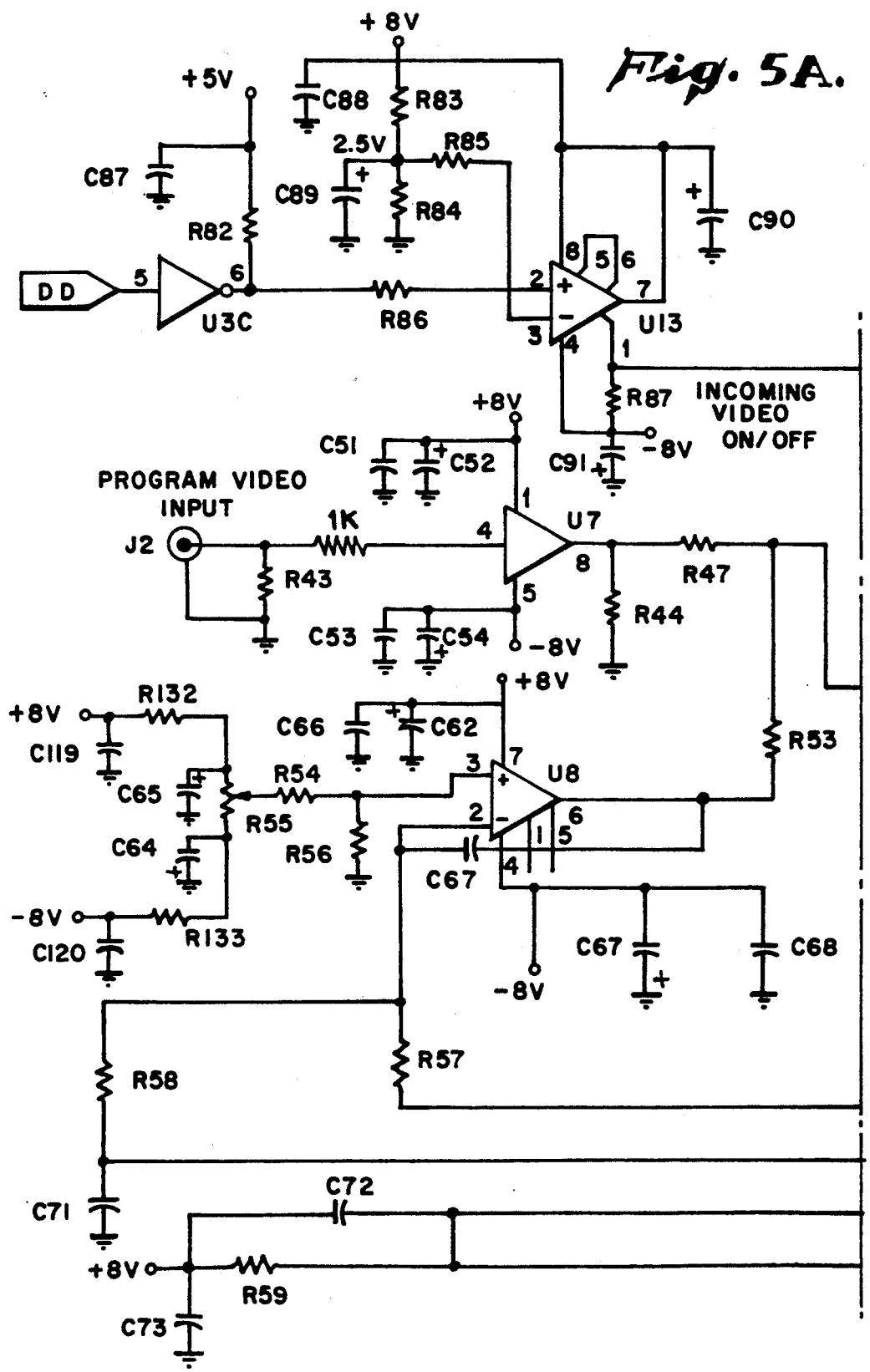
FIG. 5a to FIG. 5r when assembled in order from left to right are a schematic diagram of the insert board of FIG. 5.
Figure 5B:
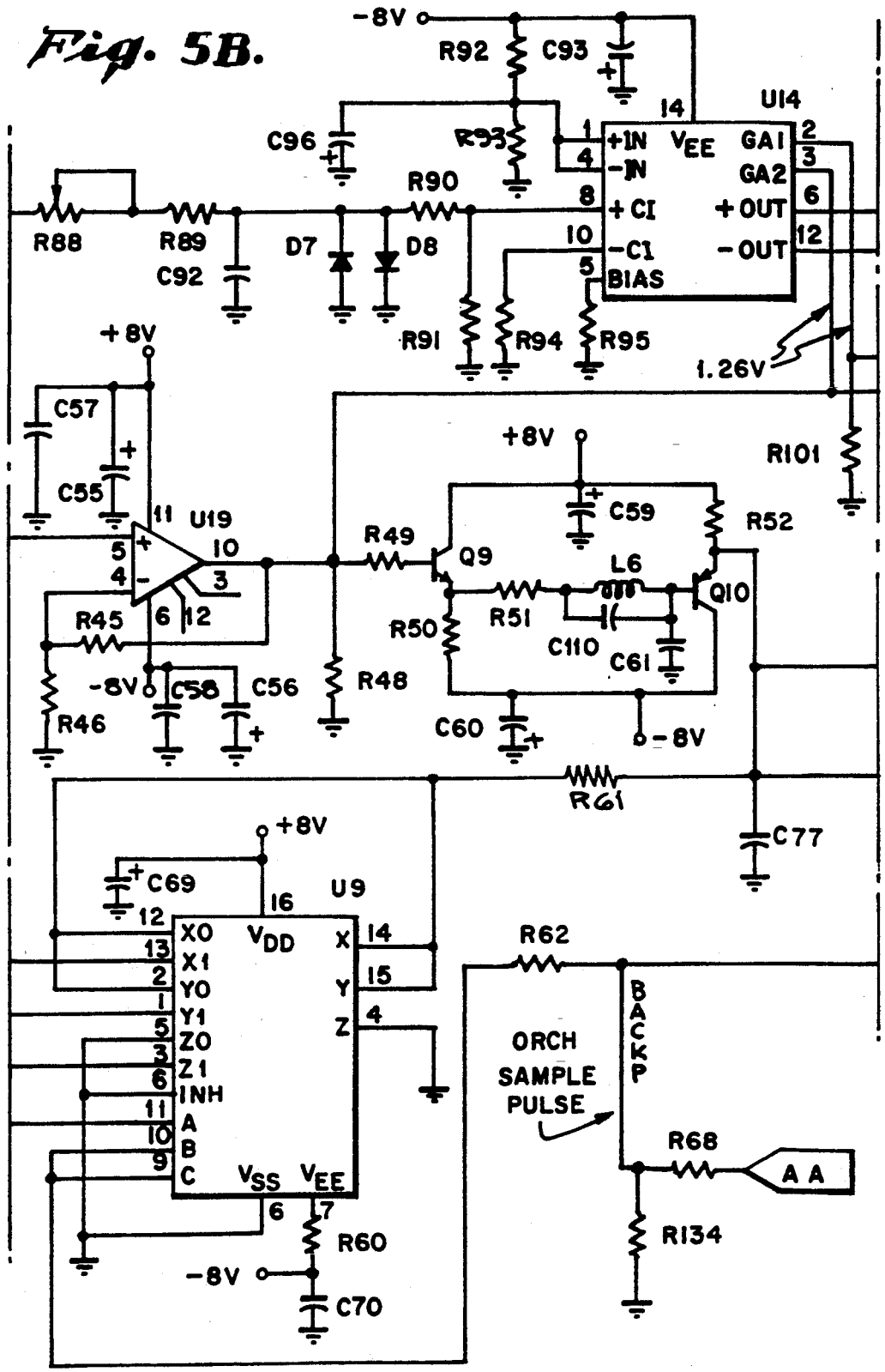
Figure 5C:
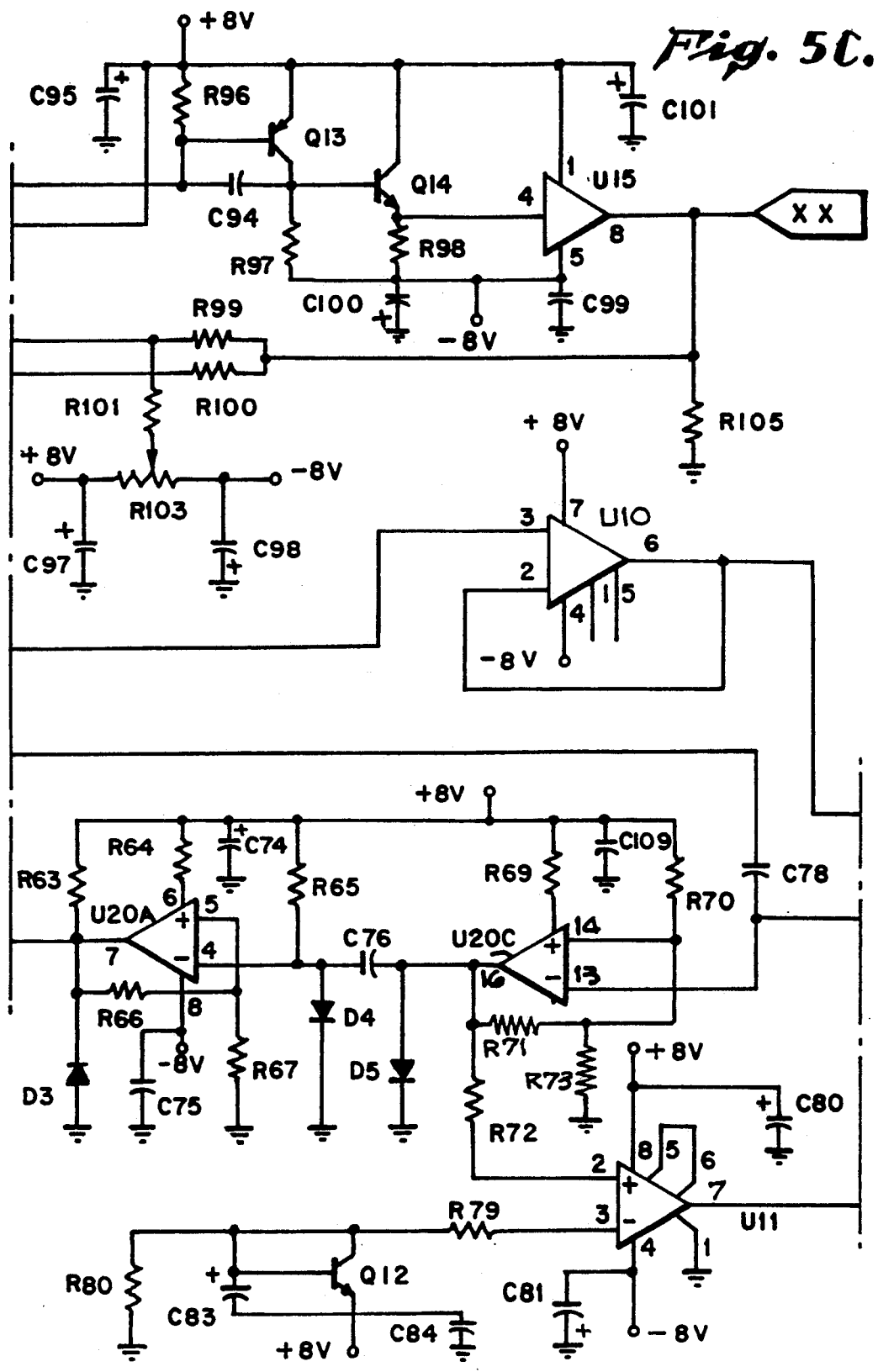
Figure 5D:
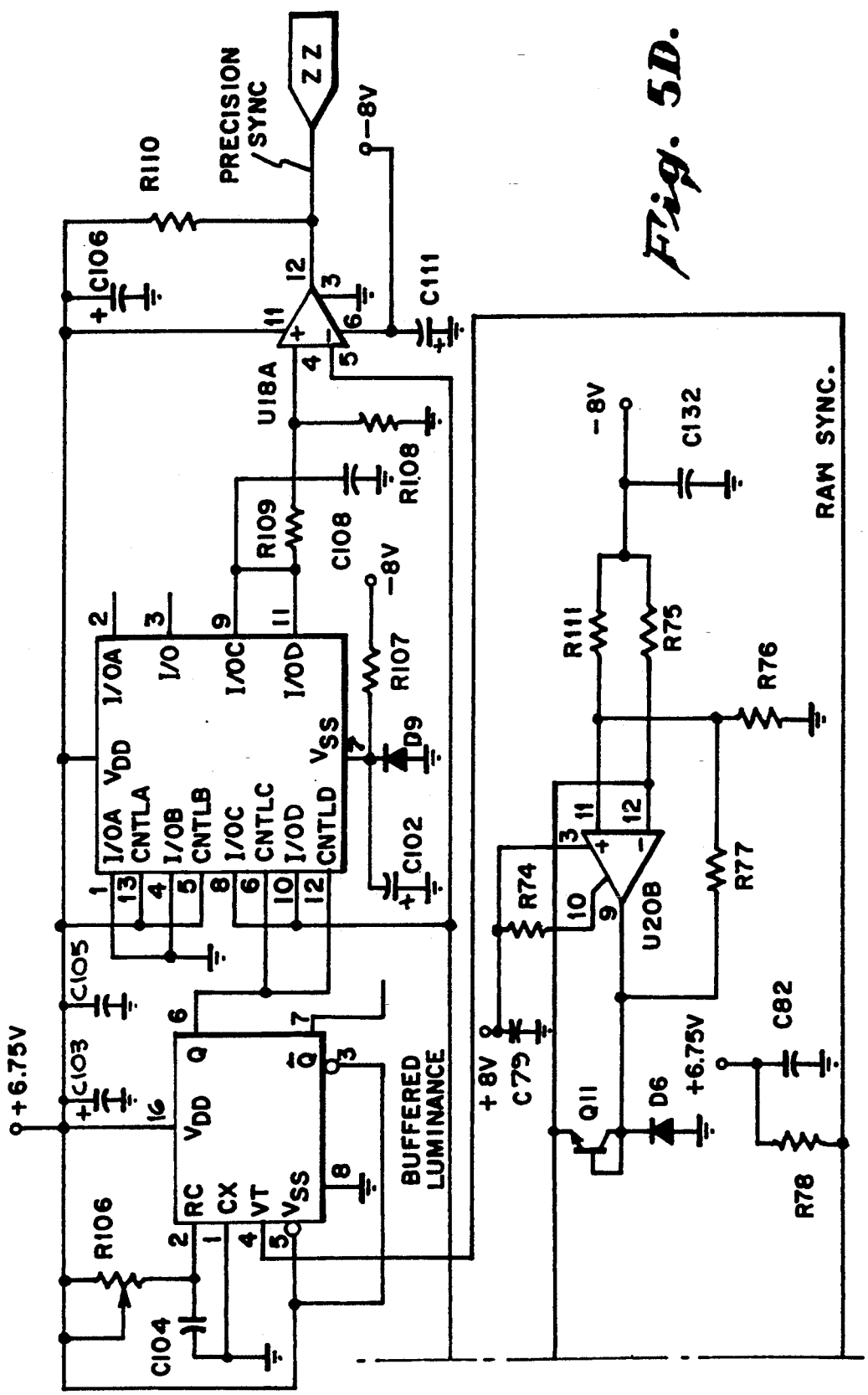
Figure 5E:
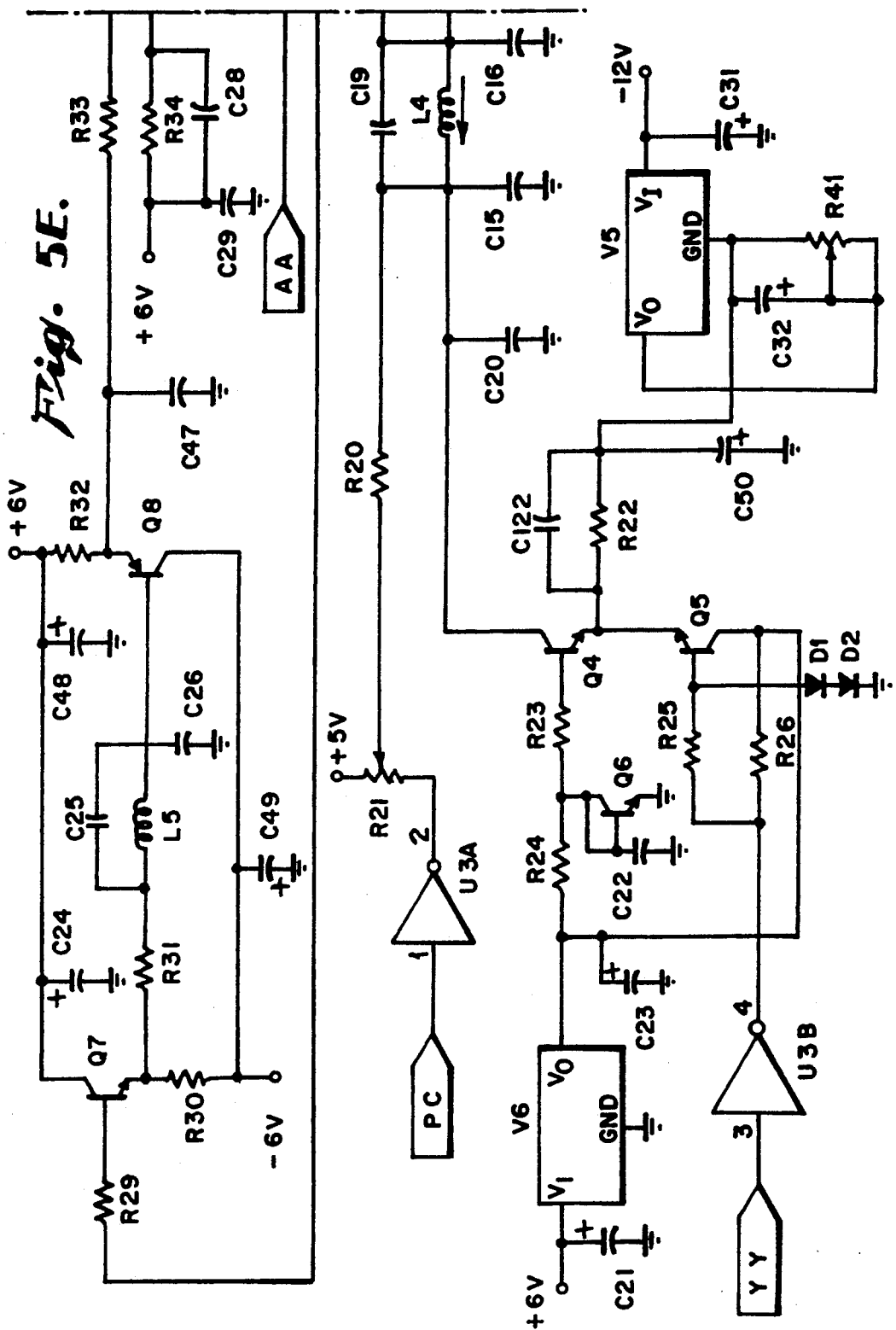
Figure 5F:
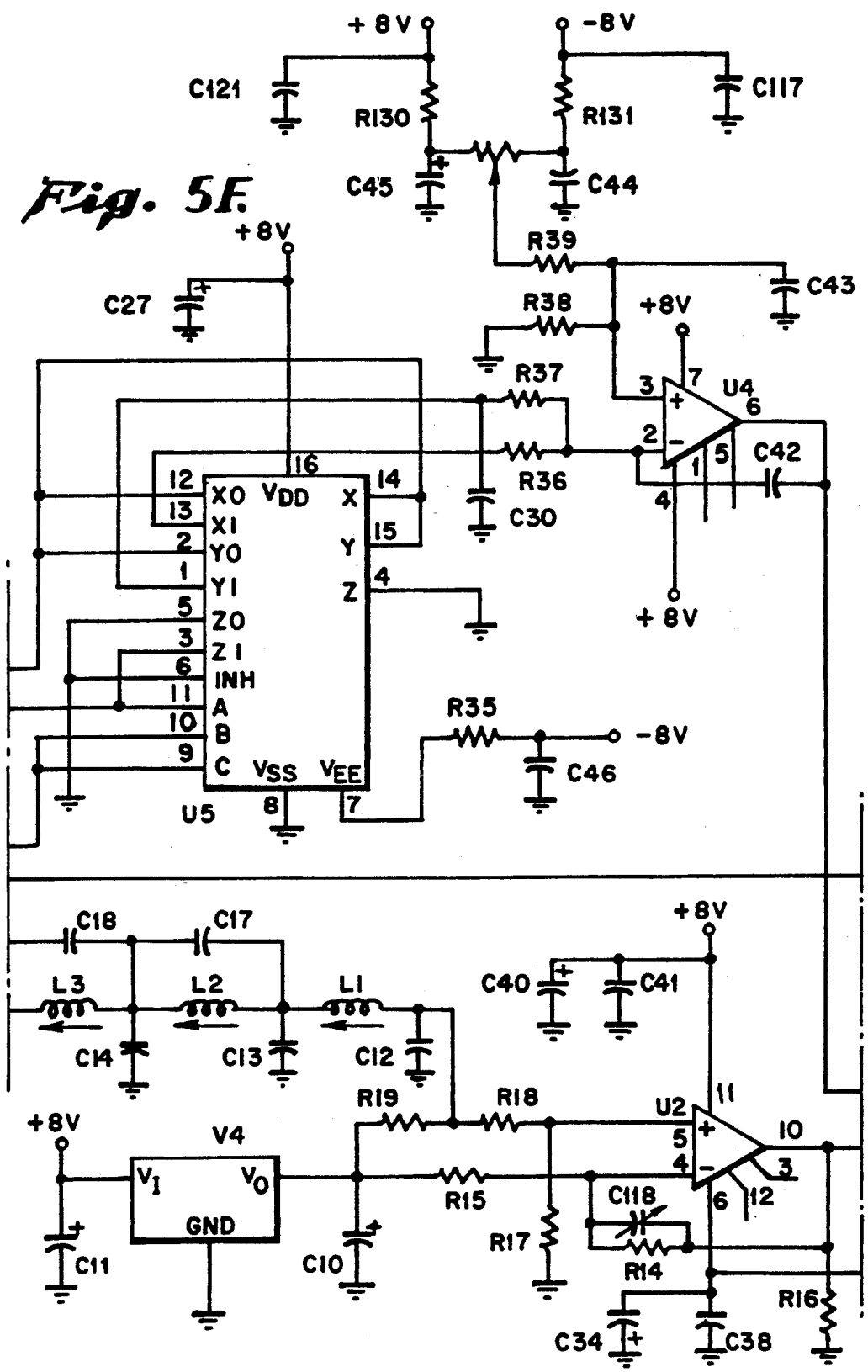
Figure 56:
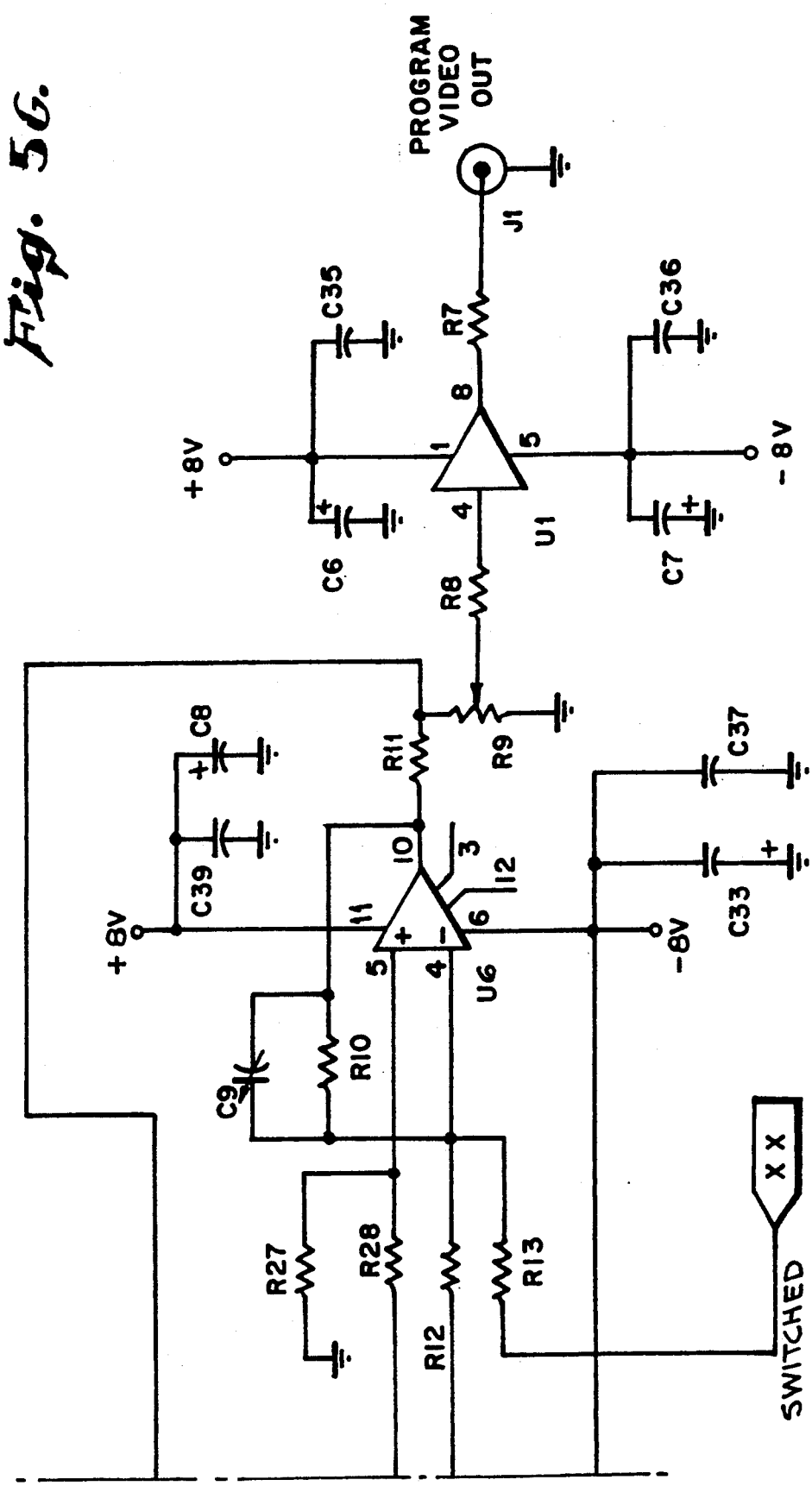
Figure 5H:
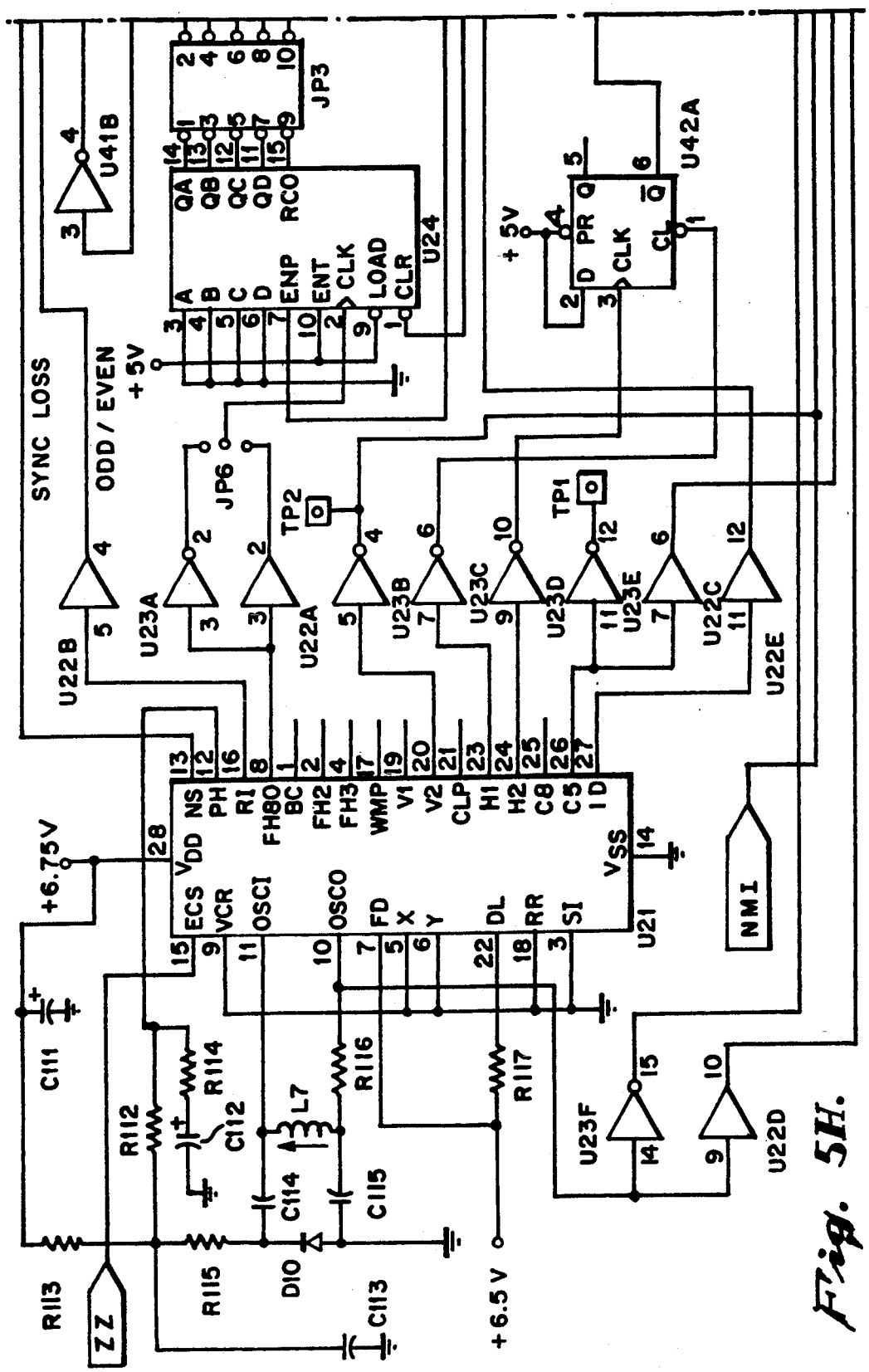
Figure 51:
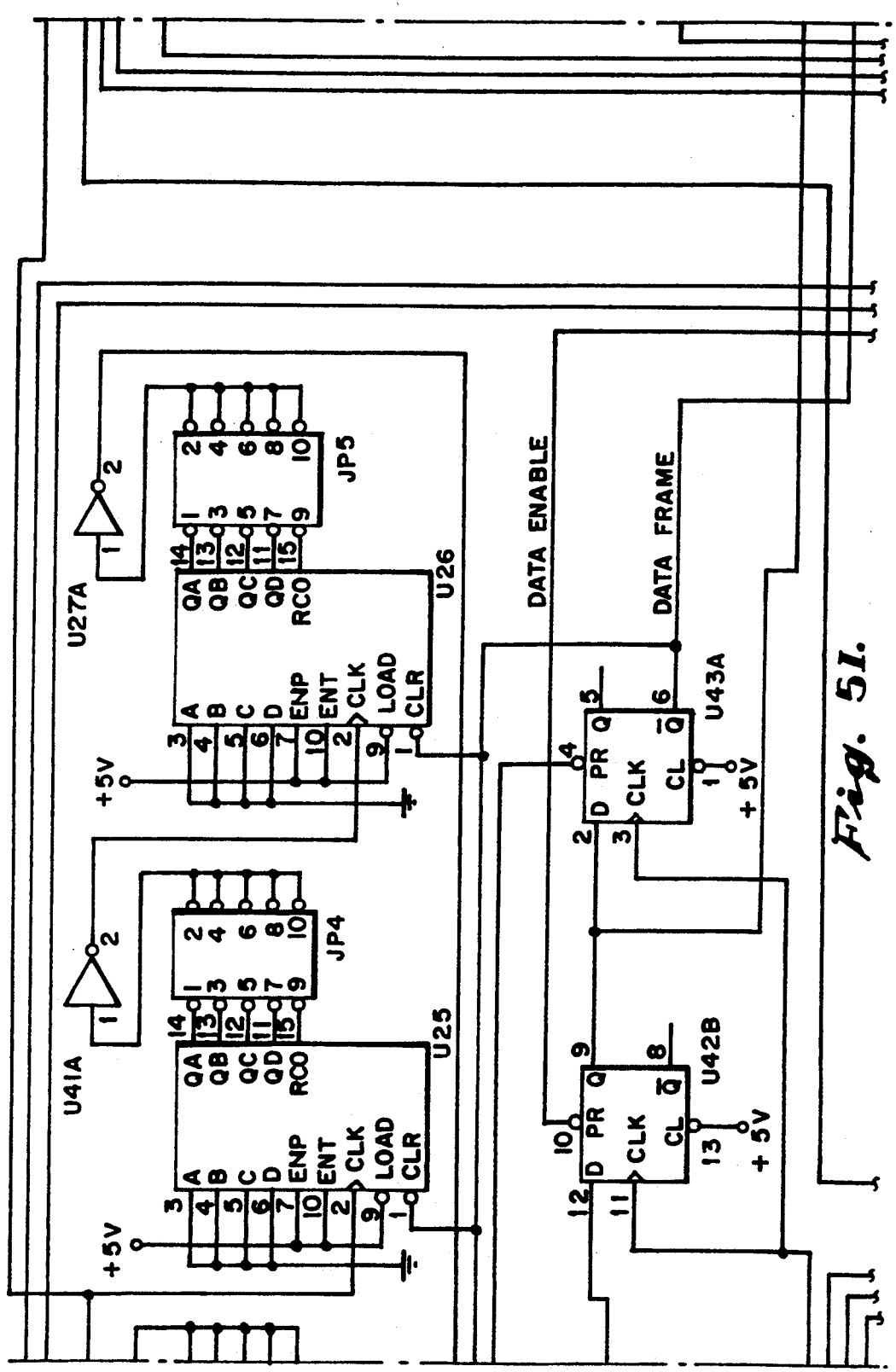
Figure 5J:
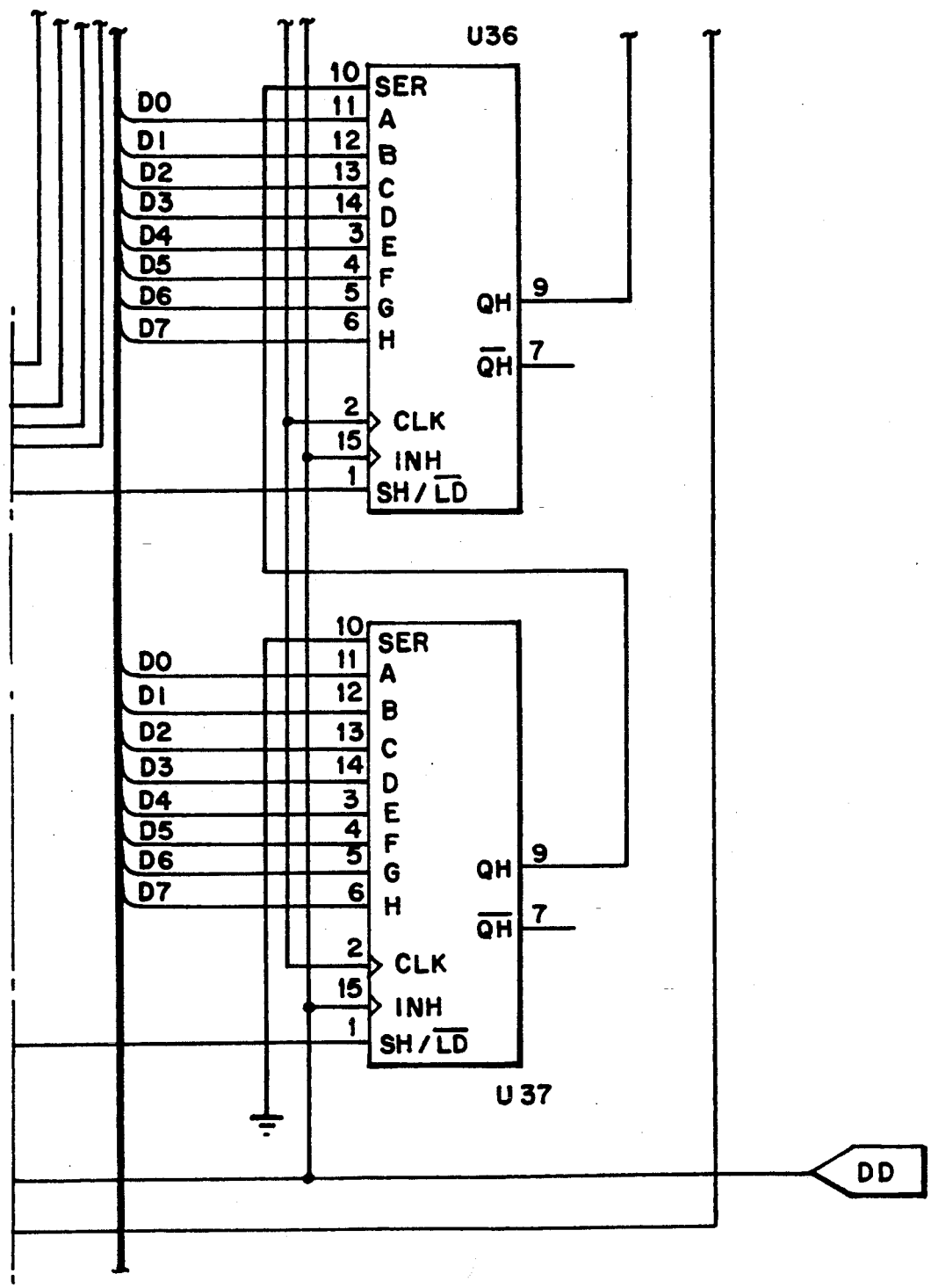
Figure 5K:
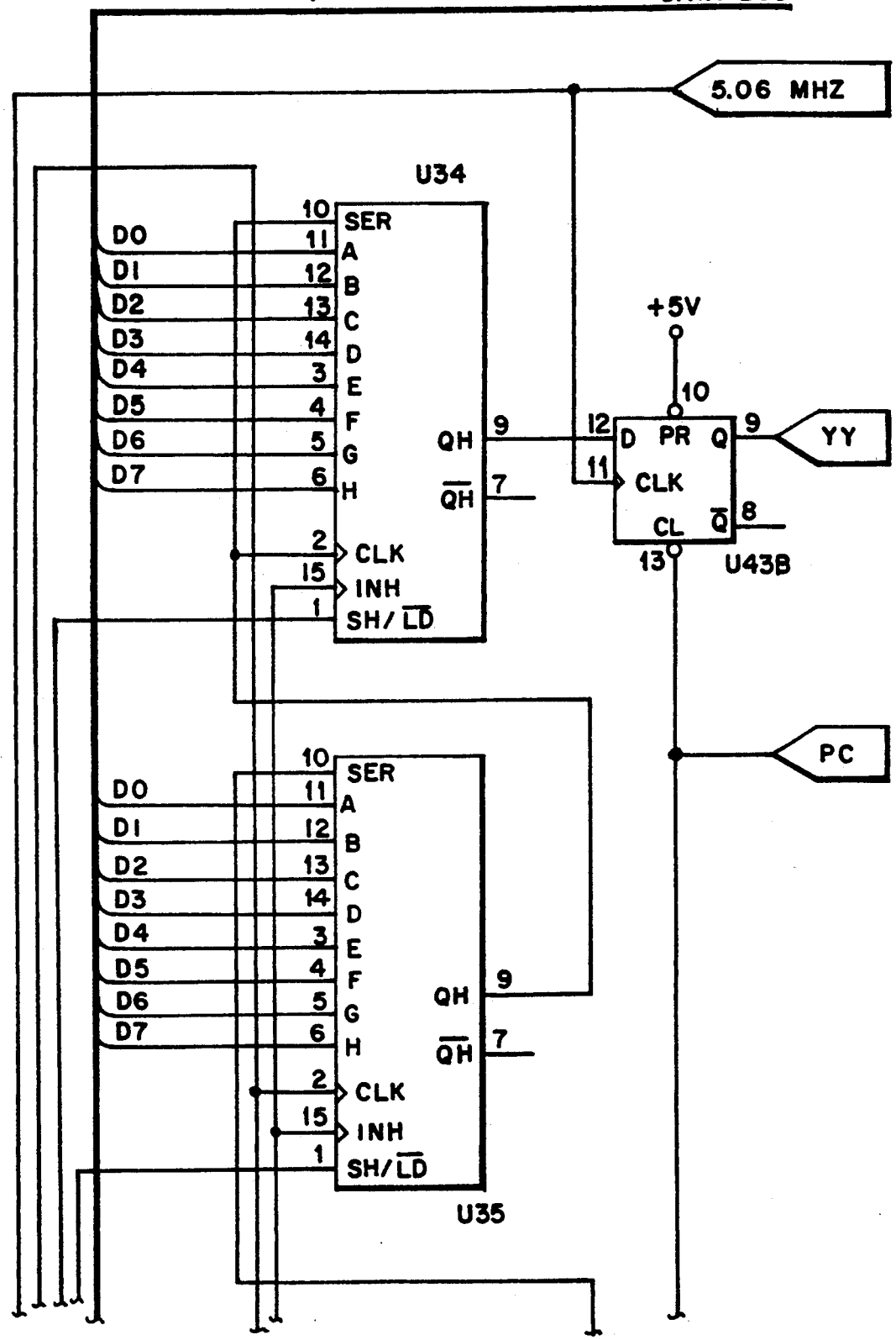
Figure 5L:
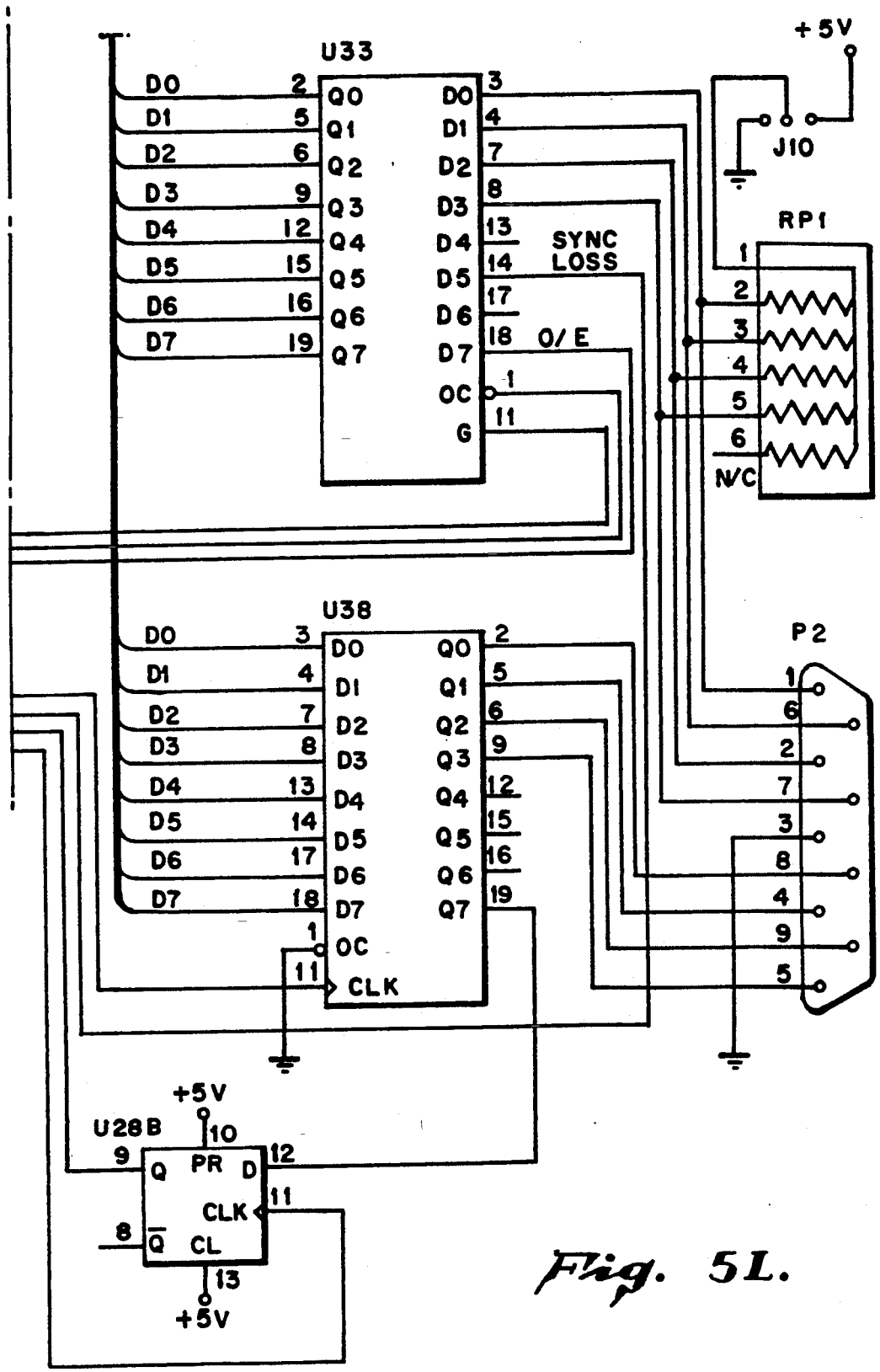
Figure 5M:
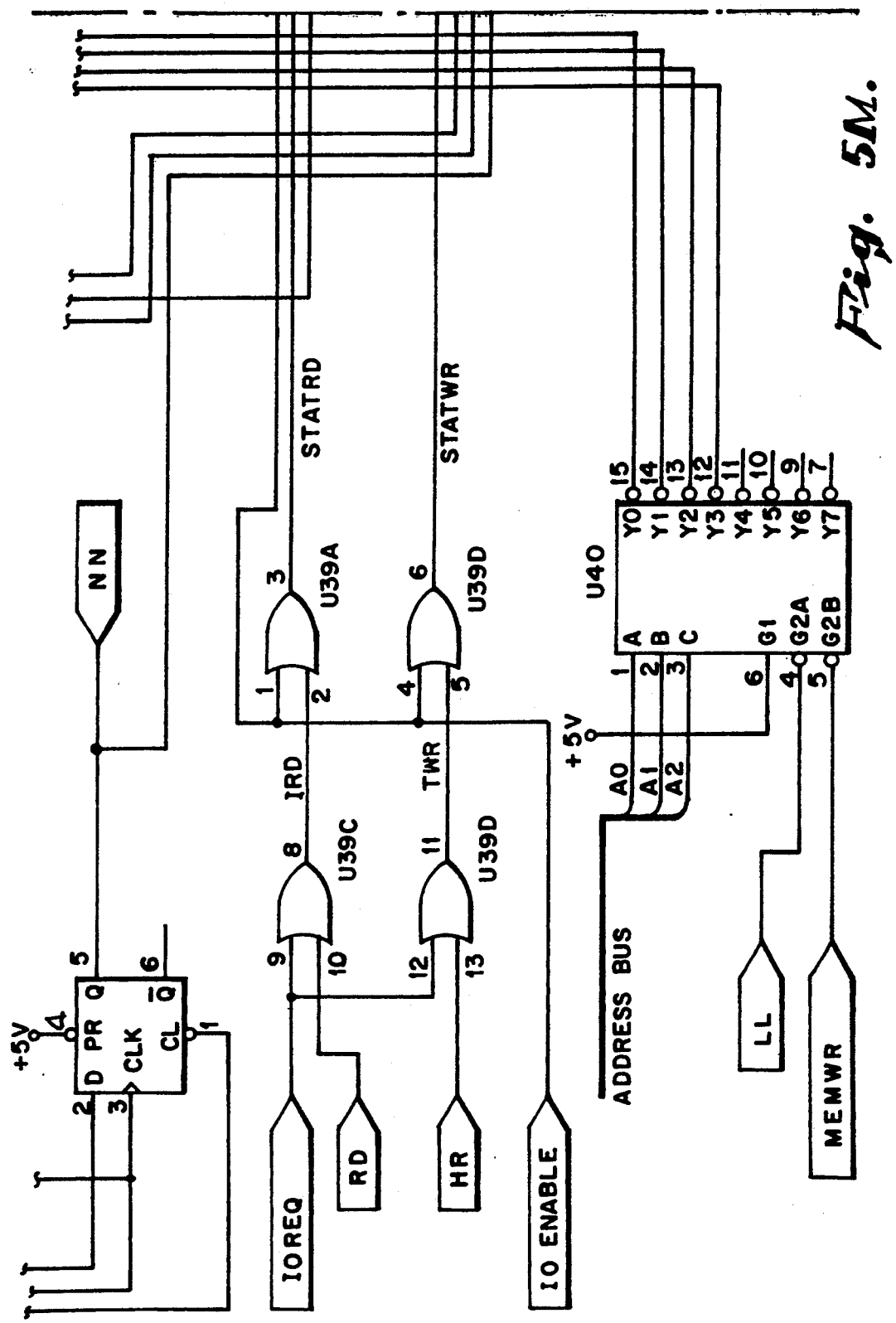
Figure 5N:
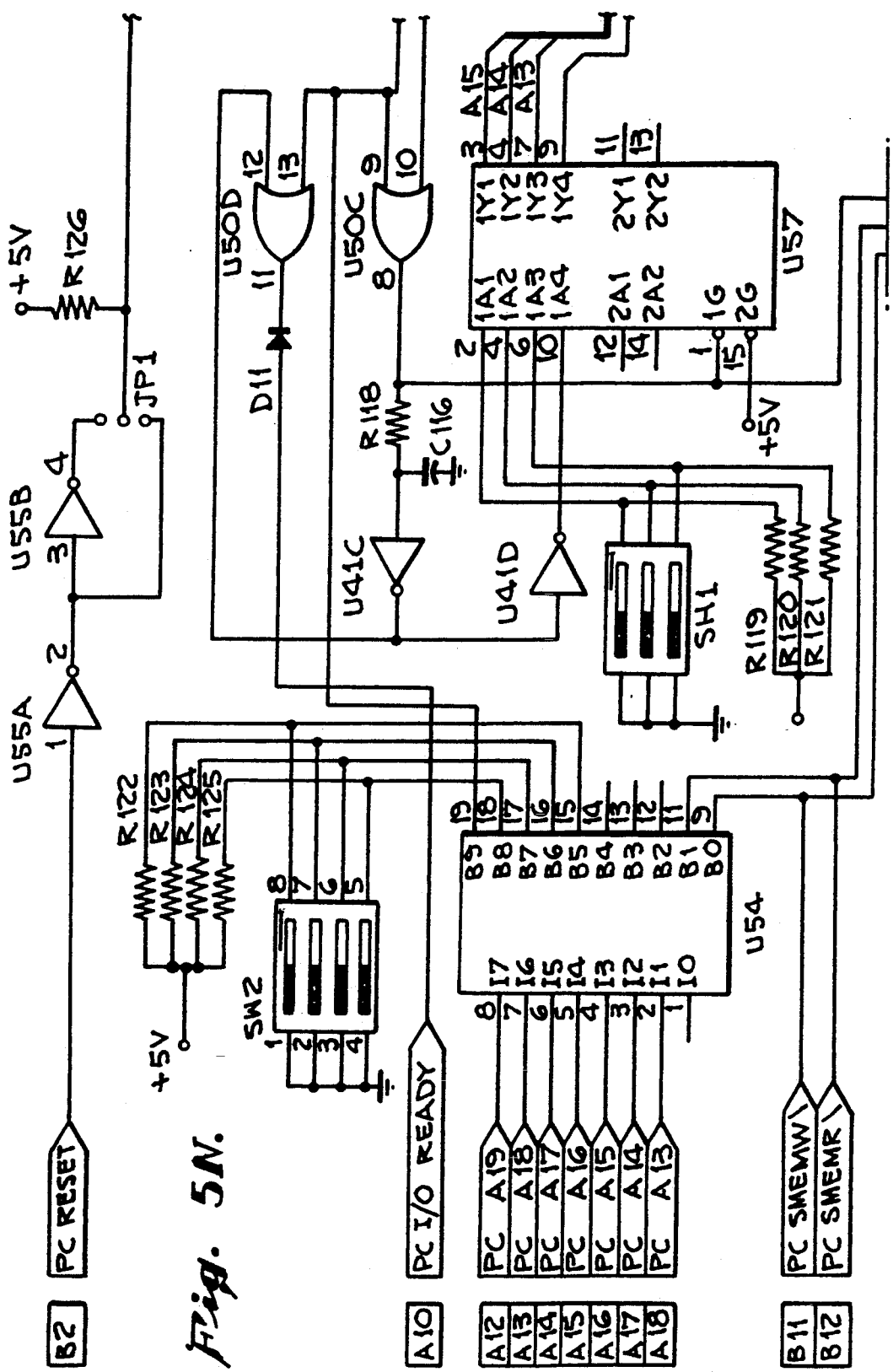
Figure 50:
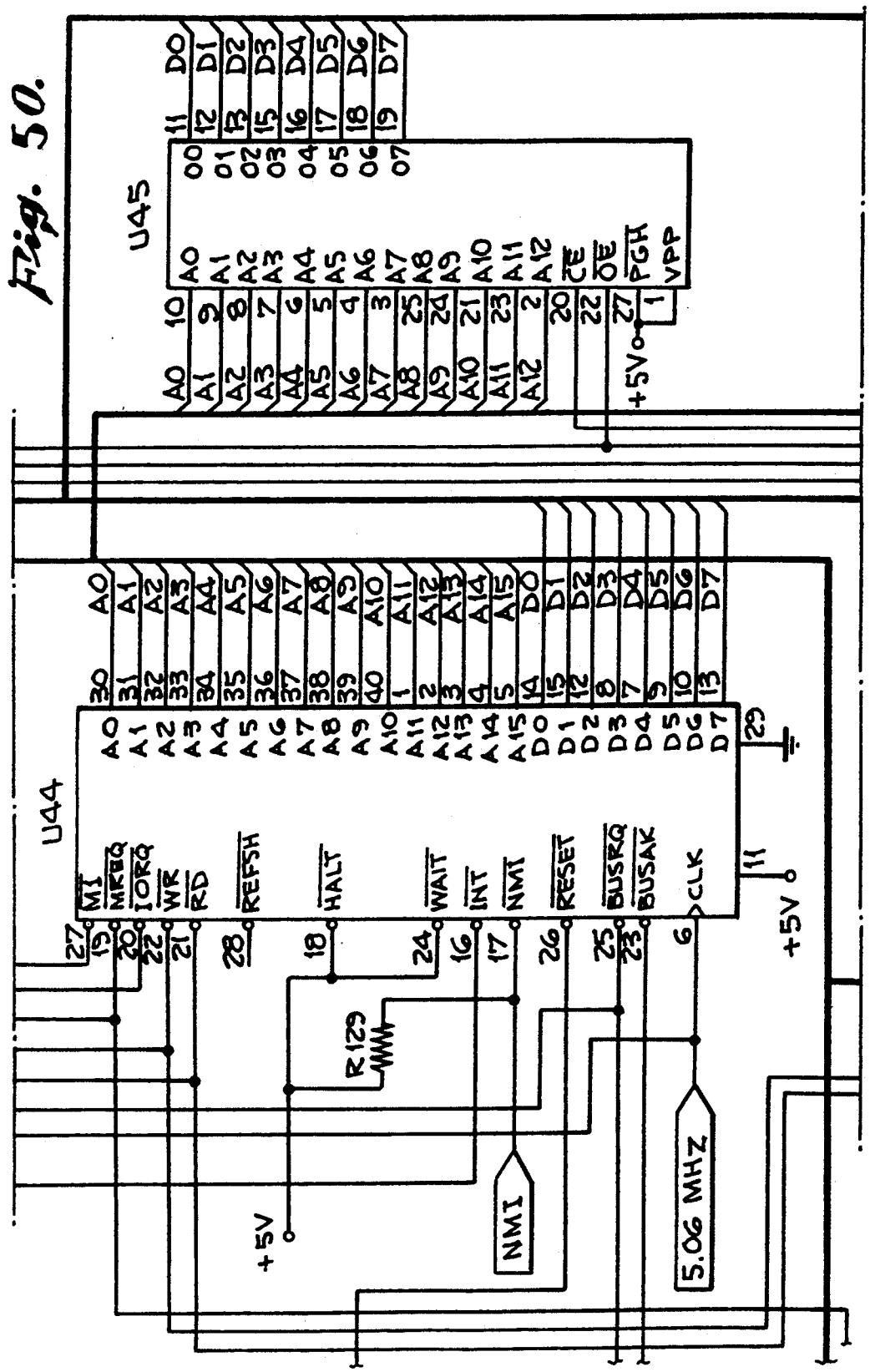
Figure 5P:
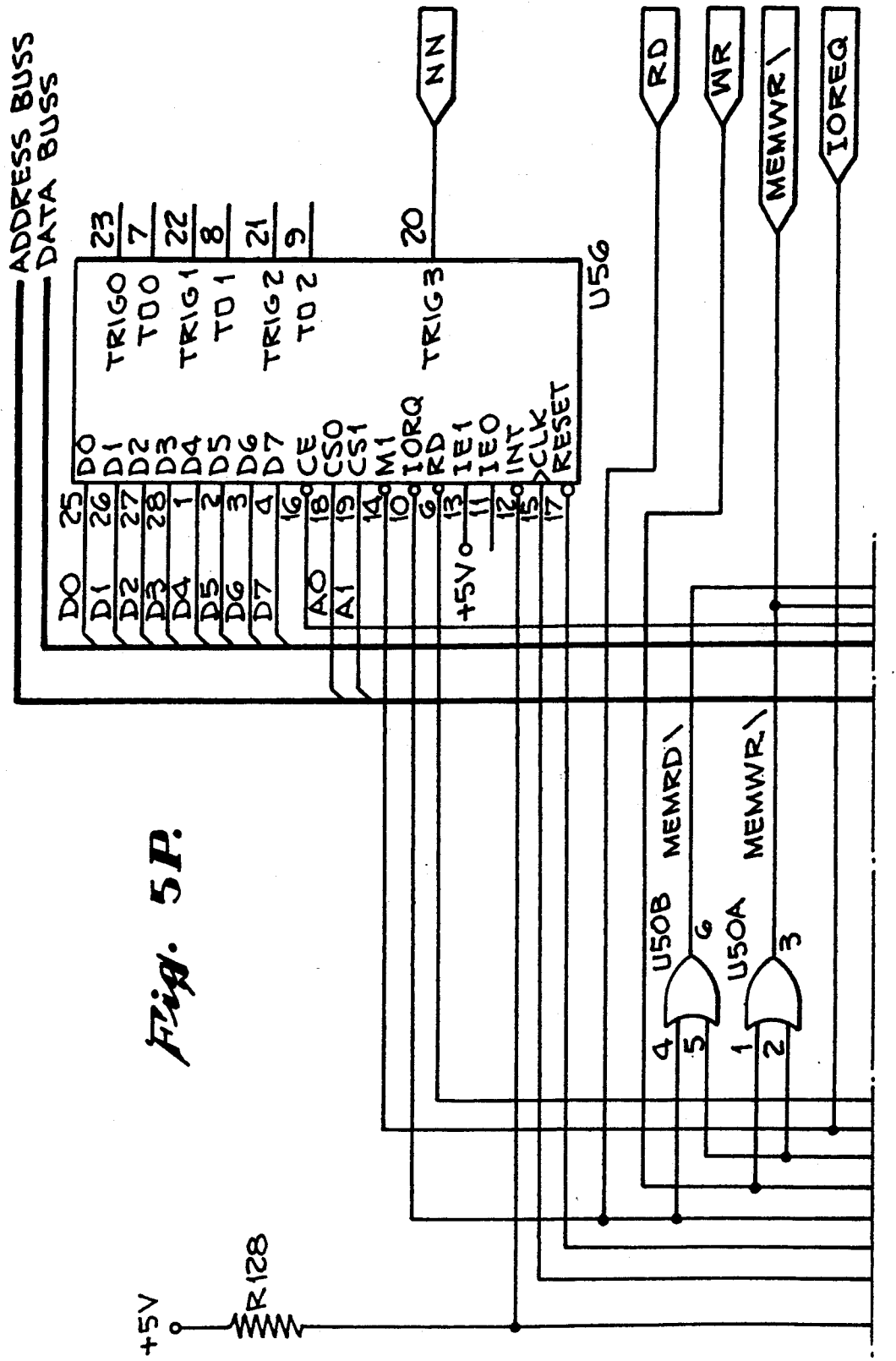
Figure 5Q:
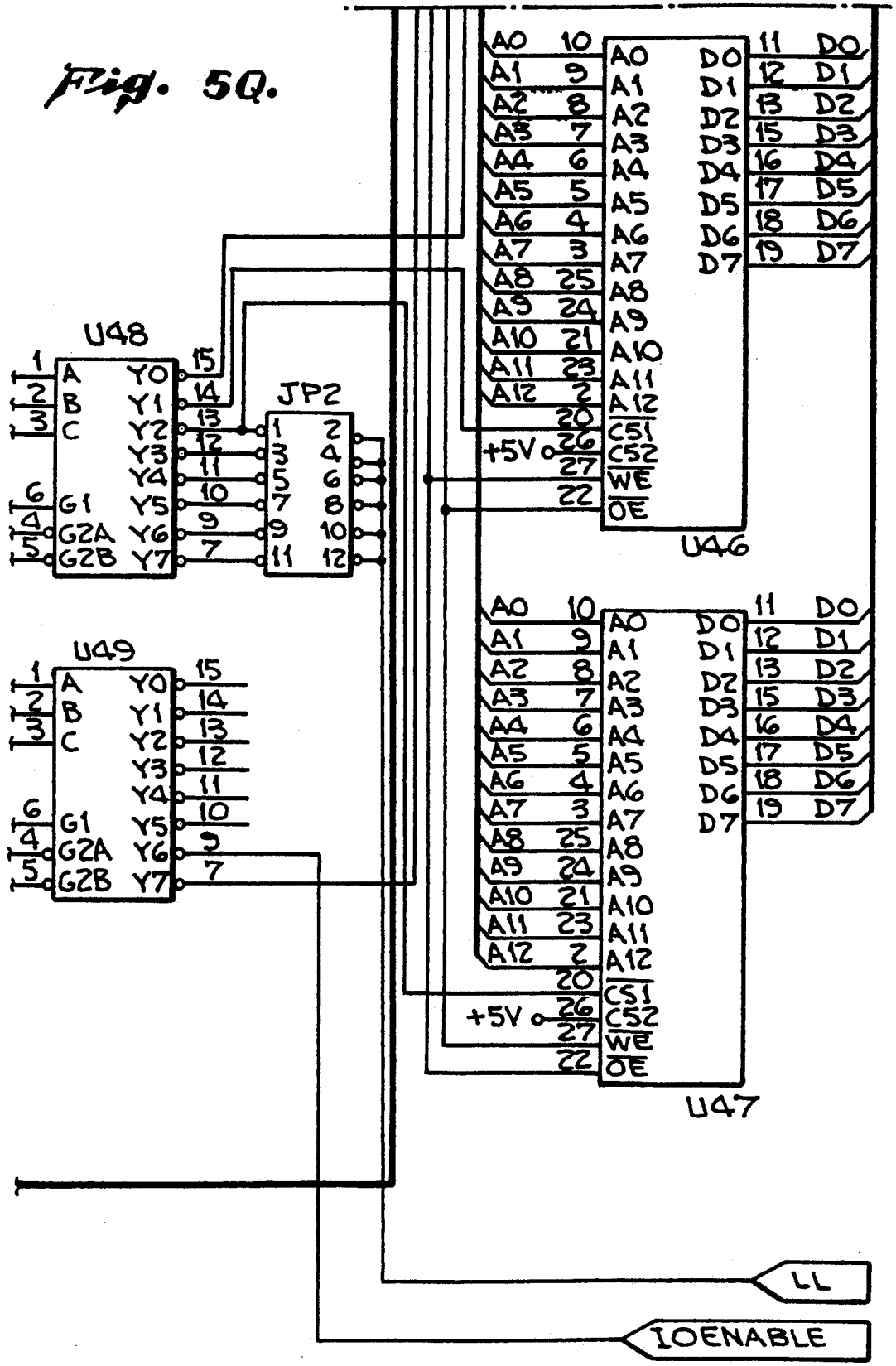

In FIG. 5 there is shown a block diagram of the analog signal processing and the hardware circuitry of inserter board 134 of FIG. 4. As discussed, inserter board 134 clamps the incoming video signal at the precise scan-line on which digital data is to be inserted, keys the data onto that scan-line and returns the incoming video without introducing appreciable DC offsets or noise.

Video input on line 136 of FIG. 5 is provided to a video current buffer 170. The output of current buffer 170 is provided to the non-inverting input of a unity gain amplifier 172. The output of amplifier 172 is then provided to a low pass filter 174 which strips out the high frequency components leaving only the luma signal of the video signal at its output. The luma output is provided to a sample circuit 178, which samples the D.C. offset of the "back porch" portion of the luma signal which is devoid of color burst content. This is convenient sampling location of the signal as is well known in the art.

Video on line 136 is also provided to a synchronization processor 176 which provides horizontal synchronization pulses for the entire board. At the appropriate time, synchronization processor 176 provides a sample pulse to sample circuit 178 thus sampling the value of the luma signal. The DC input offset voltage sampled by sample circuit 178 is held in an integrator or hold circuit 180 and fed back to an inverting input of unity gain amplifier 172. As a result, the output of amplifier 172 is corrected to be at a substantially zero offset from zero volts DC when data is to be inserted.

The output signal, which is at a minimal offset voltage, is then supplied to a balanced switch 182. A timing block 195 provides a timed pulse to turn off switch 182 so that any residual voltage appearing in the video input thereto does not appear at its output. The output of switch 182 is provided to a buffer amplifier 184. Buffer amplifier 184 provides DC feedback to an input of switch 182 so that any DC offset voltages which would be present at the output of switch 182 are also canceled.

The output of buffer amplifier 182 is provided to a summing amplifier 186 having a gain of two, through a resistor 187. As shown in FIG. 5, in a manner similar to amplifier 172, the output of amplifier 186 is low pass filtered to produce a luma signal by low pass filter 188. The output of filter 188 is then sampled in a sample circuit 190 and held in an integrator or hold circuit 192. The output of hold circuit 192 is fed to the non-inverting input of amplifier 186 to again eliminate DC offset voltages just prior to the time when data is inserted. Sample circuit 190 is made operational by the same pulse that is provided to sample circuit 178 by synchronization processor 176. This sample and hold function during the "back porch" time just prior to data insertion also serves to remove any DC offset contributed to the video waveform (as measured at the output of buffer amplifier 184), by buffer 201, sine squared filter 200 or current driver 199, thus assuring that the inserted data will rise from appreciably the same "black" or zero volt offset as that of the live video during the previous scan-line-time, by virtue of the action of the replicate sample and hold circuit comprised of amplifier 172, low pass filter 174, sample circuit 178 and hold circuit 180.

An oscillator 194 is phase locked to the output of synchronization processor 176 at a frequency equal to eighty times that of the horizontal synchronization frequency. This signal serves as the clock for timing block 195. Timing block 195 in turn provides clock signals for microprocessor 146 and for a shift register 198. Microprocessor 146 (of FIG. 4), through suitable programming instructions stored in ROM 148, controls the data insertion process. The use of a phase locked oscillator 194 assures that data is placed at the proper time on the scan-line of interest. Thus, if the horizontal synchronization frequency should change, the frequency of oscillator 194 changes in a proportional manner and the length of the data bit cells change proportionately so that all the data bits are properly encoded on the selected video scan-line.

As described in more detail below with respect to FIG. 8A, one parameter which may be programmed is the scan-line number on which the data is to be inserted or encoded.

As noted above with reference to FIG. 4, also associated with microprocessor 146 is RAM 150, shared memory window 152 and the other components of FIG. 4 which make up the CPU platform denoted 196 in FIG. 5.

Microprocessor 146 loads shift register 198 of FIG. 5 with code data that is to be placed on the appropriate video scan-line. Microprocessor 146 instructs shift register 198 to begin shifting the data on to the desired scan-line and transfers control of the shifting data to hardware control. The output of shift register 198 is coupled to a current driver 199 which provides input current for a sine squared filter 200. It has been found that a time domain analysis rather than a frequency domain analysis is appropriate for optimizing filter 200.

The output of filter 200 produces data bit cells which, regardless of pulse height amplitude or pulse duration in the non-returns-to-zero (NRZ) scheme, have a rise time of 125 nanoseconds (or other value for which the network response is calculated). The data is supplied in a NRZ format and, after being buffered by buffer 201, is summed, through a resistor 189, with the output of buffer amplifier 184 at the inverting input of summing amplifier 191 which supplies low impedance encoded video signal that includes the encoding data.

By switching the video signal restored to zero DC volts, as opposed to the signal path carrying the digital data to be inserted on the video signal, there is provided an essentially unaltered encoded video signal so long as the switching occurs at a point in the video waveform which is at essentially zero volts. The output of buffer 201 of FIG. 5 is always online, and the signal path for the digital data is unswitched in that it is always connected to the line and digital data is inserted at the appropriate time under hardware control and at the direction of microprocessor 146. Conversely, the incoming video signal is continuously restored and switched to ground potential at the appropriate time. This arrangement introduces no more than approximately 0.5 mv of switching transients about the level to which the signal is clamped (nominally zero volts), and does not introduce any appreciable switching noise artifacts and is therefore well within the limits of average acceptability which studio quality video users require.

The inserter board provides control over what data is placed on the video signal by microprocessor 146. This in turn is controlled by data coming from CPU platform 196 through the shared memory window or memory queue 152 of FIG. 4.

FIGS. 5A to 5L show a more detailed view of the circuitry of the inserter board of the present invention. The following description is with reference to these FIGURES. Program video at standard levels is presented to U7, a current buffer, after having been terminated at 150 ohms at the input connector, and is provided to output of U7, Pin. 8. U7 insures that the signal appearing at the input of U7, Pin 4, is low impedance sourced, regardless of system input source variables, i.e. long cable runs, faulty source impedances, etc.) with sufficient drive current to slew and drive the inputs of U19.

U19 adds the "back porch" DC level correction voltage to the DC level of the incoming video and accomplishes the task of putting the "back porch" of video at "0" volts each scan-line time. U8 serves as an integrator of the sampled output level captured by U9, and holds it while presenting the same to the noninverting input of U19.

A transistor pair Q9 and Q10 act as buffers for the low pass luminance filter comprised of the associated LC components, and passes this monochrome video signal to U9, U10 and U20-C.

U20-A, U20-B and U20-C together form a synchronization processing stage for the purpose of b 1) restoring the incoming sync tipes to a level of approximately 80 millivolts below ground, 2) setting a slicing level for the sync pulse tips at about 185 millivolts above ground, and hand off the thus sliced sync to U6-A, and 3) producing the track and hold sample pulses required by U9 in order to restore the "back porch" to "0" volts each scan-line time via U8 and U19.

The sync sliced as described above is relatively input-level-independent due to being sliced so far down. This "raw sync" passes as shown from U11-A into a monostable multivibrator or one-shot U16-A which produces a sampling pulse for transmission gate U17 and its associated sync "mid-point" slicer U18-A. While this is happening, the DC restored luminance signal from the output of Q10 has been buffered, and appears at the output of U10, and is provided to input pins 8 and 10 of U17 for sampling and U18-A for slicing at its mid-point. U16-A is actuated on the leading edge of the sync signal and has a duration of about 3 microseconds causing the transmission gate to sample the lowest of the sync voltage peaks. This value is then stored and divided in half to become the slicing reference of U18-A, and thus the sync signal is divided at the current scan-line using the sample from the immediately previous scanline.

The DC restored video from the output of U19 passes to U14 which operates as a long tailed balanced differential pair switch with nulled offset. This differential pair switch is coupled to Q13 and Q14 in conjunction with U15 as an output buffer, with feedback from the output of U15 passing to both pins 3 and 2 of U14, thereby providing symmetry to the balanced pair. The 100K Ohm potentiometer R103 feeding into pin 2 of U14 via the 51K ohm resistor R102 serves to balance this network into nulled offset during switching. Switching action and control is performed by a signal which, when processed by U13, swings from +8 volts and then is level controlled by the 1K ohm potentiometer R88 in its output path into the back-to-back clamping diodes D7 and D8. After being clamped substantially uniformly at +/−0.7 volts by the diodes and R88, the switching signal passes to pin 8 of U14 where it causes the output of U14 to either have the incoming program video present upon it or to have "video ground" or "black" present on it. It will thus be appreciated that switching occurs at a time when incoming video is at "black" (the track and hold serving to assure this), and thus switching offsets or "glitches" due to potential differences across the switch are minimized to values well within the range of less than three millivolts, and only typically vary routinely one millivolt, as described above.

The switchable video signal "XX", passes into pin 4 of U6 where it is summed with data that is to be inserted on a video scan-line, and then passes through a 200 ohm level control potentiometer R9 to U1 for buffering before leaving the system at a level of 2 volts peak-to-peak unterminated. U6 receives data from buffer and level translator U2 and algebraically sums it with the "0" volt DC level that is present when the incoming video has been switched "off" by U7. As noted above, the network feeding pin 5 of U2 is a sine-squared filter which has been set up to the value of "T" of 125 nanoseconds.

U5, a 79L02 regulator, and associated components serve to create a constant current source which serves to sink current through the 302 ohm resistor R22 from the emitter of Q4. The base of Q4 is held at a steady +0.7 volts. Normally Q5 will hold off this current sinking, and the collector of Q4 will remain near +5 volts by virtue of the 301 ohm resistor R19 at the output end of the sine-squared network. When a data cell is required to be at logic high, Q5 is turned off thereby allowing a fast current pulse to enter the sine-squared network which shapes this pulse into a data cell having precisely a 125 nanosecond rise time regardless of the tie duration of the cell. Conversely when a logic high cell is required to undergo a transition to logic low, Q5 conducts and the above process reverses itself for the reverse transition. The video exiting the switch comprising U14, and associated circuitry, has been inverted, and is now re-inverted to "positive going" video upon passing through U6 where it shares the signal path with the encoded and inserted data signal. A pedestal control signal "PC" is a TTL level which, when active, causes a pedestal to be raised above "black" by 7.5 IRE units by acting as a bias to the data signal chain. It is raised and lowered at the beginning and end of the data signal keying sequence. It possesses the same rise and fall characteristics as data cells.

Complimentary transistor pair Q7 and Q8 serve to buffer the monochrome filter components. The output video from U6 feeding this configuration is thereby lowpassed into luminance only and is passed to U5 where it is sampled, and then passed to U4, where it is integrated. The output of U4 is then provided at the noninverting input of U6 where it serves to restore and DC offset that may have been introduced from the sine-squared filter, or other components of the data pulse forming component chain, before the data signal has arrived at pin 4 of U6. Signal AA driving U5 is the same track and hold signal that was employed in the prior stages to effect "back porch" DC restoration.

Video timing signals are generated from the incoming external composite sync signal, termed herein "ECS", as it is passed from U18A as signal "ZZ" to pin 15 of U21, U21 is powered at a specified voltage of 6.75 VDC, to, in turn, outputs the required timing signals to buffers U22 and U23 for level translation to +5 volt CMOS signal levels, for output as syncing signals.

A non-maskable interrupt to microprocessor U44 occurs at the falling edge of the VERTICAL signal and thus is at the end of one odd or even field, of a frame of a video signal, field and the beginning of the next field at the field rate. The duration of the VERTICAL signal permits a period of 9 scan-line times or approximately 550 microseconds (the length of time it takes to write 9 scan-lines) to load the shift registers U34 to U37 with the data to be inserted, thus enabling the CTC, U56 at its TRG3 input to begin performing the scan-line count as soon as this period is completed. Scan-line counting is performed so that the output of U38 at pin 19 is raised approximately one half scan-line-time prior to the occurrence of the scan-line of interest. This serves to enable U28B so that upon the occurrence of the following H1 and H2 signals, the insertion process for the scan-line of interest is commenced.

The data which has been loaded into the shift register U34 to U37 can be inserted on any one of a number of scan-lines within a predetermined scan-line area. In the preferred embodiment, scan-lines 14 through 30 are generally selected as the predetermined scan-line area. The selection of the scan-lines occurs in software. This selection can be changed each fieldtime. The process of insertion, once initiated by the processor, continues under hardware control for 2 current field-time without further intervention from the processor. U24, U25, and U26 complete their insertion timing and count tasks, until completion. This serves to safeguard against data being inserted "randomly" in an undesired scan-line section.

U40 and U49 decode the addresses for interface circuitry interface shift registers and the CTC, U56, and I/O, enable respectively. The data shift registers U34, U35, U36, and U37 are mapped into the memory area even though they are output devices. This is done so that the data written can be read back from memory from the same address location in order to minimize ambiguity as to if there is any question about the contents of the registers and in a processor "restart" scenario.

U42A, and U42B and U43A together serve to create, in a synchronously clocked fashion, both the timing interval required to turn off the incoming video at the scan-line of interest, and to generate the date frame signal that controls the precise insertion of the data in place of the pre-existing scan-line video information.

Signal "DD", which turns off the incoming video also enables the data shift registers, while the data frame signal actuates the bit counters, U24, U25, and U26, which perform the actual shifting of data onto the scan-line of interest. As described above, this shifting is accomplished from the master clock (5.06 megahertz) which is phase-locked to the incoming horizontal rate, thus providing an adjustment of the data rate, such that all data inserted is timed in relationship to the primary horizontal video rate.

U43B prevents the first bit of data at the output of the shift register chain from being present at the data/video summer if it happens to be at logic high. This keeps all undesired data transitions muted. It places the input to U3B through to the sine-squared chain at "black" or "0" volts. In this manner, the shift register chain establishes a predictable state at its output and yet also permits the first bit present to appear at the start of "insertion" time. As discussed, the 5.06 megahertz clock signal synchronously clocks this flip-flop when it is in the active state.

The remainder of the circuitry of the inserter board (FIG. 5 to FIG. 5L) is associated with microprocessor 146 and shared with memory window 152. The operation of this circuitry will be appreciated by those skilled in the art after reference to the description of the shared memory window as later set forth with respect to FIG. 8A, 8B and 8C.

The Inserter Operations

Figure 6:
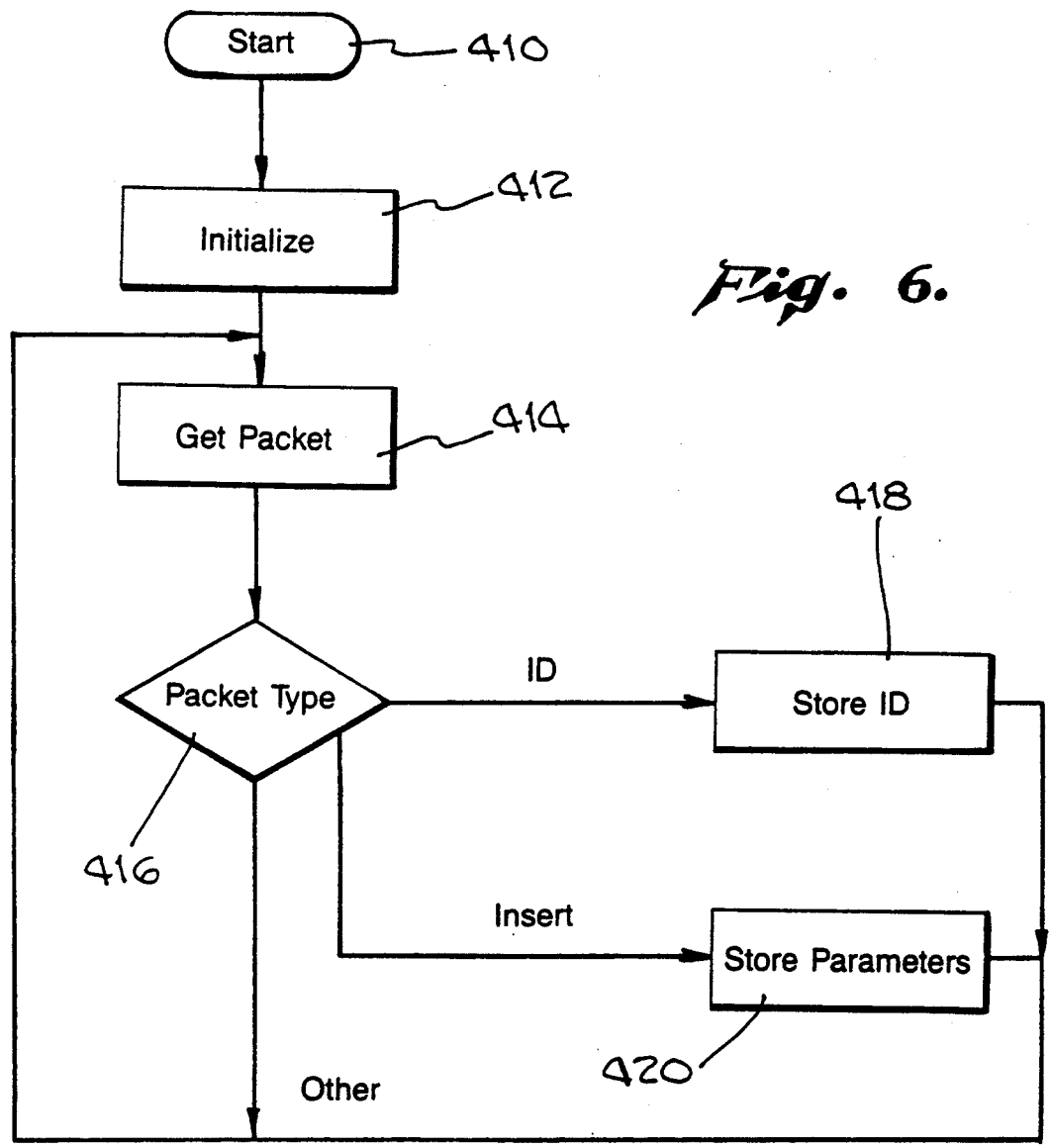
FIG. 6 is a flowchart of the main loop of the program which drives the microprocessor of the insert of FIG. 5.

In FIG. 6, there is shown a flow diagram of the steps executed by the above-described inserter circuitry. When the system is actuated, a start occurs at step 410. Registers are initialized at step 412. At step 414, a data packet from the shared memory window 352 is read by the firmware. A decision is made at step 416 as to what packet type has been read. If it is a program identification packet, it is stored for further use at step 418 in RAM 350 of FIG. 5. If the packet type at step 416 is an insert packet, it is also stored at step 420, and at the appropriate time causes the insertion of data. After storage at steps 418 or 420 there is a loop back to step 414. The main loop runs continuously looking for packets in the shared memory window until an interrupt is executed.

In FIG. 6A, there is shown a further flow chart of the data insertion steps when microprocessor 146 (of FIG. 5) receives a non-maskable field interrupt from the inserter hardware, when an inserter field interrupt routine starts at step 422. At step 424, a determination is made as to whether a start trigger exists. If the answer is Yes, then encoding begins at step 426. If the answer is No or after encoding has begun at step 426, a determination is made at step 428 as to whether encoding should be going on. Assuming, that the answer is Yes, branching to step 430 occurs and data is loaded into shift register 198 (FIG. 5). At step 432, a scan-line counter begins counting scan-lines to determine when to insert the data. [The blocks in parallelogram rather than rectangular form indicate that the firmware instructions in ROM 148 are providing output to and causing an operation of the hardware, as distinguished from a merely software related operation.]

If encoding does not take place at step 428, or after the scan-line counter has been started at step 432, the field interrupt routine continues to step 434 where a timer determines whether the field time has expired. If the answer is Yes, then encoding has ended at step 436. If the answer is No, or after encoding has ended at step 436, the field interrupt routine is exited at step 438 and control is returned to the main loop (FIG. 6).

Figure 6B:
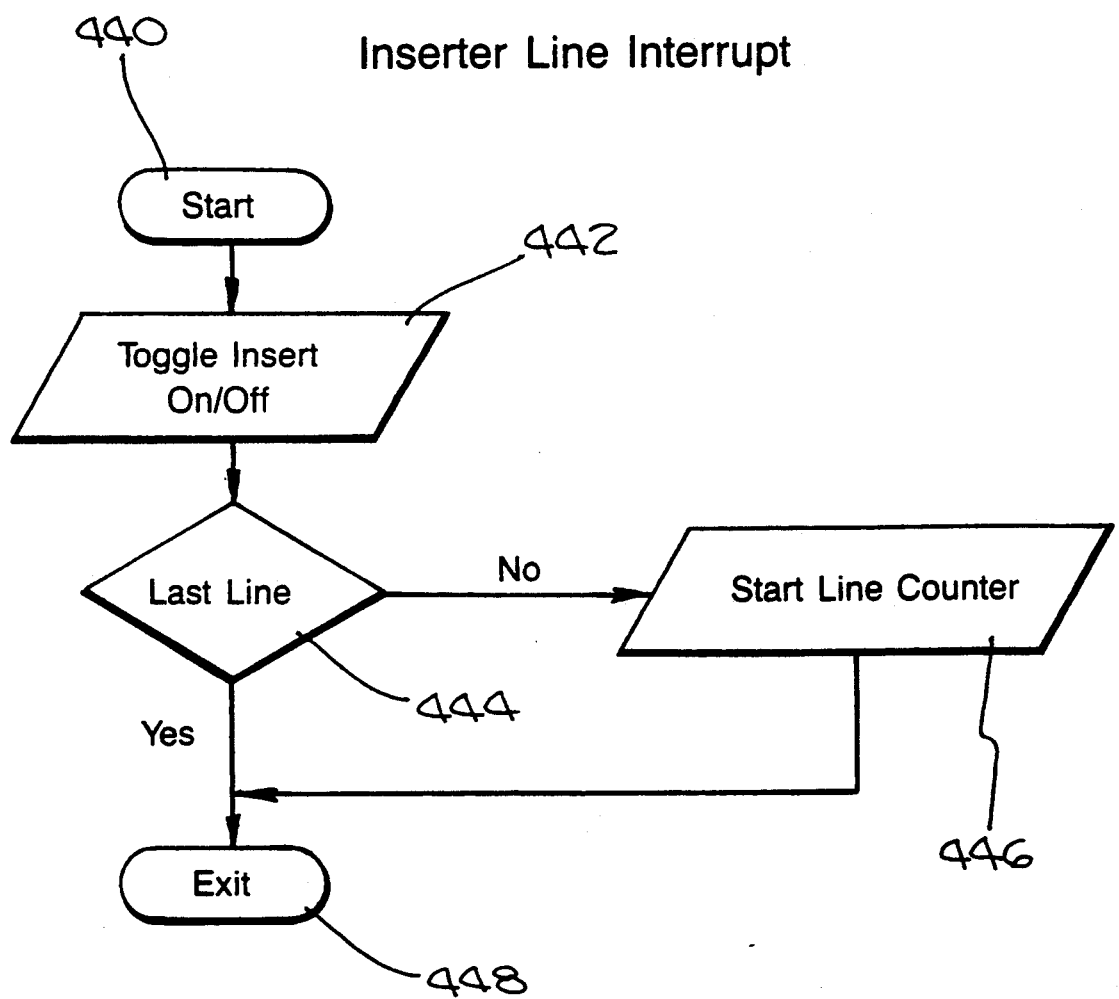

Referring to FIG. 6B, when microprocessor 1 receives a scan-line interrupt from the inserter, the inserter scan-line interrupt routine is started at step 440. At step 442 a hardware insert toggle is caused to change states. At step 444 a determination is made as to whether the current scan-line is the last scan-line of video to be encoded in the particular frame. If it is not the last scan-line to be encoded, the hardware scan-line counter is started again at step 446, as in step 432 (FIG. 6A). After the start of the scan-line counter, or at the last scan-line of video of a frame that has caused the interrupt, the inserter line interrupt routine is exited at step 448.

The Field Receiver

In FIG. 7, there is shown a block diagram of the circuitry of field receiver 36 of the present invention. Appropriate heat exchanging and cooling arrangements are provided so that the thermal gradient between the inside of the enclosure with a 150 watt load and the outside ambient temperature is kept between 3'F and 8'F. The enclosure houses a passive backplane with a bus structure 204 similar to that used, for example, in an IBM compatible personal computer. In order to assure adequate ventilation of the circuit boards plugged into the backplane, the spacing between the various boards is 1 inch, rather than the typical 0.7 inch spacing. The passive backplane has as its only active element a terminating network (not shown) that is actively biased at a level that substantially reduces noise and increases the operating reliability of the bus, which routinely runs at 8.0 Megahertz. Passive backplane 204 is also coupled to a hard disk controller 206 which controls a hard disk 208 having a capacity of 20 or 40 Megabytes. Passive backplane 204 is also in communication with a CPU or processor board 210 which includes on board memory, 220, and a multifunction I/O card 212 having a display adapter 214 for interfacing to display 202, a keyboard interface 216 for interfacing to keyboard 203 and a serial port 218 for interfacing to a modem. A floppy disk controller 222 receives a floppy disk 223 and a hardware based system clock 224. The circuitry previously described with respect to FIG. 7 forms a PC bus structure commonly known as a CPU platform.

Field receivers 36 may also include an expanded memory card 226 for enhanced storage capabilities. A modem 228 may also be coupled to passive backplane 204 in order to place data on modem telco line 64 (of FIG. 1). A surge protector 230 serves to protect modem 228 from surges that may occur on telco line 64.

Also, coupled to backplane 204 are by decoder boards 232A to 232L. Each decoder board includes a frequency agile television receiver 234, a television signal processing block 236, a microprocessor 238, a ROM 240, a RAM memory 242, and a RAM memory 244. Power supplies 246 and 248 provide power to the system.

By means of a selector switch (not shown) local RAM 242 serves as a shared memory window between the CPU platform and the microprocessor 238, as more fully described below.

In FIG. 8, there is shown a block diagram of the video signal processing portion of the decoder boards 232A to 232L of FIG. 7. The circuitry of FIG. 8 includes a television receiver 234 and television signal processing circuitry 236. Video from the antenna is led to a multi-band tuner assembly 500 such as a Sharp VTYAIU10Z miniature tuner. The band on which tuner assembly 500 receives is determined by inputs provided on three logic lines from a driver 502. Driver 502 buffers the output of a decoder 504 which, in turn, is driven by a frequency synthesizer 506. Tuning data is inputted to synthesizer 506. This tuning data is provided by a frequency packet as described below with respect to FIG. 8A, and a tuned clock signal. Synthesizer 506 may be a type MC145155 which includes an on board oscillator stabilized by an external 2.0 megahertz quartz crystal. The feedback frequency element from the Tuner assembly, 500, is derived from a buffered output of the tuner's local oscillator, pre-scaled down by prescaler 501, and then inputted to synthesizer 506. The phase detector output of synthesizer 506 is integrated and buffered by an operational amplifier 508, and serves to control a voltage varying capacitor within tuner assembly 500 with a DC voltage to achieve accurate tuning to the selected frequency.

The intermediate frequency video output of tuner 500 is provided to the input of a demodulator 510. Demodulator 510 provides an automatic gain control signal which is fed back to tuner 500 in a manner well known in the art. Another output of demodulator 510 is an automatic frequency tuning voltage which is supplied to an analog-to-digital converter as described below with respect to FIG. 8A.

The video output of demodulator 510 is provided to an amplifier 512 having a gain of approximately two. The output of amplifier 512 is provided to a low pass filter 514 which removes the chroma signal so that only the luma signal is passed therethrough. The output of amplifier 512 is also provided to a clamp circuit 516 which includes a clamping diode which serves to clamp the tips of the horizontal sync tips to ground potential, and produce pulses in correspondence with the occurrence of horizontal sync. This horizontal sync pulse signal is then provided to an operational transconductance amplifier (OTA) 518 which serves to differentiate the pulse so as to generate another pulse at the output of OTA 518 which has, as its period, the back porch portion of the video signal.

This back porch signal outputted from OTA 518 is provided to the GATE input of an OTA 520. OTA 520 serves as a sample and hold circuit providing and holding at its output and in capacitor 519, the DC value of the back porch portion of the video signal sampled during that period. The video signal to be sampled is provided to OTA 520 at its input from filter 514 which removes the chroma information, leaving only the luma information.

The output of amplifier 520 is fed to the inverting input of amplifier 512. The net effect of this arrangement of circuitry is for amplifier 520 to sample the voltage at color burst time or back porch time and to feed back to amplifier 512 to compensate for any DC offset present in the incoming video waveform. This circuitry provides a DC restoration of the back porch portion of the Video waveform to zero volts, for a large range of input offset voltages. The output of amplifier 512 also is provided to a driver 522. The base band video output of driver 522 is then provided to the timing extractor 600 and the data slicer 618 discussed below with respect to FIG. 8A.

The output of amplifier 512 is also supplied to a chroma band pass filter 524 which excludes the luma portion of the video waveform, to provide a signal containing only the chroma portions. The chroma only output is provided to one input of a gated dual input intermediate frequency amplifier 526. The other input is the timing extraction output of a synchronization stripper, as discussed below with respect to FIG. 8A. The output of amplifier 526 is passed to a buffer 528 which provides an output only if a color burst signal was present.

Demodulator 510 also provides 100 KHz wide band audio which includes the stereo and SAP carriers. This wide-band audio signal is supplied to a stereo decoder 530 which receives appropriate mode input signals and provides outputs including a logic signal indicating the presence of the stereo carrier and another logic signal indicating the presence of the SAP carrier.

The left and right channel audio signal outputs are supplied to a dual compressor/expander 532, of a type well-known in the art, which serves to limit extreme variation in audio level. The outputs of compressor/expander 532 are provided to a dual band pass filter 534 with switchable tuning controlled by a switch bank 536. For reasons described below, it has been found that the switches are preferably adjusted so that band pass filter 534 has a Q=3 and a frequency range of 600 to 800 Hz.

The left and right channel output of band pass filter 534 are supplied to respective buffers 538A and 538B. The outputs of these buffers are in turn supplied to separate RMS-to-DC converters 540A and 540B which provide a unipolar output proportional to the absolute value of the audio input. The output of each of converters 540A and 540B is supplied to a respective peak following circuit 542A and 542B, and to one input of respective comparators 544A and 544B. The output of each of peak followers 542A and 542B is provided to the other input of respective comparators 544A and 544B.

This treatment of the audio signal produced by stereo decoder 530 is very useful in detecting transitions from program material to commercials. Typically, commercials are broadcast with greater audio spectral energy than program material. This is especially so in the range of 600 to 800 Hz to which filter 534 is generally tuned. Converters 540A and 540B provide outputs that, in many respects, resemble envelope detection of the audio. However, any rapid changes such as those which occur on transition from a program to a commercial are noted by a change in the output state of comparators 544A and 544B in view of the more rapid peak following capabilities of peak following circuits 542A and 542B.

Referring to FIG. 8A, the DC restored base band video output of driver 522 (FIG. 8) is supplied to timing extractor 600 which may be an LM 1881 chip. Timing extractor 600 produces several outputs. These include an odd/even field signal which has a logic state depending upon whether the odd or even field is being processed, a burst flag which is a pulse generated every time a burst signal is encountered, a vertical synchronization pulse which is output every time a new field of video is received, and an external composite synchronization signal, ECS, which contains both horizontal and vertical synchronization information. The ECS signal is supplied to a buffer 602 which serves to distribute it elsewhere in the system.

The output of buffer 602 is supplied to a half-line eliminator 604 which is essentially a monostable multivibrator which is not retriggerable, and serves to eliminate the vertical synchronization information which appears as half line horizontal synchronization pulses found in the first six or so lines of the video signal. The output of the half line eliminator 604, known as HREF is fed to a phase locked multiplier 606 which produces an output of a frequency of approximately 5.03 MHz which is thus derived from the input frequency of 15,734 Hz, and the horizontal scan line rate of the NTSC television picture (this rate, in turn, being derived from half line eliminator 604).

The output of oscillator 606 is supplied to a programmable bit slicer 608, which includes a counter 610 for counting pulses from the oscillator 606 and a PROM 612, as well as counter 622 used to control the start/stop timing of the output of PROM 612.

The output bits of counter 610 are provided to the address bits of PROM 612, PROM 612 is programmed so that a bit output is toggled every N counts from counter 610. With a clock frequency of approximately 5 MHz, this provides a 200 nanosecond graticule for generating a signal which can be used to clock the data as described below.

One of the outputs of the phase lock multiplier 606 is a lock detector. This output is fed into a lock loss latch 614. If the synchronization of phase lock multiplier 606 is broken at any time, lock-loss latch 614 records that occurrence for later indication to microprocessor 238 that synchronization was lost. This condition makes the data which has been accumulated during a data frame suspect. Depending on the amount of frame data loss, a different processing of the data by microprocessor 238 (FIG. 8B) will be initiated.

The input to data slicer 618, which may be a device such as the SL9100 by Plessey Semiconductor, is the luma only DC restored base band video also supplied to timing extractor 600. Data slicer 618 supplies an output signal called line data. Line data is derived by the data slicer 618 in an adaptive manner. In that, at each horizontal scan line time, the highest and lowest value of luma are sampled. These values are stored and divided by one half. This one half division level is the slicing level for the luma values on the subsequent horizontal scan line. This slicing level, along with the active video luma information, is fed to a voltage comparator internal to the data slicer 618. Thus a signal having binary states of 0 volts or 5 volts, representative of the changes in amplitude in the base band video, is supplied at the output of the data slicer 618.

The output of half line eliminator 604 is also supplied to line counter start control 621 which is configured for counting to begin at the end of the start of the current field time, due to the input of the video sync signal, VSYNC. The output of line counter start control 621 is provided to a line counter 620 which counts video lines and is reset after each field, (i.e. at half-line time). Line counter 620 may be programmed by data received from microprocessor 238 (FIG. 8) as described below. When line counter 620 reaches a preprogrammed line, such as for example line eighteen of the video, it activates a data frame counter in block 622, which is hardwired to count for eight lines of video, and supplies a read frame output signal for the duration of these eight lines. This read frame signal is integrated with the HREF signal within block 622 so that the shift data counter 610 is begins counting into PROM 612, on each of the eight lines referred to, at a time and place where the center of each of thirty-two data bit cells expected to be present.

The shift-data-in clock produced at the output of PROM 612 of programmable bit slicer 608 is supplied to an input of AND gate 624. The output of AND gate 624 is used as a clock to shift line data from data slicer 618 into shift register 738 (FIG. 8B). Whatever the logical state of the output of the data slicer 618 is at the instant of the occurrence of the shift-data-in clock, that logical state will thus be shifted into shift register 738 and stored therein. The other input to AND gate 624 serves to allow data stored in the shift register 738 to be shifted out, after all eight lines of 32 bits each has been read.

Upon having shifted 256 data states from data slicer 618 into shift register 738, the bit shift control 622 portion of programmable shift circuitry 608 initiates a nonmaskable interrupt signal (NMI) to microprocessor 238 which then, will pursuant to a routine stored ROM 240 (of FIG. 7), begin the read of the data states contained in shift register 738 into serial-to-parallel translator 742, eight states at a time.

The circuitry of FIG. 8A also includes an analog-to-digital converter 626 which receives, at its input, the AFT voltage output provided by demodulator 510 (of FIG. 8). During normal operation, if tuner assembly 500 has been properly tuned to the frequency represented by the tune data received by synthesizer 506 (of FIG. 8), the AFT voltage will be within a very narrow range and will vary only slightly due to normal operating excursions. However, if for some reason tuner assembly 500 is not properly tuned, the AFT output voltage of demodulator 510 will significantly depart from its nominal value and will cause analog-to-digital converter 626 to produce a digital output voltage representative of this condition, thereby safeguarding against improper tuning.

Also shown in FIG. 8A is a data buffer 628 and a series of latches 630, 632, 634 and 636 (FIG. 8B) which are all coupled to an internal data bus 640 (generally internal to FIG. 8A) and a data bus 702 associated with microprocessor 238 (of FIG. 8B). Buffer 628 is supplied at its input by internal bus 640 with data bits which indicate whether a shift has been accomplished, whether or not odd or even frame processing is occurring, whether synchronization lock has been lost, whether vertical synchronization is present, whether there has been an overflow in the output of analog-to-digital converter 626 and whether a carrier has been lost. These inputs become the output data placed on data bus 702. Because buffer 628 merely follows the input signals supplied, it can be read at any time.

Latch 630 provides an indication of the status of the demodulator 510 (of FIG. 8). The bit inputs are representative of the changed audio spectral density as indicated by the outputs of comparators 544A and 544B (of FIG. 8) and the presence of the stereo and SAP carriers as indicated by outputs from decoder 530 (of FIG. 8).

Latch 632 is used to provide data to line counter 620 from data bus 702. This data instructs counter 620 as to which line is the first from which data is to be retrieved. Latch 632 also provides the tune data and tune clock signals for use by synthesizer chip 506 and the mode inputs for stereo decoder 530. The tune data and tune clock signals are provided as a series of pulses by toggling the appropriate bits on and off a number of times. Thus, latch 632 is employed to take data from bus 702 and provide it to the circuitry of the decoder.

Latch 634 serves as a synchronization latch. The output of half line eliminator 604 is supplied to the input of a counter 642, which counts the number of horizontal synchronization pulses in a field. Before counter 642 is reset, at the end of each field, latch 634 stores the count in counter 642. Thus, any loss of horizonal synchronization is reported to microprocessor 238 (of FIG. 8B).

Latch 636 (of FIG. 8B) provides information as to how many color burst signals were present in a particular field. The output of buffer 528 (FIG. 8) is supplied to the input of a counter 644. Latch 636 holds the count so that is can be reported on data bus 702. Counter 644 is reset each frame.

Four bits of an address bus 700 associated with microprocessor 238 (of FIG. 8B) are provided as input to a decoder 648. Decoder 648, through various buffers (not shown), provides strobe outputs to buffer 628 and latches 630, 632, 634 and 636, so that data can be interchanged at the appropriate time with microprocessor 23, under the control of instructions stored in ROM 240 (of FIG. 8B) as more fully described below.

FIG. 8B and FIGS. 8C-1 and 8C-2 illustrate the interface between the decoder CPU platform and microprocessor 238. Microprocessor 238 is coupled to address bus 700 and data bus 702 (of FIG. 8A). ROM 240, which may be an EPROM, is coupled to this bus as well as to RAM 242 (which may be a local static RAM that is dedicated to microprocessor 238) and a shared RAM 244, which is used as part of a shared memory window.

Information from the CPU platform is received on a PC address bus 704 and a PC data bus 706. The address bus 704 and the data bus 706 are connected to all of the decoder cards. The memory of the CPU platform is mapped so that a range of memory addresses corresponds to each of the shared RAM memory chips in the decoder boards. Thus, to access a particular decoder card, an instruction is executed in the CPU platform to output a particular address on the four most significant bits of address bus 704. When the unique four bit address for a particular decoder card is recognized by a decoder 708, as determined by the setting of the 16 possible states of the decoder board logical address select switches 709, a bus request signal on that decoder board is transmitted to microprocessor 238 on bus request line 710 (line 710 undergoes a transition from a logic high state to a logic low state).

When the bus request is received by microprocessor 238, the following actions are initiated. First, the bus request signal causes all interrupts and all internal data to be stored and the execution of program instructions to be halted. The address and data lines of microprocessor 238 are tri-stated; i.e. they assume a high impedance condition which is neither a logic high nor a logic low. Coincident with the bus request signal being asserted to the microprocessor 238, a signal is provided to the CPU platform, on a signal 720 line known to the CPU platform as I/O Ready. The assertion of this I/O Ready signal to a low state, via gate 714 and OR-Ring Diode 718, causes the compute CPU platform's central processing unit (CPU) to assume a wait-state; i.e. to enter a state in which it is essentially looping on no Operation instructions, either for the duration of 10 such states, or until I/O ready signal 720 is no longer asserted.

At such time as the microprocessor 238 has completed tri-stating its data and address buses, and has completed its computational housekeeping as described above, it asserts a bus acknowledge signal at 712 (a transition from logic high to logic low).

The bus request signal on line 710 and the bus acknowledge signal on line 712 are supplied to both inputs of OR gate 716. Upon this occurrence of the assertion of bus acknowledge signal on line 712, and, in the continuing presence of the bus request signal (already low) the output of OR gate 716 is caused to go low, thus causing address bus switch 736 and data bus switch 734 to connect the tri-stated data and address lines of shared ram 244 to the address and data bus lines of the CPU platform.

Additionally, the output of gate 716 is coupled to a delay circuit comprised of resistor 722 and capacitor 724 such that the inputs to inverting buffer 726 are changed to a low logic state some several 100 nanoseconds after the data and address bus switches 734 and 736 have already changed state, and the switches have completed their connecting of the shared memory RAM 244 to the CPU platform busses 704 and 706.

Upon completion of the delay period created by resistor 722 and capacitor 724, the output of inverting buffer 726 changes from a logic low to a logic high. This transition causes two things to happen. First, because the output of inverting buffer 726 is connected to the other input of OR gate 714, the output of that gate then transits from low to high logic state, thus no longer asserting a signal on the I/O Ready line to the CPU platform, and releasing it from the compute waitstate which was its state until the shared memory RAM 244 became connected to its busses 704 and 706. Second, via inverting buffer 728, a chip enable is issued to the shared memory RAM 244 so that is may then be written or read by the CPU platform.

As part of its read or write instruction, which is directed at the address location decoded by address decode pal 708, the CPU platform will continue to assert that address until the current read or write instruction, the decoding of which initiated this process, is completed. In a similar fashion, the bus request signal on line 710 will continue to be asserted until the completion of that read or write cycle. When this read or write shared cycle at memory RAM 244 has been completed by the CPU platform, it will no longer assert the address to address decode pal 708. The latter device will then cause the bus request signal 710 to resume a logic high state.

When the bus request signal on line 710 goes to a logic high, several things happen. First the output of OR gate 716 goes from a logic low to a logic high, causing the address bus switch 734 and the data bus switch 736 to release shared memory RAM 244 from its connection to them. Second, the microprocessor 238, which has also concurrently received the end to its bus request, but which is slower in responding, soon thereafter brings its data and address busses 702 and 700 out of tri-state, reconnects, and resumes its previous operational state. All other signals resume their prior states but, in so doing, have no further effect on the operation of this circuitry.

Thus, any memory location within the shared memory RAM 244 may be, at the instigation of the CPU platform, read or written at any time without regard for the state of the microprocessor 238 or the program state of ROM 240.

Line data from data slicer 618 of FIG. 8A is supplied to a shift register 738 which is clocked by the data clock signal discussed with reference FIG. 8A. Data is shifted out of shift register 738 to a serial to parallel translator 742 so that at appropriate times the data from the shift register, in eight bit increments, is placed on data bus 702 to be utilized by microprocessor 238, as later discussed in more detail.

Operation Of The Decoder

Figure 9A:
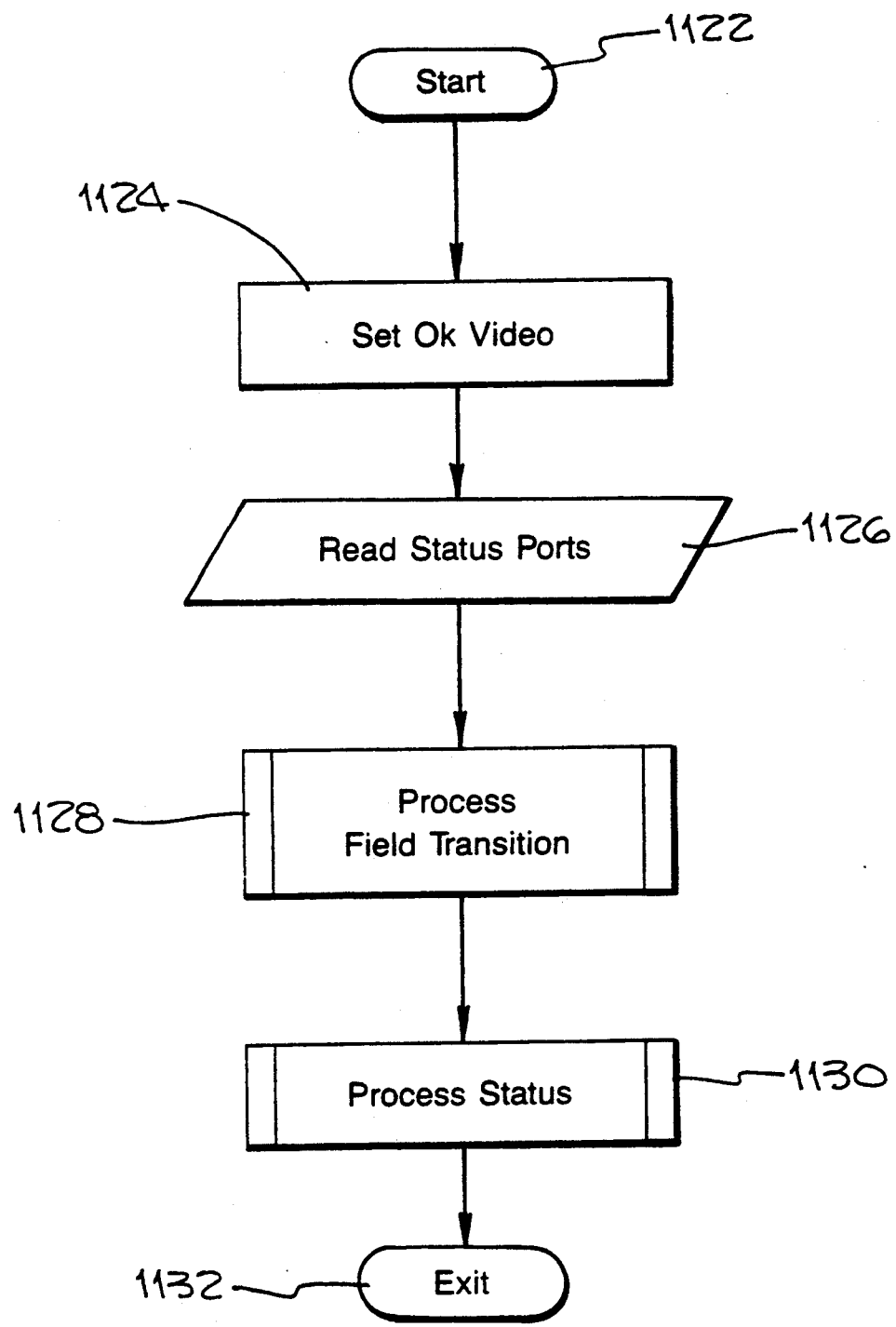
FIG. 9A is a flowchart of the decoder field interrupt routine associated with the program of FIG. 9.
Figure 9C:
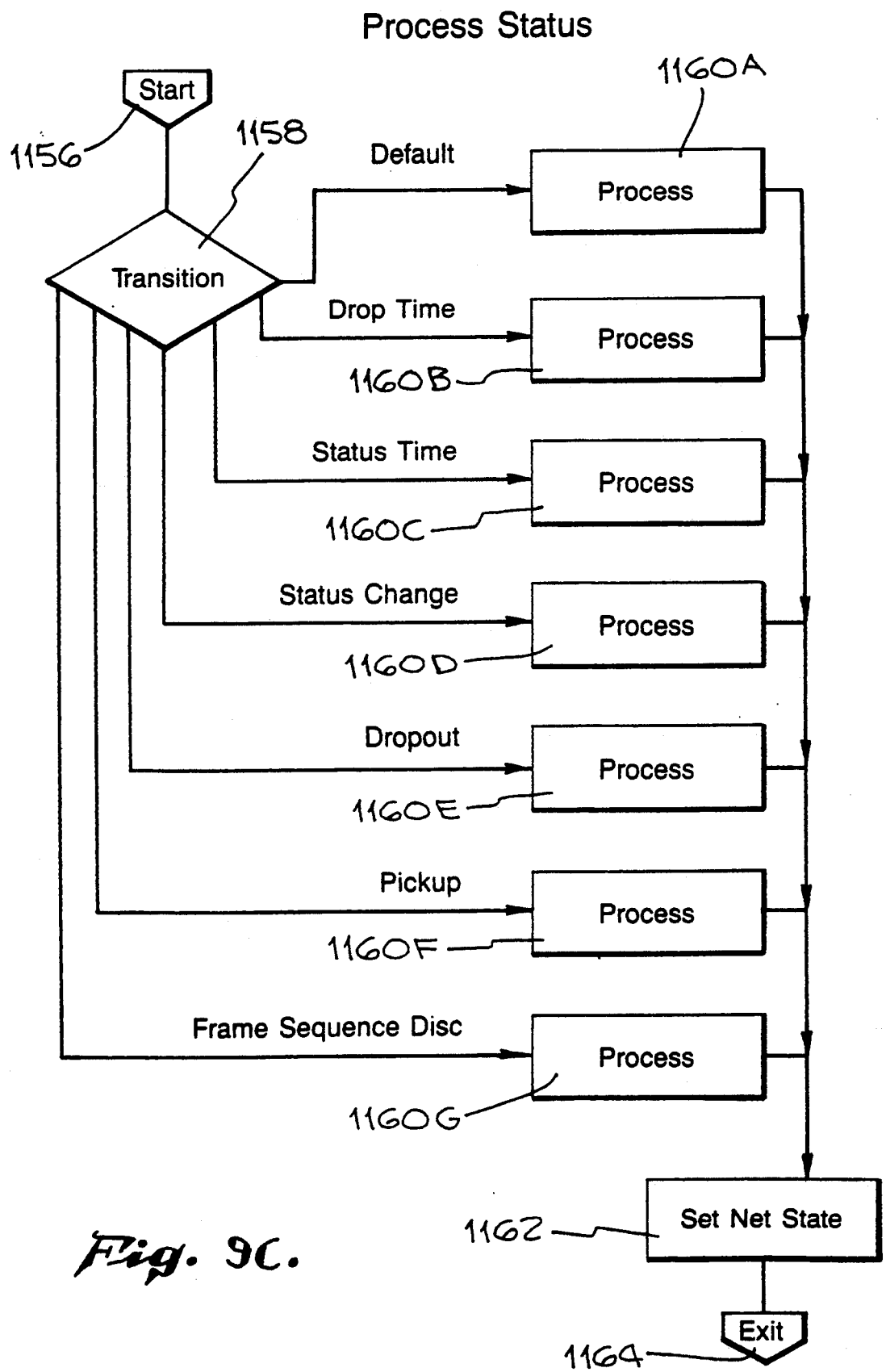
FIG. 9C is a flowchart of the process status routine of FIG. 9A.

In FIG. 9, there is shown a flow chart illustrating the operation of the decoder circuitry. Start is at step 1100. At step 1102, registers are initialized. The decoder then continually repeats the following: At step 1104 a determination is made as to whether a video signal is present or not. This is done by means of a timer which is always reset when a field interrupt occurs. When the timer reaches zero, at a time significantly longer than one field time, a determination is made that there is no video coming in. Branching then occurs to step 1106 where the status flag, indicating that video has been lost, is set. The status that was set is processed at step 1108, which is a subroutine defined in FIG. 9C.

If there is a video signal being received, branching to step 1110 occurs. At step 1110, a packet is taken from the input queue, i.e. those data packets coming from the CPU platform. Each packet is handled in a manner depending on the packet type as determined at step 1112. If the packet is one of the several parameter type packets described above, the parameters are stored for later use at step 1114. If a turnover packet is detected at step 1116, a flag in memory is set indicating that a turnover has been requested for later examination, when it is appropriate to do a turnover, if a turnover has been requested. If the packet is a frequency packet (which is actually a specific type of parameter packet) it is stored and at step 1118 a frequency parameter is sent to the appropriate receiver tuning hardware to cause that hardware to tune to the appropriate channel as it has been selected. If the packet is a restart packet, at step 1120 the decoder identifier and the frequency parameters are sent back to the decoder software. Any other type of data packet is ignored. After going through the main loop and receiving a packet, the program loops back to step 1104 and repeats the same process again.

In FIG. 9A, there is shown a flow chart illustrating the operation of the decoder field interrupt routine. The decoder field interrupt is a signal generated by the hardware once on each field of video after the hardware has shifted the data off the eight lines of video that are read. It generates a nonmaskable interrupt to the processor. After starting at step 1122, after an interrupt was just received, an OK video status flag is set at step 1124 in view of the video signal which must be present in order to generate an interrupt (as opposed to the lost video status of FIG. 9). At step 1126 all the status ports that are provided in the hardware are read. There are several ports with status bits and several ports with counters. A field transition is processed at step 1128 as described in more detail with reference to FIG. 9B. At step 1130 a status transition is processed, as described in more detail with reference to FIG. 9C. The decoder field interrupt is exited at step 1132.

The flow chart of FIG. 9B illustrates the process field transition routine of FIG. 9A. After beginning at step 1134, at step 1136 one of four branches is taken depending on the previous state and depending on the status of the two odd even field bits provided by the hardware.

Figure 12:
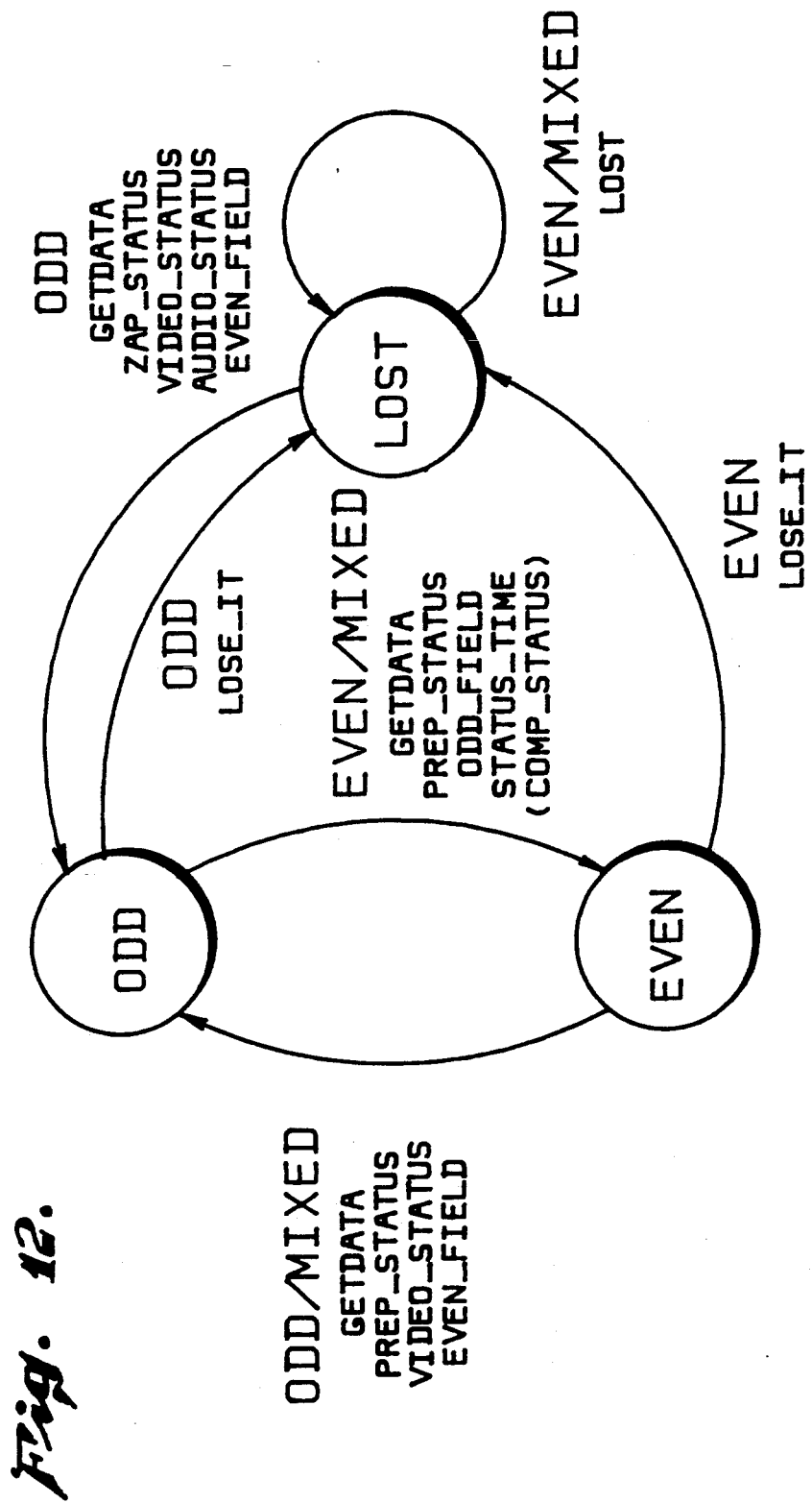
FIG. 12 is a state diagram illustrating the process status routine of FIG. 9C.

The current state is set at step 1138A, 1138B, 1138C or 1138D according to the state diagram of FIG. 12 at step 1140A or step 1140C a status buffer is initialized. Status is maintained in the decoder memory in a buffer in the form of a status packet. The initialized status is stored as an empty status packet with all zeros. At step 1142A, 1142B or 1142D (in three of the four possible paths) the eight lines of raw video data that were shifted out of the hardware are read and stored in an area in memory. The odd field data is stored in one area of memory and the even field data is stored in another. There are only two sets of data; i.e. data from the odd field and data from the even field. At steps 1144A, 1144B, 1144C or 1144D a check for video status occurs; i.e. a check is made for the various conditions that come from the status bits that were previously stored, (e.g. video status, frame burst count, sync count, horizontal reference, vertical sync detector, etc.).

At steps 1146A, 1146C or 1146D, audio status is checked. It is not checked on the even field, but is instead checked once per frame on the odd field and in the less frequent case of a loss of recover transition. As described above, audio status is provided in the form of two bits; the channel 1 bit and the channel 2 bit, which may be in the identical logic state in the case of a monaural broadcast. In the case of a broadcast with SAP (Secondary Audio Program), the two bits are the left plus right (the monaural channel) and the SAP channel. In the case of a broadcast with no SAP, but in stereo, the two bits represent the left and right channels. In the case where stereo and SAP are both present, then the SAP has priority over stereo and the two bits represent first the sum of the monaural channel and the normal audio and second the SAP. The bit sets indicate a changing condition on the audio signal. As discussed, the total number of encoded frames are counted and the number of frames having the left or the number 1 bit, the number of frames having the number 2 bit, and the number of frames where the number 1 bit is not equal to the number 2 bit are determined.

On even transitions the program then proceeds to step 1148 to a data frame routine, described below with respect to FIG. 9D. On the lost branch, the program proceeds to compare status at step 1150 (which is also one of the steps in the data frame routine described below with respect to FIG. 9D). In either the even case, or the lost case, a status timer is decremented and checked. Whether the timer is running depends on its state. If the status timer is running, it is decremented and, if it reaches zero, expires and a status time status transition is generated at steps 1152B or 1152C, as described below with respect to FIG. 9C. The process field transition routine is exited at step 1154.

In FIG. 12, there is shown a flow diagram illustrating the unique odd and even field detection of the present invention. It is important to note, however, that the discrimination of odd versus even fields depends on the relative timing between the vertical and horizontal sync pulses, and is typically subject to error because of poor reception conditions or external interference. In the present invention, however, error in discriminating the operation between odd and even fields is greatly minimized.

Commands stored in the decoder 46 (FIG. 1) compensate for an ambiguous indication of odd versus even fields by predicting expected alternation of fields. A field that is not clearly identified by the two odd/even bits is assumed to be the expected field, by assuming that it is the opposite of the previous field. A field that is clearly not the expected one triggers a change to the "lost" state, which is exited only when a clearly identified even field is indicated. This operation enforces the odd/even field pairs, expected by a data recovery algorithm of the present invention, even in the presence of errors in the detection of fields, and thereby correctly tags odd and even fields. As shown in FIG. 12, when the nonmaskable interrupt is missed completely, as detected by the timer in the main idle loop, the system is forced into the "lost" state in order to aid recovery when video returns.

In FIG. 9C, there is shown a flow chart of the process status routine that occurs as step 1108 (of FIG. 9) and also as step 1130 (of FIG. 9A). After start at step 1156, the applicable transition path is selected at step 1158, depending on both the current status state and the type of transition (if any) previously generated and stored for this frame, as detailed by the later discussed state diagram in FIG. 11C and Table I. After the status transition is processed at one of steps 1160A through 1160G, the resulting status state is stored for subsequent use at step 1164. The process status routine is exited at step 1164.

Figures 11A, 11B:
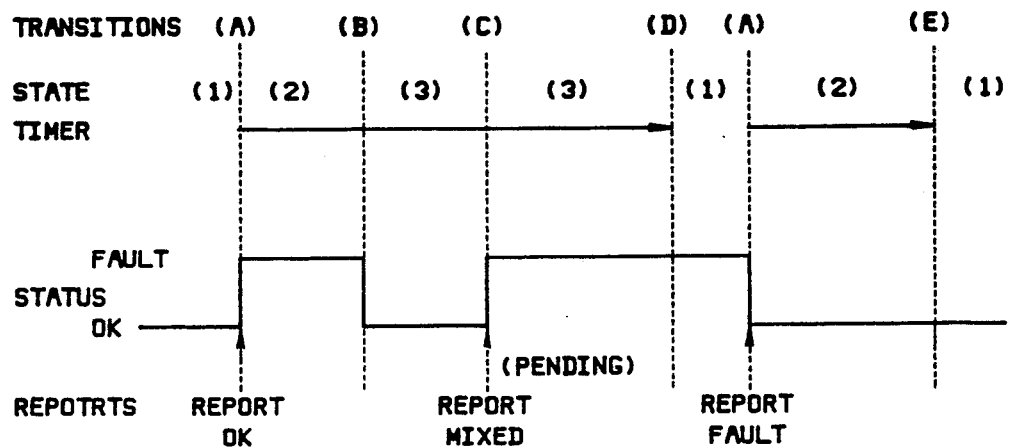
FIG. 11A, FIG. 11B and FIG. 11C are a timing and state diagrams, respectively, illustrating how data is compressed by the process status routine of FIG. 9C.

In FIG. 11A, there is shown a timing diagram illustrating how the decoder responds to a series of changes in a particular status value. The status value changes four times, between "ok" and "fault." Only three status packets are reported, in view of the fact that some changes occur too close together in time for detection. FIG. 11A is keyed to the state diagram of FIG. 11B by states numbered 1 through 3 and transitions referenced by letters A through E. FIG. 11B shows the states that the decoder can be in, the kinds of events (status changing or timer expiring) that cause a change of state, and the actions that the decoder takes for each change of state.

Although FIG. 11A shows only a single status value changing, a change in any of the status values measured is considered to be a change in status and can cause a state transition. As noted above, after each video frame, the decoder compares a status packet just built (called the "New" status) with the one from the previous frame (called the "Current" status) to determine if anything has changed. The decoder uses one more copy of the status packet (called the "Pending" status) to keep track of status that has not yet been reported while status values are fluctuating. Current status is merged with pending status, until it changes to a predetermined rate, by combining the conditions in the current status with those in the pending status packet through OR operations.

The transaction processor uses FSD's to determine where segments of video start and end. In order to correlate status changes and errors to the correct segment of video, the transaction processor requires that every FSD be accompanied by a status packet, i.e. that FSD's always force the start of a new status interval. The status compression algorithm described with respect to FIG. 11A and FIG. 11B is complicated by the requirement of synchronizing status packets with FSDs.

Figure 11C:
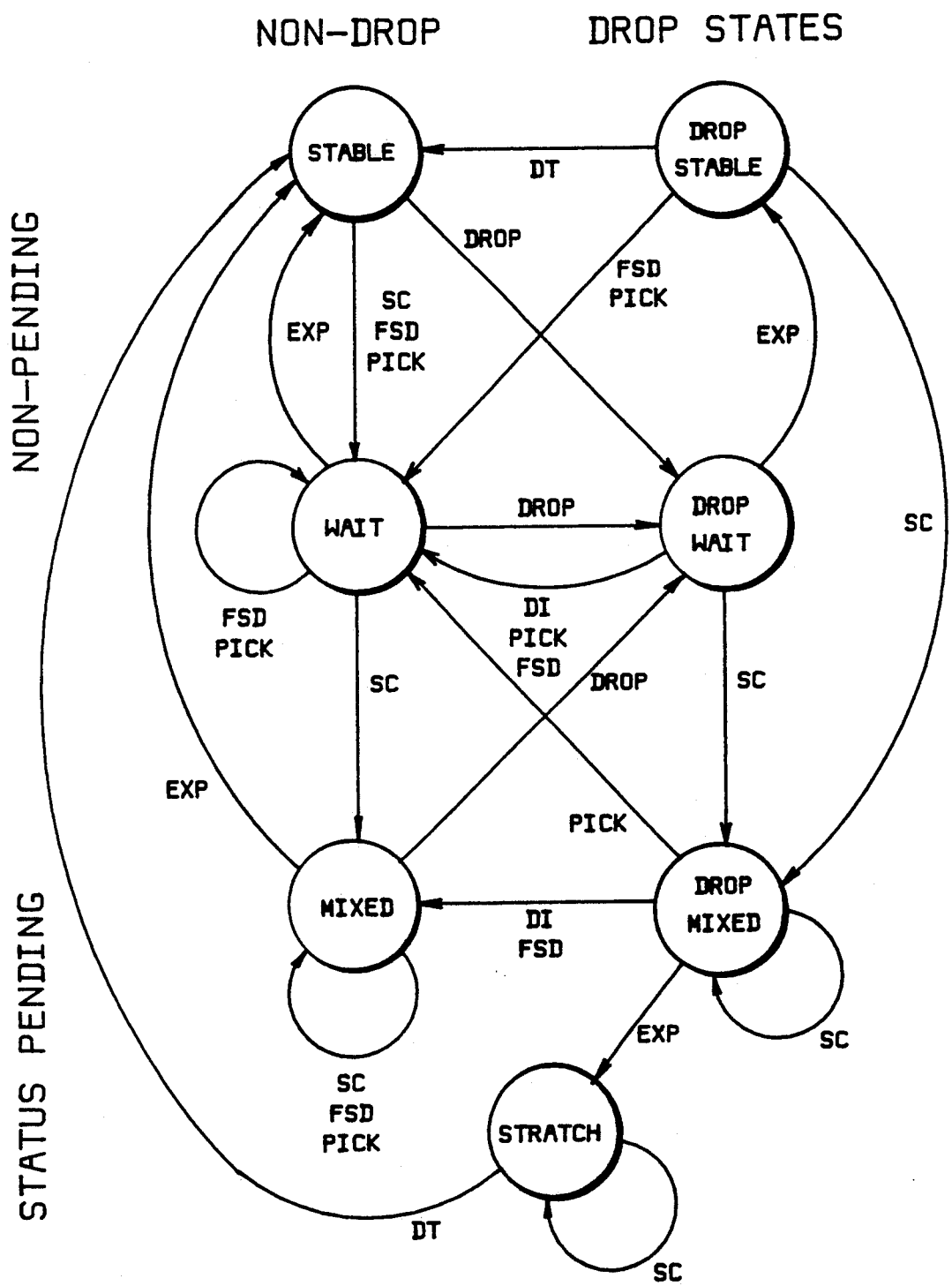

Referring to FIG. 11C the state transitions in the state diagram are abbreviated as follows:

| SC | Status change |
|---|---|
| EXP | Status timer expires |
| DT | Drop timer expires |

-continued

| FSD | Frame sequence discontinuity |
|---|---|
| DROP | Data dropout (decoder stops detecting data.) |
| PICK | Data pickup (decoder starts receiving data.) |

Only one such transition is allowed to occur during a given frame. The possible transitions are arranged hierarchically as follows: A Status Change has precedence over either timer expiration; the timer is either reset or delayed until the following frame. Dropouts, pickups and FSD's are mutually exclusive, and they all indicate a status change and thus have precedence over a status change transition.

When the decoder processing an encoded video signal stops finding data, it must wait for a time specified by the drop time parameter, to determine if data returns or not. If data returns and the frame counts are in proper order, the decoder reports only a temporary "no data" status condition. If the drop timer expires, the decoder reports a dropout type FSD along with a status packet covering the time up to the last encoded frame. The decoder, however, does not report status changes while waiting for the drop timer to expire.

In the state diagram, the states labeled "non-drop" operate as described illustrated in FIG. 11A, FIG. 11B and FIG. 11C when not processing a data drop condition. The states labeled "drop" are active while waiting for the drop timer to expire. The drop states function in a manner similar to the corresponding non-drop states, but accumulate all status changes until the drop timer expires. Thus, "Ok data" versus "No Data" status conditions are not subject to compression to the same extent as that provided for other status conditions. Data dropouts are always reported in full detail.

Figure 9D:
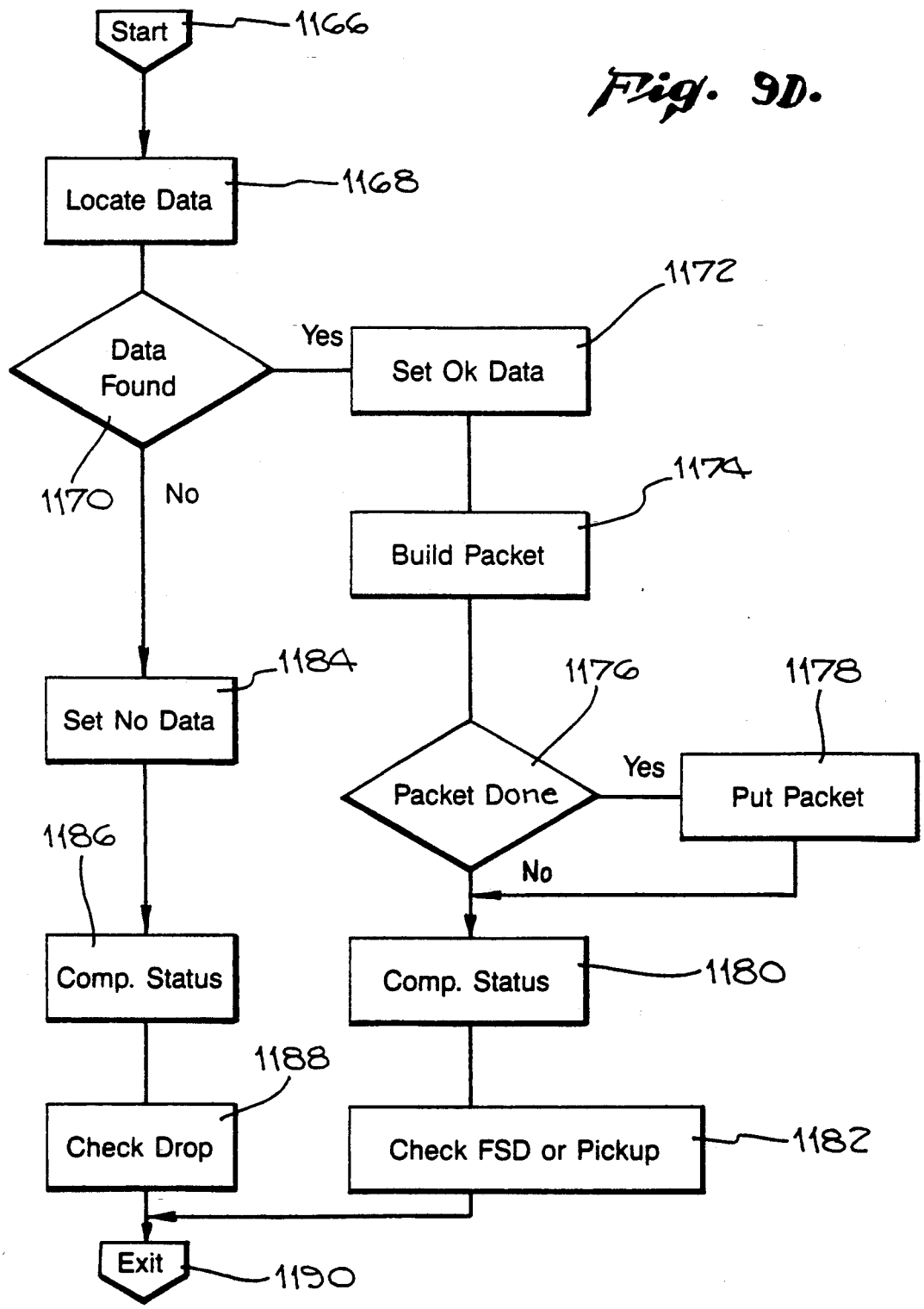
FIG. 9D is a flowchart of a date frame routine of the program of FIG. 9.

In FIG. 9D, there is shown the data frame routine of FIG. 9B and all of the actions having to do directly with the data or lack of data. After starting at step 1166, the data is located at step 1168 (the data may have been written at an unexpected location). This is done by comparing the lines of data from the odd frame with the lines of data on the even frame until, on the same line or on a adjacent line, the complement of the raw data is found, thus positively identifying data encoded by system 30 if the LRC check sum adds up to the right number.

If data is found at step 1170, branching to step 1172 occurs where a status bit is set, which indicates that the data is valid and should be processed. At step 1174, that data is added to the data packet that is being assembled, based on its position in the packet and based on the frame and word count associated with the data. If the packet is complete at step 1176 (i.e. the number of words that are processed match the packet length which was recovered by that point) the packet is placed into the output queue at step 1178. The status that has been built in the memory area where the status packet is being built is compared with the previous status packet from the preceding frame at step 1180. If the two packets are different, a status change transition is generated. At step 1182, the frame number in the recovered data is checked for an FSD (frames sequence discontinuity or discrepancy) which is generated if the frame number is not one greater than the previous frame number. Alternatively, a pickup type transition is generated if there was no data previously. If the data packet cannot be completed, status is also compared at step 1180, and the program then goes directly to step 1182. If data is not found at step 1170, a no data status flag is set at step 1184 and the status packets are compared at step 1186. If no data was found at step 1184, and if there previously was data found, a dropout transition is generated at step 1188. The data frame routine is exited at step 1190. At this time, process field transition is also complete, having been previously carried out during the data frame routine.

Referring again to FIG. 9C, the last substantive step in the decoder field interrupt (FIG. 9A) is process status. There are seven different states or transitions that can occur as represented by steps 1160A to 1160G. Step 1160A shows the default transition if none of the foregoing has generated a transition. Drop time transition occurs at step 1160B when each data timer cycle ends. A status time transition occurs at step 160C when the status change timer runs out. Dropout transition occurs at step 1160E when data was previously present, as detected in the data frame block, and is no longer present. Pickup transition occurs at step 1160F when data was not previously found but is then present. A frame sequence discontinuity transition occurs at step 160 when there was data and subsequent data has a nonmatching frame number.

For each of these transitions, which have no branching, the sequence of actions depends on the initial state. Table I lists, for each transition and for each state, the sequence of actions that occurs. Generally these actions consist mainly of putting packets in the output queue. The next state is set at step 1162 for the next access of the process status routine.

The actions taken, as summarized by Table I, depend on the state and the transition and largely comprise either merging the current status packet in memory into a saved status packet or putting packets, at various times, into the output queue. The decoder firmware maintains two status packets, the saved or deferred status packet, and the current status packet. The current status packet is the one that is assembled for each frame and the saved status packet is a packet that represents status for a length of time up to the current frame, from the last time that a status packet had been written to the output queue, as governed by the progress of the status compression algorithm that is illustrated in the state diagram of FIG. 11C. The saved status packet contains the information from the current status packet combined with it until it is time to write a status packet, when the status timer expires. A saved status packet is written out to the queue.

The logic by which the intervals are represented by the status packets is complicated by the requirement of tracking frame sequence discontinuities and synchronizing status packets with FSD packets at the frame level. It will be appreciated that if all signal variations changes were recorded, there could thus be so many changes, in a short period of time, that the field receiver would be unable to store all the data generated. The log file would be extremely large just to document insignificant changes in signal quality.

Thus, the decoder of the present invention records only significant changes.

The Field Receivers

As discussed with respect to FIG. 7, the CPU platform of FIG. 7 contains its own memory, floppy disk and controller, hard disk and controller, as well as supportive I/O capacity for keyboard and screen. Also as shown in and described with respect to FIG. 7, a memory window means passes packetized data to and from the various receiver/decoder cards and the bus of the CPU platform, with reference to the CPU portion of the platform performing the reads and writes to the memory window by requesting access to the shared memory window.

In a field receiver assembly, there are two concurrent tasks. The first task initializes the field receiver decoders, assigns each one to a desired channel and sets the various parameters, such as issuing time stamps, etc., previously discussed. The first task also retrieves all of the information generated by the monitoring process from the field receivers and stores them in the appropriate log file. The second task is termed herein as the "communications and scheduling" task. This task transfers the log files to the data center; causes modem calls to be performed at scheduled points by time of day and/or by date; and causes the execution of the time-of-day maintenance routing which, by communicating via modem with a time-standard at a central or remote site, updates or corrects the real—time hardware time-of-day clock in the field receiver.

The CPU Platform also employs an operating system which fulfills the following requirements. It provides for unattended operation in error trapping and recovery; it permits the performance of multiple tasks simultaneously and concurrently in such a manner so as not to limit the capacity of any one task by impinging upon the performance requirements of that task due to the demands of another concurrent task; and it supports various aspects of what is well known in the art as real-time computing. There are various systems which will complete the above requirements. A typical system, designed for attended operation, can be employed to fulfill the basic requirements of an operating system which can perform all of the above-mentioned requirements except multitasking. Multitasking can be fulfilled by the employment of commercially available software, which allows at least 2 tasks to be run concurrently. Error recovery is performed by what is known in the art as a "TSR" or Terminate and Stay Resident Program. The TSR is deployed at initialization by the CPU platform and intercepts the error interrupt calls that would otherwise be routed to the user at the screen or work station. The TSR then accesses a table which has stored therein the various actions and/or conditional actions that should be taken for each of the errors intercepted. If the error is non-recoverable, such as, for example, when a hardware component becomes non-operational, the CPU platform informs the data center of the non-recoverable error. It will be appreciated to those skilled in the art that operating systems that incorporate error recovery and multitasking as one integrated overall system are available and may be employed.

The Field Receiver Routine

Figure 10:
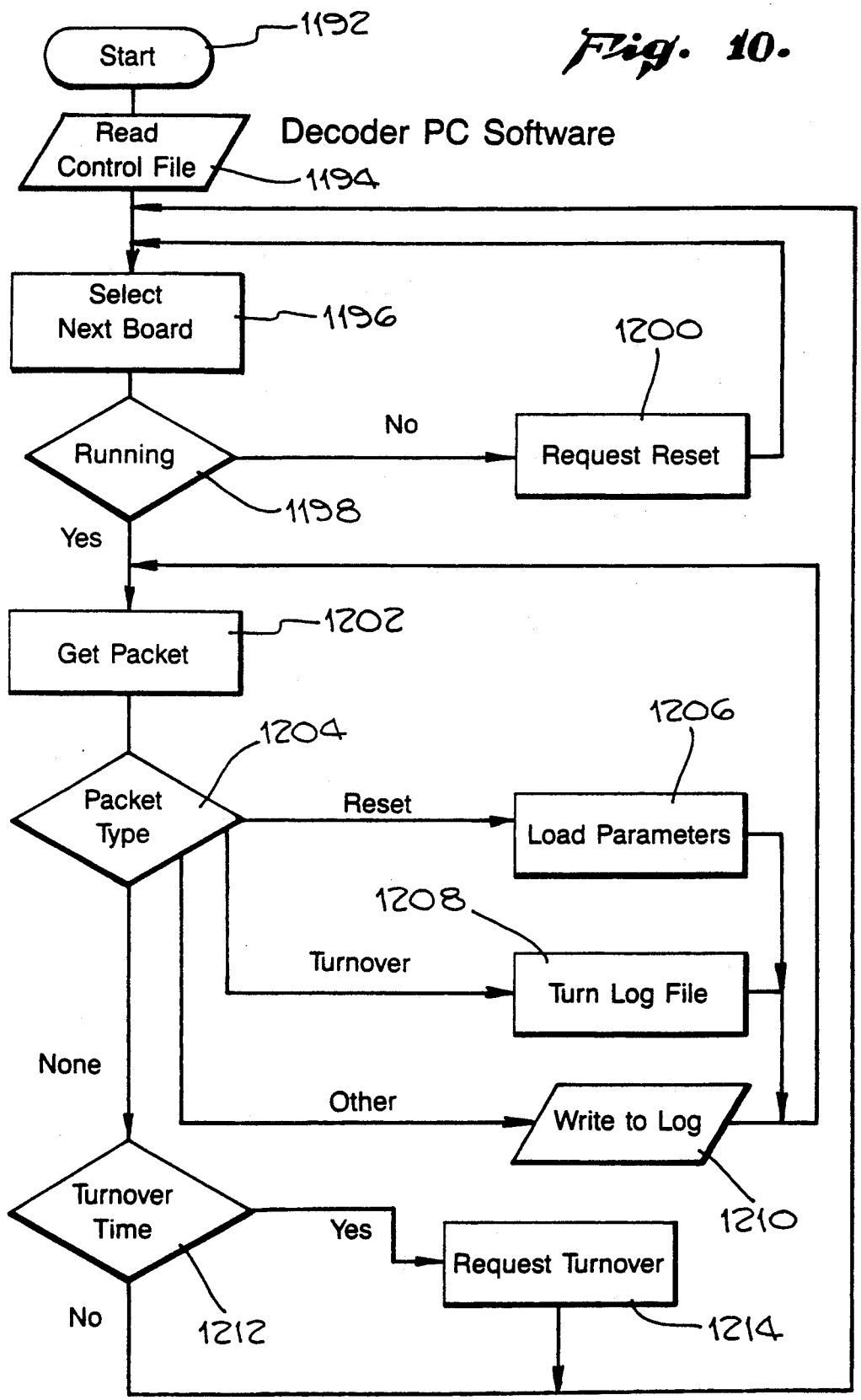
FIG. 10 is a flowchart of the operation of the field receiver of FIG. 7.

In FIG. 10, there is shown a flow diagram showing the operation of the field receiver CPU platform. Starts is at step 1192. At step 1194, a control file consisting of ASCII form packets is read and stored in memory. In this file each scan-line that is entered represents one packet. The packets select receiver/decoder boards and assign parameters to them.

The receiver/decoder CPU platform software then continually selects and services each board in turn. At step 1196, the next (or first) board is selected. At step 1198 that board is checked to see if it is operating. The board is determined as operating if it is has responded to a command transmitted thereto. A value is then written into the shared memory window. The firmware in the main loop stores a different value into the same location. The value is then read. If the firmware has stored its value, it is assumed to be running. If the firmware has not stored its value for a predetermined period of time, a reset will occur at step 1200 by storing into the memory window a flag that is periodically examined.

When the receiver/decoder is operating, as determined by the test described above, at step 1202 a request for a packet from the receiver/decoder board output queue is made. If a packet is obtained, the program selects a branch at step 1204, depending on the type of packet. If the packet obtained is a reset packet, then branching to step 1206 occurs and all the stored parameters for the selected board are loaded into that board by writing those packets into the board input queue. This occurs when the receiver/decoder firmware has just started up, when the receiver/decoder firmware has detected a fault and must be re-initialized, and when the CPU platform has determined that the board was not running and managed to reset the firmware. In any of those cases, the parameters are loaded into the board thus causing it to start and to monitor the selected channel.

If the packet coming form the receiver/decoder is a turnover packet, branching to step 1208 occurs and the log file is turned over. The log file being written to is closed, moved to another directory where it can be accessed by the communication software, and a new log file is opened. If nay other kind of packet is received, branching to step 1210 occurs and that packet is written out to the current log file. This is the case for timestamp packets, status packets, identifier packets and all the other generic kinds of packets which are channeled to the transaction processor as more fully described below.

The program then loops back to step 1202, where the loop is repeated for as many times as necessary to get all packets in the output queue of the board. When there are no more packets in the output queue, at step 1212, a check is made to determine how long it has been since a turnover of that board was accomplished. If the time period is beyond a predetermined period of time, as compared to a parameter that is stored in the CPU platform software (typically two hours), a turnover request packet is sent at step 1214 and a turnover packet is sent to the firmware by writing it into the input queue of the receiver/decoders. The flow then returns to step 1196 to select the next board, until all of the boards have been serviced. After the last board has been serviced in this manner, the program goes back to the first board and starts over. The receiver/decoder CPU platform software repeats this processing for as long as the field receiver is operating.

Transaction Processor Operation

A two-ended error correcting and event-scheduling communications package of a type well known in the art is used in conjunction with the present invention to prepare the log files for transmission and to collect log files from field receivers via modems and dial-up telco lines. The communications package end at the co--location with the transaction processor end then schedules an underlying utility, also well known in the art. The underlying utility translates the received log files back into the nominal format of a log file, i.e. a series of packets. These log files are then passed to the transaction processor and the transaction processor is scheduled to run.

The transaction processor accepts log file data as input. As described previously, the format of these log files is a series of packets. The transaction processor operates directly on the log files as they are generated by the field receiver software. The transaction processor serves the purpose of taking the raw data and transforming it into database entries. To this end, the transaction processor has two outputs; the error log file and the database updates themselves. The error log file contains all the errors and warnings that were encountered while transaction processing a group of log files. The database updates collect the data for the actual broadcast transmissions.

Figure 13:
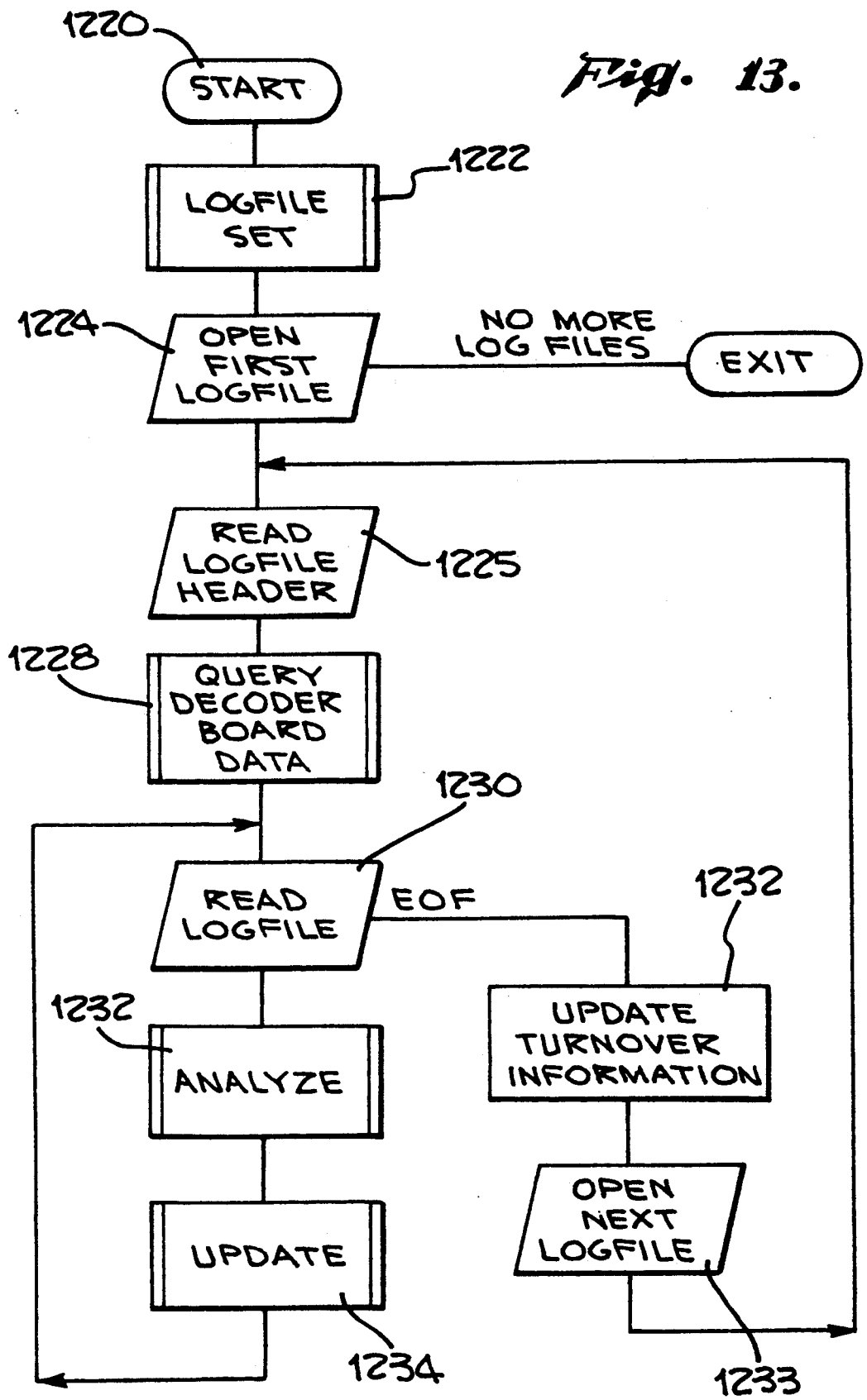
FIG. 13 is a flowchart of the transaction processor program used by the data center of the system of FIG. 1.

In FIG. 13, there is shown a flow chart illustrating the operation of the transaction processor of the present invention. The transaction processor is comprised of two main operating sections; an analysis section and an update section. These sections are linked together in the main program of the transaction processor. The main program reads the log files and commands the analyzation and update processes when desired. The transaction processor also tracks log file turnovers. Every turnover is logged to the database and concatenated with other stored turnover information.

Every log file starts with either a turnover packet or a restart packet and ends with a turnover packet or a premature end-of-file condition. The restart packet is generated when a log file is opened after a cold or warm boot. A premature end-of-file packet can occur in a log file when the system is warm-booted, powered down or fails to operate.

These turnovers are used by the transaction processor to sort out whether data has been properly and completely received from the field receiver. Because data from field receivers can be received by the data center in any order, it is necessary to track the data in some manner to determine if all current data has been received from all the field receivers. A normal stream of log file data from the field receiver will contain turnover packets with turnover numbers in ascending order. If any missing numbers or restarts or premature end-of-file codes indicate that either log files are missing or data has been lost on the field receiver. The transaction processor keeps track of any restarts or premature end-of-file condition found in log files. In addition, the minimum and maximum turnover numbers are stored for a particular range of log files. Examples of turnover processing are set forth in Table II.

Referring more specifically to FIG. 13, at step 1220 the transaction processor is started and initialized. At step 1225 the group of log files to be processed is determined. These files are dated and prepared for access. At step 1224, the first log file, from the log file set, is duplicated in memory. At step 1225 the header information from the log file is read. This header information contains the field receiver and decoder identifier and other header information. At step 1228 information about the field receiver and decoder board that generated this log file is read from memory. At step 1230 this data is read. At the end of that particular log file, branching occurs to step 1232 where turnover information is updated, the next log file is read (step 1233) and the operation loops back to step 1225.

Prior to reaching the end of the log file being read in step 1230, the program branches to step 1232 where the analyze routine is called. After the data has been analyzed, as described below with respect to FIG. 13A, the update routine is called at step 1234. The program then loops back to step 1230 where additional packets are read from the log file and steps 1232 and 1234 are repeated in sequence until end of file branching to step 1232 occurs. If all of the log files have been processed, branching occurs to step 1226 and the program is exited.

Encoded information is stored in the log files in a raw data format. The data in the log files is essentially a representation of the data received by the field receiver with no interpretation as to content or form. In the preferred embodiment, data in the log files is not separated into commercials, shows, or the like. In fact, data from a single show may appear in the log file as many separate occurrences of encoding transmissions of a particular show may have only several encoded broadcasts, which, typically would be commercials.

The transaction processor performs the task processing of this raw log file data. This processing is accomplished through the use of "encoded fragment" queues. These queues hold data from fragments of raw encoded data and allow these fragments to be assembled into airings. There are three queues; the current queue, the last queue and the save queue. The current queue holds the fragment currently being processed in the log file. The last queue holds the fragments that are being pieced together into a complete airing. The save queue holds data representing a completely assembled airing.

Figure 13A:
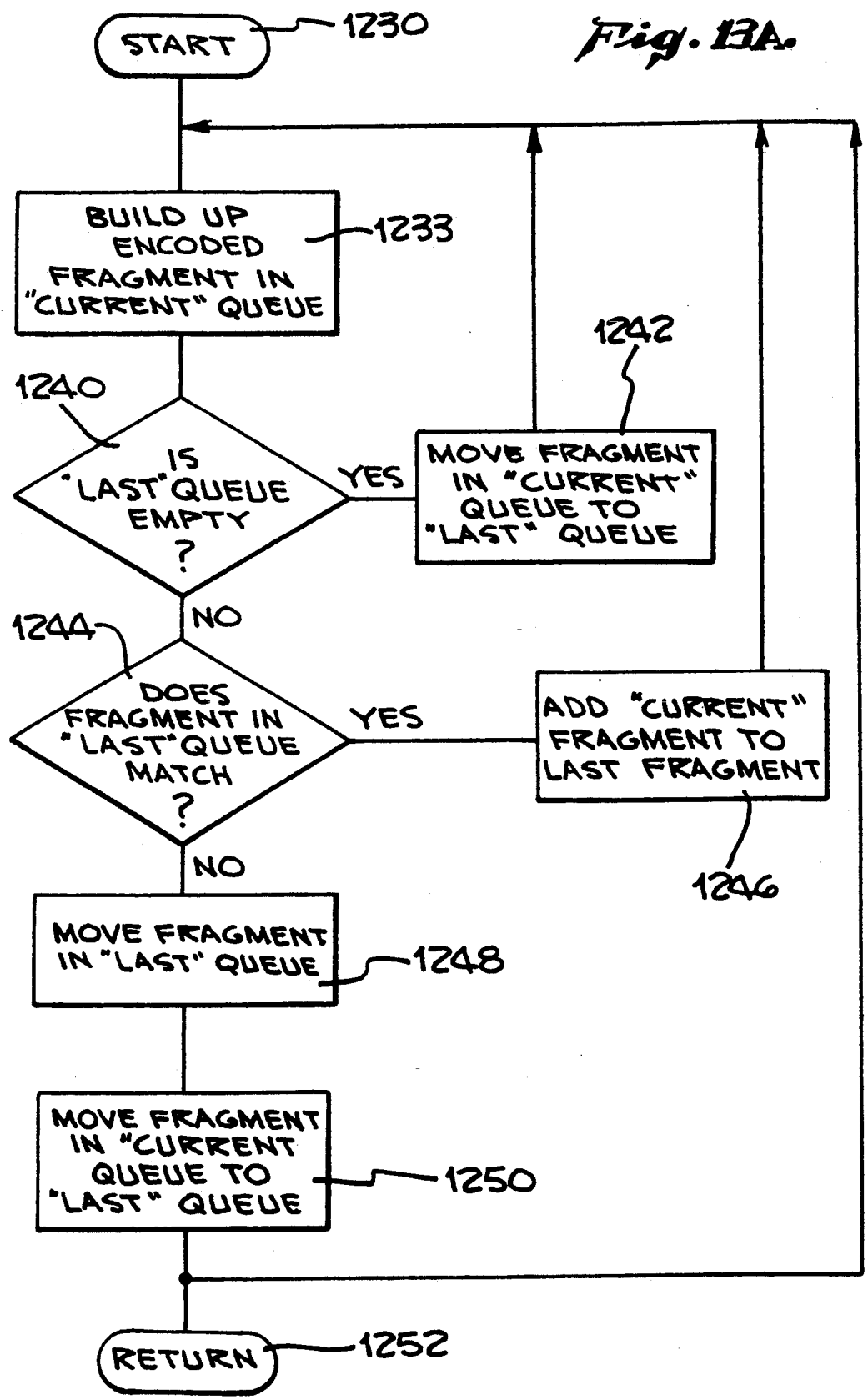
FIG. 13A is a flowchart of the analyze routine of FIG. 13.

Referring to FIG. 13A, the analyze routine starts at step 1236. At step 1238, an encoded fragment is built up in the current queue from data in the log file. At step 1240, a determination is made as to whether the last queue is empty. If it is, at step 1242, the fragment in the current queue is moved to the last queue. If the last queue is not empty, branching to step 1244 occurs. When an entire fragment is built, it is compared to the fragment or fragments in the last queue. If it is determined that the fragment from the current queue is from the same piece of encoding as the fragment or fragments in the last queue, the fragment in the current queue is attached to the fragments in the last queue at step 1246 and the current queue is emptied. If the last queue and current queue fragments do not match, then the fragments in the last queue constitute a complete encoding.

Branching to step 1248 occurs when the last queue fragments are moved to the save queue for processing by the update section. The current queue fragment is then moved to the last queue at step 1250 and the search resumes, at step 1238, for the next fragment of encoded data in the log file. When the entire log file has been processed, a return to the main program (FIG. 13) occurs at step 1252.

Data from the analyze section of the transaction processor contains complete airing information as received from the disseminated signal, as previously discussed. This information must be stored in an airing table and a status table and must be correlated with information about the encoded video and broadcast station. Basic information concerning the signal, such as starting time, ending time, encoded broadcast length, broadcast station, etc. is stored in the airing table by the update process. Status information is stored in the database as a result of analyzing the status data and correlating this to information about the encoded video and broadcast station. This correlation is performed by the update section of the transaction processor. Data about the airing, such as type of airing, length, and color/stereo/-SAP information, is retrieved from the commercial table. Data about the station is retrieved from the station table. This information is compared to the status data, frame count data, and time data from the airing compiled from the analyze section. The result of this comparison is status information such as upcut, color fault, drop out, etc. which is stored in the database with the information about the airing.

Figure 13B:
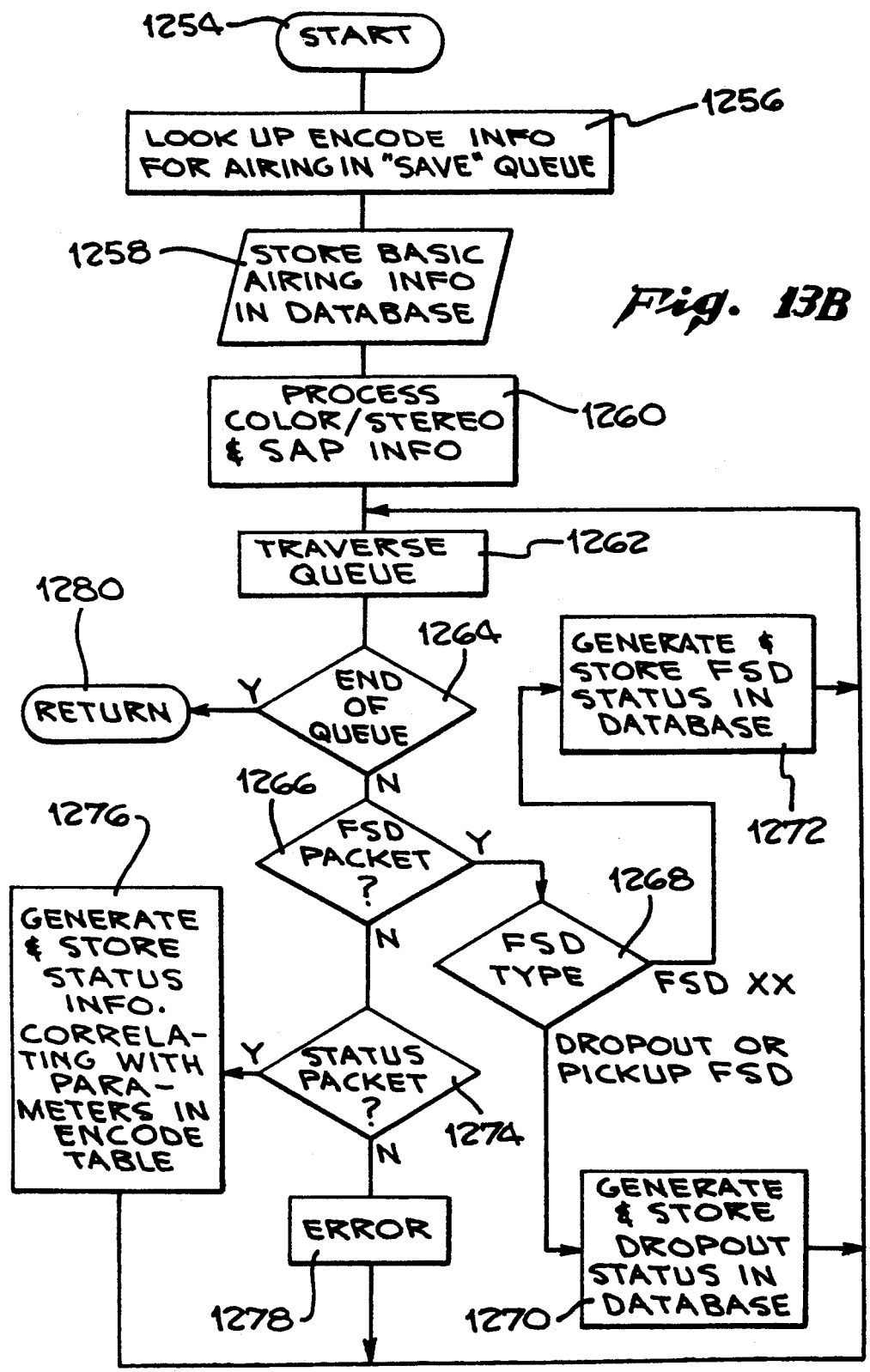
FIG. 13B is a flowchart of the update section of the routine of FIG. 13.

In FIG. 13B, there is shown the update routine of the present invention. Start is at step 1254. At step 1256, basic information about the airing is determined. Because the only data broadcast about the airing is a unique identifier, more information about the airing, such as title of program, etc. must be determined. Most of this information is stored, if available, in the database table shown in the screen of FIG. 1D. Other information must be determined by analysis of data in the log file to produce data about the airing. As noted above, basic information about the program or commercial is entered into the database when the program or commercial is encoded. It includes information such as the encoder identifier and time that coding is commenced, client identification, program length, the color/stereo/-SAP information and slate information. Originally, the information has previously been in the data center database.

It is important to note, however, that in a situation where the broadcast signal has been encoded at a post production facility which does not supply the information about the broadcast of which the encoded signal was a part (i.e., the particular program), this information can later be obtained by obtaining a duplicate of the entire tape of the encoded signal, a part thereof, or by referring to program airing schedules and the like. The most critical information, however, (i.e., the time of the occurrence, duration, quality and identification of the particular encoder that encoded the signal) is obtained automatically by the present invention.

Additional information about the airing such as starting and ending time and frame, broadcast station and channel, and the identifier itself can now be determined. This information is, optimally, stored in the database at step 1258.

The program length information is used to determine if the full encoding has been broadcast and whether any sections are missing. The color/stereo/SAP information is compared against the color/stereo SAP data which may be stored in a station table in the database or otherwise obtained, to determine if the station was capable of broadcasting color, stereo or SAP. This information is then compared, at step 1260, to the color/-stereo/SAP information from the log file to determine color/stereo/SAP status. Discontinuities in encoding are analyzed.

At step 1262 the information in the queue is read in sequence. As long as it is determined, at step 1264, that the end of the queue has not been reached, branching to step 1266 occurs. At step 1268, a determination of the type of FSD packet is made. If a dropout or pickup packet is indicated, branching to step 1270 occurs and dropout status is generated and stored in the database. Otherwise an FSD status is generated and stored in the database in step 1272. The program then loops to step 1262. Thus, information about encoding dropouts, along with the time and durations of the dropouts, are entered into the database and associated with the basic airing information.

If an FSD packet is not present at step 1266, branching is to step 1274. If a status packet is present, the program proceeds to step 1276. Status information about the airing is also contained in the fragments passed to the update section. This status information is refined by the update process and times and lengths are determined for each status element. This status information is also entered into the database and associated with the basic airing information. If a status packet is not found at step 1274, an error is indicated and branching to step 1278 occurs, where errors are logged into the error log.

The process of obtaining information about FSD and status from the save queue continues for each element of the queue. When all elements have been processed, the update processes are complete for that airing fragment and the update process terminates at step 1280.

The Data Base and Data Center

In a preferred embodiment of the transaction processor of the present invention, a relational database, which provides great flexibility in how the data may be manipulated to generate a report, is utilized. Such databases are commercially available.

In a relational database, no internal pointers or networks are used. Related data is stored in tables and individual data items are stored within columns in that table. All the data in the database is related to other tables by the data in columns, thereby permitting a great deal of flexibility in creating data structures. Other database formats may be used, as will be appreciated by those skilled in the art.

Figure 13C:
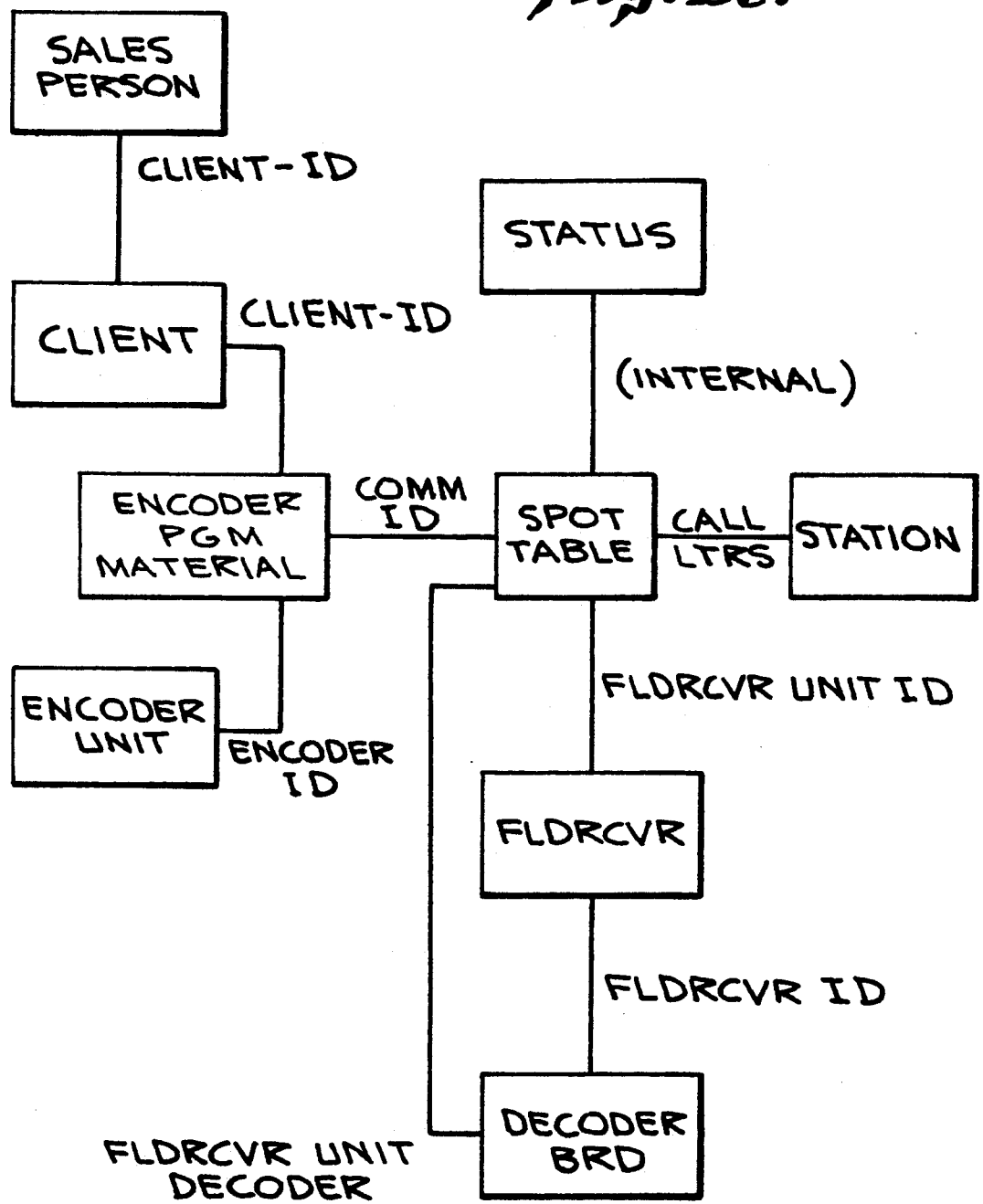
FIG. 13C is a diagram illustrating the database structure of the system according to the invention of FIG. 1.

Tables having Client, Salesperson, Commercial, Airing, Status, Station, Fieldreceiver, Decoder and Encoder information are stored in the data base, as shown in FIG. 13C. The client Table contains the data on the individual advertisers. The Salesperson Table contains information about the sales people that service the various clients. The Commercial Table contains the information on a particular show or commercial. This table includes such information as the title, product or episode of the show or commercial. It also contains the run time of the show or commercial, the video and audio attributes, the client identifier and the date and time of encoding. The Airing Table contains data on all the shows or commercials received by all field receivers. The Status Table contains the status information associated with the Airing Table entry at encoding. The Station Table contains information on the broadcasting station that is being monitored. The Fieldreceiver Table and Decoder Table contain the mappings of decoder boards to stations and call letters. The Encoder Table contains information about each encoder site. Other desired tables may be stored in the data base.

REPORTS

Once the database has been updated, there are many types of reports that can be generated from the database. Typical examples of these reports are illustrated in FIG. 14 and FIG. 15.

FIG. 14 illustrates a syndication clearance report. The reporting period and the report date are stated, as is the market, the syndicator and the name and episode of the show. The length of the broadcast episode and the date and time of encoding are also shown.

After this, a comparison of the broadcast airtime and the broadcast encoded time (ATX code time) is shown for the particular date and channel, if the information about the broadcast air-time has previously been received.

The next set of data, for a nominal one-half hour show, specifies the actual times when encoded program material was broadcast and the time, with respect to the beginning of the programming, when codes according to the system were placed on the tape. The actual run times are within one second of those specified. The data in bold face below this comparison data shows the gaps in the program when the local broadcaster put in unencoded local broadcast segments. As can be seen from the data, the total of the actual local time is 5 minutes and 30 seconds rather than 4 minutes and 13 seconds as originally contemplated. This indicates that the local station may have placed more commercials in the broadcast, which was lengthened from an originally contemplated 28 minutes and 23 seconds to an actual 29 minutes and 43 seconds, which, in turn, would alert a sponsor to a possible objectionable broadcast schedule. Because the program is monitored on a frame-to-frame basis, detailed reports of this type can be easily generated.

In FIG. 15, there is shown another report which may be generated using the present invention. The total show length and total encoded length can be compared. In addition, in FIG. 16 there is shown a table showing the times when commercials were shown and the actual run times of those commercials is also created. It will be understood that this table cannot be generated until the tape is reviewed to determine which commercials are on the tape and to determine the ISCI code for these commercials. However, once this is done, a complete report, including the actual broadcast time for the commercial, can be generated.

At Post Production Encoding

The system shown in FIG. 17 is one that is most useful in a post production environment. A final edited program tape 1300, which has not yet been encoded, is placed in the afore-described encoder 1302 of the present invention. An encoded master tape 1304 is thus produced. Multiple copies 1306 of the encoded master tape 1304 are then supplied to the television broadcast stations and, at the appropriate time, the program stored on the copies is broadcast by at least one broadcast station 1308.

As discussed, during post production or network encoding, a video sequence detector, capable of detecting changes in the content of the video material being decoded such as, for example, a syndicated television program added on to the tape containing the syndicated show, could determine the occurrence of the first frame having the "slate" information (i.e. name and other identifying characteristics of the promotional commercial), digitize the entire contents of that frame and store it in memory for later transmission to a central data base. Complete information about that particular promotional commercial would then be accurately obtained without the need for comparison of the received broadcast signals to a duplicate tape. Such a video sequence detector has been invented by the inventors of the present invention.

The program that is broadcast is received by the home viewer on his television receiver 1310. The broadcast signal is also received by antennas 1312A and 1312B of respective afore-described field receivers 1314A and 1314B of the present invention. Data from the field receivers is sent via modems to a database and central computer installation 1316. Installation 1316 may also be linked to encoder 1302 by a modem.

In order to generate hard copy reports 1318 on an appropriate printer 1320 or electronic reports on a disk 1322 or a tape 1324, it is necessary that information concerning the content of the encoded master tape 1304 be provided to the computer in installation 1316. This is because the encoding, as in the embodiment illustrated above with respect to FIG. is completely independent of the content of the program tape. This is accomplished in a manner which is quite convenient to the post production facility by simply extracting the encoded information from additional station "air" copy 1306 or otherwise providing the information. Thus, if any broadcast station alters the program by, for example, not broadcasting a portion of the tape or inserting unencoded material or material with a code not corresponding to that originally put on the tape, a complete report of the alterations, as well as the quality of the signal received by the field receivers, can be generated.

FIG. 17 shows two receivers in a given market. Although there may be spare decoder boards which can be reprogrammed in frequency in a particular receiver, the use of two receivers provides backup in case of failures caused by other unforeseen circumstances. For example, an antenna line between an antenna and a field receiver may be severed, or power may be lost at a field receiver, or the field receivers may be subject to physical damage because of lightning striking the antenna or other unexpected occurrences. In addition, the propagation path between a given broadcast station and one of the field receivers may be disrupted due to the presence of an extremely high level noise source, the passage of aircraft or other temporary disturbances. The use of two field receivers, preferably powered by an independent portion of the utility power-grid in each market, provides backup data. Thus the reports generated are far more likely to reflect the conditions of broadcast, rather than in view of the fact that merely the conditions of reception at a particular receiver, two sites are gathered, compared, and evaluated.

Network Feed Recognition

In FIG. 16 there is shown an overall view of the present invention employed for network feed (i.e. broadcast) recognition. FIG. 16 shows a satellite dish 1326 for receiving network feed signals which are then processed by field receiver 1314A. In the United States of America, there are three principle ways in which video or television program material is disseminated to regional areas for broadcast in local markets; network programming, which routinely arrives by live feed via satellite, syndicated programming material which routinely arrives via tape copy, and local programming which may be either locally produced live, or from a tape source. It is often advantageous to report to a user of the present invention monitoring whether a particular television commercial or program originates from the network feed or whether the "media buy" for the particular program material of interest was transmitted locally because the airing station was paid directly to broadcast it but did not do so because an exact copy of that very same portion of program material was included in the network feed.

Assuming that codes according to the system are placed on the locally possessed copy of the program material and are identical to those in the exact same program material contained in the network transmission, and to those in other sources such as syndication, it would generally be impossible to distinguish between the three different origins of the program material from a field receiver's point of view. However, if the network feed is concurrently monitored as an effort independent from but simultaneous with the local broadcast monitoring of that same material in each media market, then by comparing the results from both the field receivers in the local markets with the results produced by the field receivers monitoring the network feeds, the database and transaction processor are able, by analysis of such concurrently gathered data, to report which occurrences of airings of that same program material was sourced from a network which was sourced from syndication and which occurrences were locally sourced. If a comparison is made between the data generated by the network feed and that received from the local television stations, a coincidence in identifiers, start time, etc. indicates that it is a network program that is being monitored. Thus, the system according to the present invention can provide information as to whether the program is of network or other origin.

Another important application of the present invention is the ability to distinguish between network originating programming and syndication originating programming. For example, the same commercial (having a given ISCI code) may be broadcast during either local time or bartered (i.e. contracted) time. According to the present invention, however, these commercials would have different encoder identifier information (place, time and date of encoding) encoded thereon, and could be readily distinguished.

It will be appreciated, by those skilled in the art after reading the foregoing explanation of the above-described concepts, that the present invention has broad application. The data representative of any number of different versions of the same broadcast can be compared in the database. Two or more sources, or source pairs consisting of more than two sources, may be compared to assist in determining the origin of a program or to define subtle differences in program content from source to source.

Network Encoding

In yet another application of a system according to the present invention, an encoder may be placed at a network signal input so that all of the programs on the networks are encoded. The existing codes on already encoded program material may be replaced by codes from the network encoder. To assist in determining when program material was placed on the network, the epoch (i.e. time) data may be updated at relatively long intervals of time, such as every half hour. Further, the version byte in the program identifier may be used to specify the source of the program material such as networks, syndication, etc.

In yet another application of the present invention, two previously non-encoded scan-lines of the video signal may be encoded. These lines, or for that matter even a single line, may be within the active video, or within the vertical blanking interval if signal processing is standardized, so that video signals within the vertical blanking interval are not stripped out of the signal.

Thus, a first line may be encoded by the syndicator and a second line may be encoded by the networks in one of the ways discussed above. Two decoder boards, each programmed to recognize data on a different line/ may be used to recover the codes; an alternate approach to dual or triple scan-line data recovery is to establish two or more identical data streams from a single decoder board because the decoder board in the preferred embodiment recovers eight or more scan-lines each black and white field time; typically scan-lines 18 through 25.

More complete information on the video program material can thus be available, yielding multiple levels of origination data for a given 'broadcast'. For example, the syndicator identifier, as well as the networks identifier may be recovered.

If three scan-lines of data are encoded and three scan-lines of data are recovered, additional information can be available. For example, a locally originating encoded commercial broadcast during the local break in a syndicated show, that sourced to the broadcasting station via a network feed, also each possessing codes; thus the stand-alone local advertiser, the syndicator's show and the commercials integrated therein, and the network may all be identified, and notified.

It will be appreciated, in view of the foregoing description, that, if a certain number of video lines, including the encoded signal, are digitized, the above described circuit components for comparing the complements of each of the afore-referenced scan lines can be performed by a central processing unit through the use of special programming and/or commands.

Although the invention has been described with respect to particular embodiments, it is to be understood that these embodiments are merely illustrative of the application of the principles of the invention. Numerous modifications may be made therein and other arrangements may be devised without departing from the spirit and scope of the invention.

TABLE I

| State | Transition | Action(s) | Next State |
|---|---|---|---|
| Stable | Default | Check turnover | Stable |
| | Status Change | Put Timestamp Put current Status | Waiting |
| | Dropout | Put Timestamp Put current Status | Drop Wait |
| | Pickup | Put Timestamp Put current Status Put pickup FSD | Waiting |
| | Status Time | N/A | |
| | Drop Time | N/A | |
| | FSD | Put Timestamp Put current Status Put pickup FSD | Waiting |
| Waiting | Default | Ignore | Waiting |
| | Status Change | Merge Status | Mixed |
| | Dropout | Put Timestamp Put current Status | Drop Wait |
| | Pickup | Put Timestamp Put current Status Put pickup FSD | Waiting |
| | Status Time | None | Stable |
| | Drop Time | N/A | |
| | FSD | Put Timestamp Put current Status Put FSD | Waiting |
| Mixed | Default | Check pending Turnover | Mixed |
| | Status Change | Merge Status | Mixed |
| | Dropout | Merge Status Put saved Timestamp Put saved Status | Drop Wait |
| | Pickup | Put saved Timestamp Put saved Status Put current Timestamp Put current Status Put pickup FSD | Mixed |
| | Status Time | Put saved Timestamp | Stable |

TABLE I-continued

| State | Transition | Action(s) | Next State |
|---|---|---|---|
| | Drop Time | Put saved Status N/A | |
| | FSD | Put saved Timestamp Put saved Status Put current Timestamp Put current Status Put FSD | Mixed |
| Drop Stable | Default | ignore | Drop Stable |
| | Status Change | Merge status | Drop Mixed |
| | Dropout | N/A | |
| | Pickup | Put current Timestamp Put current Status | Waiting |
| | Status Time | N/A | |
| | Drop Time | Put drop FSD | |
| | FSD | Put drop FSD Put saved Timestamp Put saved Status Put current Timestamp Put current Status Put pickup FSD | Waiting |
| Drop Wait | Default | Ignore | Drop Wait |
| | Status Change | Merge status | Drop Mixed |
| | Dropout | N/A | |
| | Pickup | Put current Timestamp Put current Status | Waiting |
| | Status Time | None | Drop Stable |
| | Drop Time | Put drop FSD | Waiting |
| | FSD | Put drop FSD Put saved Timestamp Put saved Status Put pickup FSD | Waiting |
| Drop Mixed | Default | Ignore | Drop Mixed |
| | Status Change | Merge status | Drop Mixed |
| | Dropout | N/A | |
| | Pickup | Put current Timestamp Put current Status | Waiting |
| | Status Time | Merge status | Stretch |

TABLE II

| Turnovers generated by the field receiver (in chronological order) | Information stored in the database | Comments |
|---|---|---|
| First Logfile | Restart 1 | Restart Premature EOF | A normal sequence of turnovers ... |
| Second Logfile | 1 2 | | |
| Third logfile | 2 3 | | |
| Fourth Logfile | 3 4 | | |
| Fifth Logfile | 4 Premature-EOF | | Until a premature EOF (crash or power down) |
| Sixth Logfile | Restart 1 | Restart 2 | System started up again. |
| Seventh Logfile and so forth | 1 2 3 4 ... | | Logfile containing turnover ‡ is missing! |
| | 4 5 | 3 4 | The last data we have is for turnover 5. |

What is claimed is:

1. An encoding system for monitoring video program material including:

a source video program signal stream arranged as a sequence of frames, each of said frames comprising a plurality of scan lines;

an encoding means for generating a unique monitoring code, for applying the monitoring code to the source video program signal stream, and for encoding the source video program signal stream, said encoding means including a synchronized insertion means for applying the monitoring code to the source video program signal stream, said monitoring code having a repeating, program-identifying code portion common to all frames and a frame-identifying code portion unique to each frame of said sequence of frames; and receiver means for determining reception information independent of the content of said monitoring code, and for associating said reception information with specified ones of said frames using said monitoring code.

2. An encoding system for monitoring video program material as claimed in claim 1, including first recorder/player means for generating said source video program signal stream and for applying said source video program signal stream to said encoding means.

3. An encoding system for monitoring video program material as claimed in claim 1, including first clamping means for eliminating DC-offset and noise from said source video program signal stream, and for generating a first clamped signal.

4. An encoding system for monitoring video program material as claimed in claim 3, wherein said synchronized insertion means includes synchronized mixing means for adding said monitoring code to the first clamped signal as a sequence of digital data bits.

5. An encoding system for monitoring video program material as claimed in claim 4, wherein said synchronized insertion means includes second clamping means for eliminating DC-offset and noise from the first clamped signal during addition of the monitoring code.

6. An encoding system for monitoring video program material as claimed in claim 1, wherein said encoding means includes:

interface memory means for digitally storing code information; and processor means for accessing the interface memory means, for converting the code information to the monitoring code, and for transferring the monitoring code to the synchronized insertion means.

7. An encoding system for monitoring video program material as claimed in claim 1, wherein:

said plurality of scan lines comprises a first set of scan lines and a second set of scan lines; and said encoding means including means for applying the monitoring code to said first set of scan lines and for applying the logical complement of the monitoring code to said second set of scan lines which is adjacent to said first set of scan lines.

8. An encoding system for monitoring video program material as claimed in claim 1, wherein said encoding means further includes second recorder/player means for recording said source video program signal stream containing both the source video program signal stream and the monitoring code as applied by the encoding means.

9. An encoding system for monitoring video program material as claimed in claim 10, comprising decoding means for registering said received video program signal stream as a sequence of frames, each frame comprising a plurality of scan lines, and for detecting said monitoring code included on each frame of said sequence of frames.

10. A decoding system for monitoring video program material as claimed in claim 8, including receiving means for receiving a broadcast program signal and for generating a received video program signal stream corresponding to said broadcast program signal.

11. A decoding system for monitoring video program material as claimed in claim 9, wherein:

said plurality of scan lines of said received video program signal stream comprises interlaced odd and even scan lines, one of said even scan lines forming an encoded even scan line contacting said monitoring code, and one of said odd scan lines forming an encoded odd scan line adjacent to said encoded even scan line and containing the logical complement of said monitoring code;

said decoding means including scan line type detection means for determining which of said scan lines are odd and which of said scan lines are even;

said decoding means further including:

scan line memory means for storing digitally a predetermined subset of said plurality of scan lines for each frame, said subset of scan lines including the encoded odd and even scan lines; and code detection and correction means for isolating said monitoring code in the subset of said plurality of scan lines stored digitally in said scan line memory means.

12. A decoding system for monitoring video program material as claimed in claim 10, wherein said decoding means includes log memory means for storing video state data signals.

13. A decoding system for monitoring video program material as claimed in claim 12, wherein said decoding means includes log timing means for dividing said received video program signal stream into log intervals, for generating a log interval initiation signal, and for generating a log interval ending signal.

14. A decoding system for monitoring video program material as claimed in claim 12, further including video signal presence detection means for generating and applying to said log memory means a video loss signal when said received video program signal stream is absent.

15. A decoding system for monitoring video program material as claimed in claim 12, wherein said decoding means includes frame sequence analysis means for detecting the presence and absence of said monitoring code, for comparing the detected monitoring code with a predetermined correct code sequence, and for generating and applying to said log memory means sequence deviation signals when the detected monitoring code differs from the predetermined correct code sequence.

16. A decoding system for monitoring video program material as claimed in claim 15, wherein said deviation signals include a pre-discontinuity frame identification signal uniquely identifying the frame of said received video program signal stream occurring before said detected monitoring code differs from the predetermined correct code sequence, and a post-discontinuity frame identification signal uniquely identifying the frame of said received video program signal stream occurring after said detected monitoring code returns to agreement with the predetermined correct code sequence.

17. A decoding system for monitoring video program material as claimed in claim 12, wherein said decoding means includes signal status detection means for generating signal status fault signals upon degradation of a video signal program of said received video program signal stream below predetermined quality limits, and for applying said signal status fault signals to said log memory means.

18. A decoding system for monitoring video program material as claimed in claim 12, said decoding means further including:
communication storage means for accumulating and storing program broadcast summary information;
transaction processing means for reading said video state data signals from said log memory means, for compiling said video state data signals into said program broadcast summary information and for applying said program broadcast summary information to said communications storage means; and
communication means for automatic output of said program broadcast summary information.

19. An encoding/decoding system for monitoring video program material including:
source recorder/player means for providing a source video program signal stream as a sequence of frames, each said frame comprising a plurality of scan lines;
encoding means for generating a monitoring code, for applying the monitoring code to the source video program signal stream, and for uniquely encoding each frame to generate an encoded video program signal stream of the sequence of frames;
said encoding means including synchronized insertion means for applying the monitoring code to each frame of the sequence of frames, said monitoring code having a repeating, program-identifying code portion common to all frames, and a frame-identifying code portion unique to each frame;
decoding means for registering said encoded video program signal stream and for detecting said monitoring code included on each frame of said sequence of frames; and
receiver means for receiving a broadcast program signal corresponding to said encoded video program signal stream, for determining reception information independent of said monitoring code, for associating said reception information with specified ones of said frames, and for determining the presence or absence of frames.

20. An encoding/decoding system for monitoring video program material as claimed in claim 19, including first clamping means for eliminating DC-offset and noise from a video program signal of said source video program signal stream, and for generating a first clamped signal.

21. An encoding/decoding system for monitoring video program material as claimed in claim 20, said synchronized insertion means including synchronized mixing means for adding the monitoring code to the first clamped signal as a sequence of digital data bits.

22. An encoding/decoding system for monitoring video program material as claimed in claim 21, wherein said synchronized insertion means includes second clamping means for eliminating DC-offset and noise from the first clamped signal during and after addition of the monitoring code.

23. An encoding/decoding system for monitoring video program material as claimed in claim 19, wherein said encoding means further includes:
interface memory means for digitally storing code information; and
processor means for accessing the interface memory means, for converting the code information to the monitoring code, and for transferring the monitoring code to the synchronized insertion means.

24. An encoding/decoding system for monitoring video program material as claimed in claim 19, wherein:
said plurality of scan lines comprise interlaced odd and even scan lines; and
said encoding means includes means for applying the monitoring code to a predetermined even scan line and for applying the logical complement of the monitoring code to a predetermined odd scan line which is adjacent to the predetermined even scan line in the sequence of scan lines in each frame.

25. An encoding/decoding system for monitoring video program material as claimed in claim 19, wherein said encoding means further includes a recorder/player means for recording said encoded video program signal stream containing both the source video program signal stream and the monitoring code applied by the encoding means.

26. An encoding/decoding system for monitoring video program material as claimed in claim 19, wherein said receiving means includes means for receiving a broadcast program signal and for generating a received video program signal stream corresponding to said broadcast program signal.

27. An encoding/decoding system for monitoring video program material as claimed in claim 19, wherein said receiving means being non-scanning for continuous monitoring of each of a predetermined plurality of broadcast frequencies.

28. An encoding/decoding system for monitoring video program material as claimed in claim 19, wherein said receiving means further includes a plurality of substantially identical, redundant field receivers each including said decoding means.

29. An encoding/decoding system for monitoring video program material as claimed in claim 19, wherein:
said plurality of scan lines comprise interlaced odd and even scan lines, one of said even scan lines forming an encoded even scan line containing said monitoring code, and one of said odd scan lines forming an encoded odd scan line adjacent to said encoded even scan line and containing the logical complement of said monitoring code;
said decoding means including scan line type detection means for determining which of said scan lines are odd and which of said scan lines are even;
said decoding means further including:
scan line memory means for storing digitally a predetermined subset of said plurality of scan lines for each frame, said subset of scan lines including the encoded odd and even scan lines; and
code detection and correction means for isolating said monitoring code in the subset of said plurality of scan lines stored digitally in said scan line memory means.

30. An encoding/decoding system for monitoring video program material as claimed in claim 26, wherein said decoding means includes log memory means for storing video state data signals.

31. An encoding/decoding system for monitoring video program material as claimed in claim 30, wherein said decoding means includes log timing means for dividing said received video program signal stream into log intervals, for generating a log interval initiation signal at the beginning of each log interval and a log interval ending signal at the end of a log interval.

32. An encoding/decoding system for monitoring video program material as claimed in claim 30, further including video presence detection means for generating and applying to said log memory means a video loss signal when said received video program signal stream is absent.

33. An encoding/decoding system for monitoring video program material as claimed in claim 30, wherein said decoding means includes frame sequence and analysis means for detecting the presence and absence of said monitoring code, for comparing the detected monitoring code with a predetermined correct code sequence, and for generating and applying to said log memory means sequence deviation signals when the detected monitoring code differs from the predetermined correct code sequence.

34. An encoding/decoding system for monitoring video program material as claimed in claim 33, wherein said deviation signals include a pre-discontinuity frame identification signal uniquely identifying the frame of said received video program signal stream occurring immediately before said detected monitoring code differs from the predetermined correct code sequence, an a post-discontinuity frame identification signal uniquely identifying the frame of said received video program signal stream occurring immediately after said detected monitoring code corresponds with the predetermined correct code sequence.

35. An encoding/decoding system for monitoring video program material broadcast as claimed in claim 30, wherein said decoding means includes signal stream status detection means for generating signal status fault signals upon degradation of said received video program signal stream below predetermined quality limits and in the presence of predetermined fault conditions of said decoding means, and for applying said signal status fault signals to said log memory means.

36. An encoding/decoding system for monitoring video program material as claimed in claim 30, said decoding means further including:
communication storage means for accumulating and storing program broadcast summary information;
transaction processing means for reading said video state data signals from said log memory means, for compiling said video state data signals into said program broadcast summary information and for applying said program broadcast summary information to said communications storage means; and
communications means for automatic transferal of said program broadcast summary information.

37. An encoding/decoding system for monitoring video program material as claimed in claim 36, further including report collection and compilation means for automatic, periodic addressing of said communications means for retrieval of said program broadcast summary information.

38. An encoding method for monitoring video program material including the steps of:
generating a monitoring code uniquely identifying each frame of a sequence of frames;
synchronously applying the monitoring code to a video program signal stream to produce an encoded video program signal stream;
recording said encoded video program signal stream on a recorder/player means as a seance of frames, each frame comprising a plurality of scan lines; and
receiving said encoded video program signal stream and determining, independent of the content of said monitoring code, reception information which is associated with specified ones of said frames using said monitoring code.

39. An encoding method for monitoring video program material as claimed in claim 38, further including the step of generating said monitoring code having a repeating, program-identifying code portion common to all frames and a frame-identifying code portion unique to each frame.

40. An encoding method for monitoring video program material as claimed in claim 38, further including the steps of:
generating an unencoded video program signal stream from an unencoded storage media via a first recorder/player means; and
electronically mixing the sequential monitoring code with the unencoded video program signal stream.

41. An encoding method for monitoring video program material as claimed in claim 40, further including the step of eliminating DC-offset and noise from the unencoded video program signal stream by clamping an unencoded video signal of said unencoded video program signal stream for generating a first clamped signal.

42. An encoding method for monitoring video program material as claimed in claim 41, including the step of eliminating DC-offset and noise from the first clamped signal by clamping the first clamped signal during mixing of the monitoring code with the unencoded video program signal stream.

43. An encoding method for monitoring video program material as claimed in claim 38, including the steps of:
digitally storing code information in an interface memory; and
accessing said interface memory, and converting the code information to the monitoring code.

44. An encoding method for monitoring video program material as claimed in claim 38, including the steps of:
applying the monitoring code to a predetermined even scan line of said plurality of scan lines; and
applying the logical complement of the monitoring code to a predetermined odd scan line of said plurality of scan lines which is adjacent to the predetermined even scan line in the sequence of scan lines in each frame.

45. An encoding method for monitoring video program material as claimed in claim 38, including the step of recording said video program signal stream, containing both the video program signal stream and the monitoring code, using a second recorder/player means.

46. An encoding/decoding method for monitoring video program material including the steps of:
registering a first video program signal stream as a sequence of frames, each frame comprising a plurality of scan lines, said plurality of scan lines comprising interlaced odd and even scan lines;
generating a monitoring code having a repeating, program-identifying code portion common to all frames, and a frame-identifying code portion unique to each frame;
inserting said monitoring code in said first video program signal stream;

receiving a broadcast program signal corresponding to said first video program signal stream and generating a second video program signal stream corresponding to said broadcast program signal;

determining reception information independent of the content of said monitoring code and the presence or absence of each frame;

determining one of said even scan lines as an encoded even scan line containing said monitoring code, and one of said odd scan lines as an encoded odd scan line adjacent to said encoded even scan line and containing the logical component of said monitoring code;

storing digitally in a scan line memory a predetermined subset of said plurality of scan lines for each frame, said subset of scan lines including the encoded odd and even scan lines;

isolating said monitoring code in the subset of said plurality of scan lines stored digitally in said scan line memory; and associating said reception information with specified ones of said frames of said second video program signal stream.

47. An encoding/decoding method for monitoring video program material as claimed in claim 46, including the step of storing video state data signals in a log memory.

48. An encoding/decoding method for monitoring video program material as claimed in claim 47, including the further steps of:

dividing a video program signal stream into log intervals;

generating a log interval initiation signal at the beginning of each log interval and log interval ending signal at the end of each log interval; and applying the log interval initiation signal and log interval ending signal to said log memory for storage.

49. An encoding/decoding method for monitoring video program material as claimed in claim 47, including the step of generating and applying to said log memory a video loss signal when said second video program signal stream is absent.

50. An encoding/decoding method for monitoring video program material as claimed in claim 47, including the further steps of:

detecting the presence and absence of said monitoring code;

comparing the detected monitoring code with a predetermined correct code sequence; and generating and applying to said log memory sequence deviation signals when the detected monitoring code differs from the predetermined correct code sequence.

51. An encoding/decoding method for monitoring video program material as claimed in claim 49, including the step of inserting in said deviation signals a pre-discontinuity frame identification signal uniquely identifying the frame of said second video program signal stream occurring before said detected monitoring code differs from the predetermined correct code sequence, and a post-discontinuity frame identification signal uniquely identifying the frame of said second video program signal stream occurring immediately after said detected monitoring code returns to agreement with the predetermined correct code sequence.

52. An encoding/decoding method for monitoring video program material as claimed in claim 47, including the further steps of:

generating signal status fault signals upon degradation of said second video program signal stream below predetermined quality limits; and applying said signal status fault signals to said log memory.

53. An encoding/decoding method for monitoring video program material as claimed in claim 47, including the further steps of:

accumulating and storing program broadcast memory information in a communications memory;

reading said video state data signals from said log memory;

compiling said video state data signals into said program broadcast summary information;

applying said program broadcast summary information to said communications memory; and automatically outputting said program broadcast summary information.

54. An encoding/decoding method for monitoring video program material including the steps of:

recording, on a program recorder/player means, a video program signal stream as a sequence of frames, each frame comprising a plurality of scan lines;

generating, by means of an encoder, a monitoring code having a repeating, program-identifying code portion common to all frames of said seance of frames, and a frame-identifying code portion unique to each of said frames;

applying the monitoring code to said seance of frames to produce an encoded video program signal stream;

receiving a broadcast program signal corresponding to said encoded video program signal stream and determining reception information independent of the content of said monitoring code; and detecting said monitoring code included on each frame of the sequence of frames, and associating said reception information with specified ones of said frames using said monitoring code.

55. An encoding/decoding method for monitoring video program material as claimed in claim 54, including the step of synchronously applying the monitoring code to each frame of the sequence of frames.

56. An encoding/decoding method for monitoring video program material as claimed in claim 54, including the steps of generating an unencoded video program signal stream from an unencoded storage media and applying the unencoded video program signal stream to the encoder.

57. An encoding/decoding method for monitoring video program material as claimed in claim 56, including the step of eliminating DC-offset and noise from the unencoded video program signal stream by clamping a video program signal of said unencoded video program signal stream to generate a first clamped signal.

58. An encoding/decoding method for monitoring video program material as claimed in claim 57, including the step of synchronously adding the monitoring code to the first clamped signal as a sequence of digital data bytes.

59. An encoding/decoding method for monitoring video program material as claimed in claim 57, including the step of eliminating CD-offset and noise from the first clamped signal by clamping said first clamped signal during addition of the monitoring code.

60. An encoding/decoding method for monitoring video program material as claimed in claim 54, including the further steps of:
digitally storing code information in an interface memory;
accessing the interface memory using a processor; and
converting the code information to the monitoring code.

61. An encoding/decoding method for monitoring video program material as claimed in claim 54, wherein said plurality of scan lines comprise interlaced odd and even scan lines, including the steps of applying the monitoring code to a predetermined even scan line and applying the logical complement of the monitoring code to a predetermined odd scan line which is adjacent to the predetermined even scan line in the sequence of scan lines in each frame.

62. An encoding/decoding method for monitoring video program material as claimed in claim 56, further including the step of recording said encoded video program signal stream containing both the unencoded source video program signal stream and the monitoring code by means of a second recorder/player means.

63. An encoding/decoding method for monitoring video program material as claimed in claim 54, including the steps of receiving a broadcast program signal and generating a video program signal stream corresponding to said broadcast program signal.

64. An encoding/decoding method for monitoring video program material as claimed in claim 54, including the step of non-scanning, continuous monitoring of each of a predetermined plurality of broadcast frequencies.

65. An encoding/decoding method for monitoring video program material as claimed in claim 54, including the step of simultaneously registering and decoding said encoded video program signal stream on a plurality of redundant field recievers, each of said recievers including at least one decoder.

66. An encoding/decoding method for monitoring video program material as claimed in claim 54, wherein said plurality of scan lines comprise interlaced odd and even scan lines, including the steps of: 'applying to one of said even scan lines said monitoring code, and applying to one of said odd scan lines, adjacent to said encoded even scan line, the logical complement of said monitoring code;
determining which of said scan lines are odd and which of said scan lines are even;
storing digitally a predetermined subset of said plurality of scan liens for each frame, said subset of scan lines including the encoded odd and even scan lines; and
isolating said monitoring code in the subset of said plurality of scan lines stored digitally in a scan line memory.

67. An encoding/decoding method for monitoring video program material as claimed in claim 54, including the step of storing video state data signals in a log memory.

68. An encoding/decoding method for monitoring video program material as claimed in claim 67, including the further steps of:
dividing a video program signal stream into log intervals;
generating a log interval initiation signal at the beginning of each log interval and a log interval ending signal at the end of each log interval; and
applying the log interval initiation signal and log interval ending signal to said log memory for storage.

69. An encoding/decoding method for monitoring video program material as claimed in claim 68, including the step of detecting the presence of said encoded video program signal stream and generating and applying to said log memory a video loss signal when said encoded video program signal stream is absent.

70. An encoding/decoding method for monitoring video program material as claimed in claim 69, including the further steps of:
detecting the presence and absence of said monitoring code;
comparing a detected monitoring code with a predetermined correct code sequence; and
generating and applying to said log memory means sequence deviation signals when the detected monitoring code differs from the predetermined correct code sequence.

71. An encoding/decoding method for monitoring video program material as claimed in claim 70, including the step of including in said deviation signal a pre-discontinuity frame identification signal uniquely identifying the frame of said encoded video program signal stream occurring before said detected monitoring code differs from the predetermined correct code sequence, and a post-discontinuity frame identification signal uniquely identifying the frame of said encoded video program signal stream occurring after said detected monitoring code returns to agreement with the predetermined correct code sequence.

72. An encoding/decoding method for monitoring video program material as claimed in claim 67, including the steps of generating signal status fault signals upon degradation of said encoded video program signal stream below predetermined quality limits, and applying said signal status fault signals to said log memory.

73. An encoding/decoding method for monitoring video program material as claimed in claim 67, further including the steps of:
accumulating and storing program broadcast summary information in a communication memory;
reading said video state data signals from said log memory;
compiling said video state data signals into said program broadcast summary information;
applying said program broadcast summary information to said communications memory; and
automatically transmitting said program broadcast summary information.

74. An encoding/decoding method for monitoring video program material as claimed in claim 73, further including the step of accessing said communications memory for retrieving said program broadcast summary information, and compiling broadcast reports using said program broadcast summary information.

* * * * *